US008413077B2

(12) United States Patent
Yamamoto et al.

(10) Patent No.: US 8,413,077 B2
(45) Date of Patent: Apr. 2, 2013

(54) INPUT APPARATUS, HANDHELD APPARATUS, AND CONTROL METHOD

(75) Inventors: Kazuyuki Yamamoto, Kanagawa (JP); Toshio Mamiya, Tokyo (JP)

(73) Assignee: Sony Corporation, Tokyo (JP)

( * ) Notice: Subject to any disclaimer, the term of this patent is extended or adjusted under 35 U.S.C. 154(b) by 374 days.

(21) Appl. No.: 12/644,638

(22) Filed: Dec. 22, 2009

(65) Prior Publication Data

US 2010/0169843 A1 Jul. 1, 2010

(30) Foreign Application Priority Data

Dec. 25, 2008 (JP) .................................. 2008-330554
Oct. 19, 2009 (JP) .................................. 2009-240592

(51) Int. Cl.
*G06F 3/00* (2006.01)
*G06F 3/01* (2006.01)

(52) U.S. Cl. ........ 715/863; 715/865; 715/856; 345/156; 345/157; 345/158

(58) Field of Classification Search .................. 715/863, 715/856, 865; 345/156, 157, 158; 463/37
See application file for complete search history.

(56) References Cited

U.S. PATENT DOCUMENTS

| | | | |
|---|---|---|---|
| 5,453,758 A | | 9/1995 | Sato |
| 6,822,634 B1 * | | 11/2004 | Kemp et al. .................... 345/156 |
| 2004/0193413 A1 * | | 9/2004 | Wilson et al. ................. 704/243 |
| 2004/0250211 A1 * | | 12/2004 | Wakita et al. .................. 715/723 |
| 2005/0243062 A1 * | | 11/2005 | Liberty ........................... 345/158 |
| 2006/0010400 A1 * | | 1/2006 | Dehlin et al. .................. 715/856 |
| 2006/0028446 A1 * | | 2/2006 | Liberty et al. ................. 345/158 |
| 2006/0055662 A1 * | | 3/2006 | Rimas-Ribikauskas et al. .............................. 345/156 |
| 2006/0209021 A1 * | | 9/2006 | Yoo et al. ....................... 345/156 |
| 2006/0224994 A1 * | | 10/2006 | Cheemalapati et al. ...... 715/808 |
| 2006/0277503 A1 * | | 12/2006 | Maehiro et al. ............... 715/856 |
| 2007/0023527 A1 * | | 2/2007 | Harley et al. ............. 235/462.45 |
| 2007/0106939 A1 * | | 5/2007 | Qassoudi ....................... 715/704 |
| 2007/0113207 A1 * | | 5/2007 | Gritton .......................... 715/863 |
| 2007/0259717 A1 * | | 11/2007 | Mattice et al. ................... 463/36 |
| 2007/0290999 A1 * | | 12/2007 | Cho et al. ....................... 345/158 |
| 2008/0005672 A1 * | | 1/2008 | Mestres et al. ................ 715/700 |

(Continued)

FOREIGN PATENT DOCUMENTS

| | | | |
|---|---|---|---|
| JP | 07-284166 A | 10/1995 | |
| JP | 2001-056743 A | 2/2001 | |

(Continued)

*Primary Examiner* — Ramsey Refai
*Assistant Examiner* — Toan Vu
(74) *Attorney, Agent, or Firm* — Wolf, Greenfield & Sacks, P.C.

(57) ABSTRACT

An input apparatus includes: a motion signal output section to detect a movement of an object for controlling a movement of an image displayed on a screen and output a motion signal corresponding to the movement of the object; a control command generation section to generate a control command corresponding to the motion signal for controlling the movement of the image; an operation signal output section to detect a user operation unintended for the control of the movement of the image and output an operation signal based on the operation; an operation command generation section to generate an operation command based on the operation signal; and a control section to control the control command generation section to generate, in temporal relation with a generation timing of the operation command, the control command with a sensitivity of the movement of the image with respect to the movement of the object changed.

16 Claims, 30 Drawing Sheets

U.S. PATENT DOCUMENTS

| | | | |
|---|---|---|---|
| 2009/0128489 A1* | 5/2009 | Liberty et al. | 345/158 |
| 2009/0209343 A1* | 8/2009 | Foxlin et al. | 463/36 |
| 2009/0217210 A1* | 8/2009 | Zheng et al. | 715/863 |
| 2009/0289892 A1* | 11/2009 | Cox et al. | 345/156 |
| 2010/0083373 A1* | 4/2010 | White et al. | 726/21 |
| 2010/0201624 A1* | 8/2010 | Ng | 345/163 |

FOREIGN PATENT DOCUMENTS

| | | |
|---|---|---|
| JP | 3264291 | 12/2001 |
| JP | 2002-287891 A | 10/2002 |
| JP | 2006-053698 A | 2/2006 |

\* cited by examiner

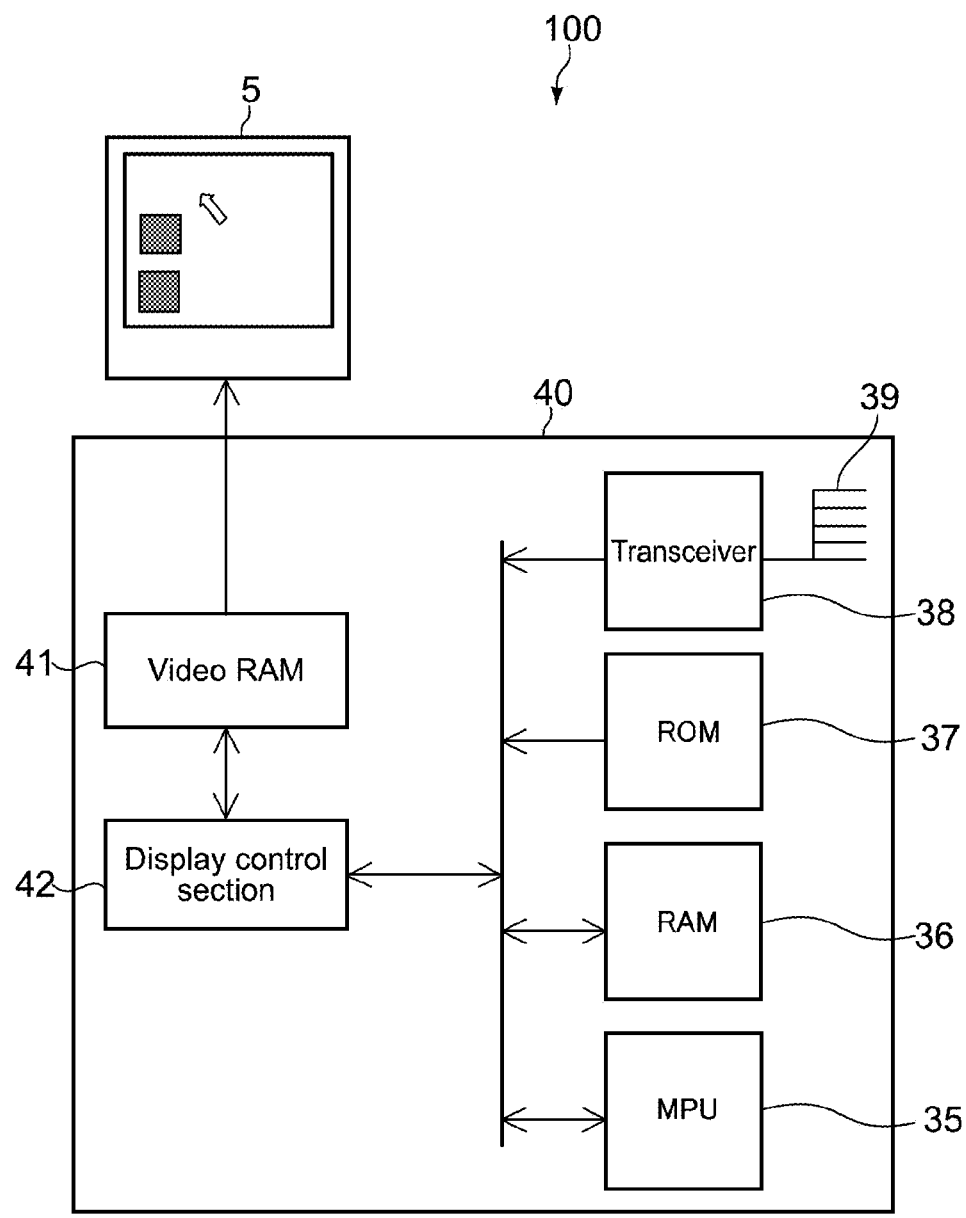
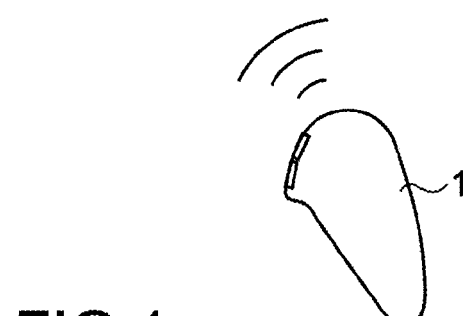
FIG.1

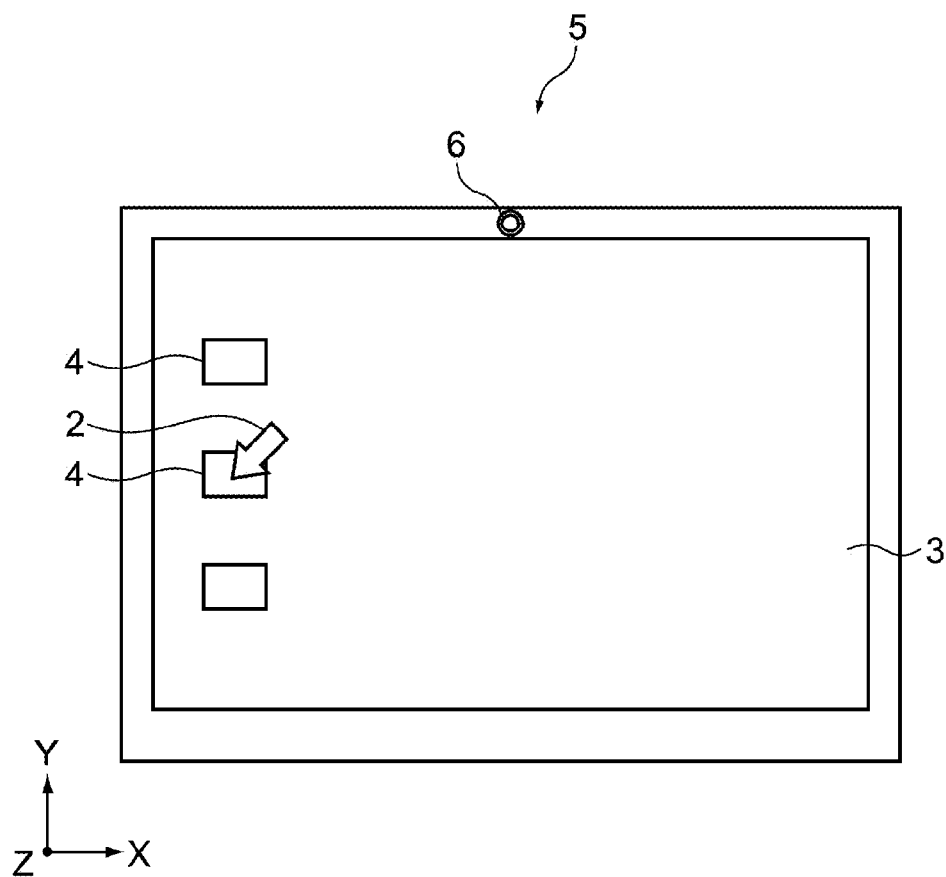
FIG.32

US 8,413,077 B2

INPUT APPARATUS, HANDHELD APPARATUS, AND CONTROL METHOD

BACKGROUND OF THE INVENTION

1. Field of the Invention

The present invention relates to an input apparatus, a handheld apparatus, and a control method for operating a GUI (Graphical User Interface).

2. Description of the Related Art

Pointing devices, particularly a mouse and a touchpad, are used as controllers for GUIs widely used in PCs (Personal Computers). Not just as HIs (Human Interfaces) of PCs of the related art, the GUIs are now starting to be used as interfaces for AV equipment and game machines used in living rooms etc. with, for example, televisions as image media. Various pointing devices that a user is capable of operating 3-dimensionally are proposed as controllers for the GUIs of this type (see, for example, Japanese Patent Application Laid-open No. 2001-56743 (paragraphs (0030) and (0031), FIG. 3; hereinafter, referred to as Patent Document 1) and Japanese Patent No. 3,264,291 (paragraphs (0062) and (0063)).

Moreover, in recent years, a technique of capturing a movement of a user's hand itself (gesture) and controlling a GUI in accordance with that movement is being developed (see, for example, Japanese Patent Application Laid-open No. 2006-53698).

Patent Document 1 discloses an input apparatus including angular velocity gyroscopes of two axes, that is, two angular velocity sensors. When a user holds the input apparatus in hand and swings it vertically and laterally, for example, the angular velocity sensors detect angular velocities about two orthogonal axes, and a signal as positional information of a cursor or the like displayed by a display means is generated in accordance with the angular velocities. The signal is transmitted to a control apparatus, and the control apparatus controls display so that the cursor moves on a screen in response to the signal.

SUMMARY OF THE INVENTION

Incidentally, 3-dimensional operation input apparatuses are generally provided with, in addition to various sensors for detecting positional changes, a command input key mainly typified by left and right buttons or a wheel button of a mouse. When issuing some kind of a command to an icon as an operation target, a user operates the input apparatus to place a pointer on an arbitrary icon and presses the command input key. However, there are cases where the input apparatus itself is moved by an operation caused when the command input key is pressed, and the pointer is consequently moved according to the input apparatus. As a result, there arises a problem that operations unintended by the user are made, like the pointer is moved from the icon as the operation target and a command cannot be issued.

Further, the same problem may arise in the case of the technique of capturing a movement of a user's hand itself (gesture) and controlling a GUI in accordance with that movement. For example, in a case where the user makes a gesture operation (e.g., gesture operations for determination, selection, and letter input) for issuing a command that is unrelated to control of a movement of an image on a screen, there is a fear that the gesture operation will be misrecognized as a gesture operation for controlling the movement of the image on the screen (e.g., gesture operation for moving pointer in X- and Y-axis directions), thus resulting in a problem that an operation unintended by the user is made.

In view of the circumstances as described above, there is a need for an input apparatus, a handheld apparatus, and a control method that are capable of preventing an operation unintended by a user from being made.

According to an embodiment of the present invention, there is provided an input apparatus including a motion signal output means, a control command generation means, an operation command generation means, and a control means.

The motion signal output means detects a movement of the input apparatus and outputs a motion signal corresponding to the movement of the input apparatus.

The control command generation means generates a control command that corresponds to the motion signal and is generated for controlling a movement of an image displayed on a screen.

The operation command generation means includes an operation section.

The operation section outputs an operation signal that is generated by a user operation and unrelated to the movement of the input apparatus.

In this case, the operation command generation means generates an operation command based on the output operation signal.

The control means controls the control command generation means to generate, in temporal relation with a generation timing of the operation command, the control command in which a sensitivity of the movement of the image with respect to the movement of the input apparatus is changed.

The "motion signal output means" includes a sensor, or a sensor and means for performing an operation based on a detection value detected by the sensor. Examples of the "motion signal" include an angular velocity value, an angular acceleration value, a velocity value, and an acceleration value, but are not limited thereto.

The "image displayed on a screen" refers to an image that is displayed on an entire screen or a part of the screen. The "image" includes a pointer, an icon, a web image, a map, an EPG (Electronic Program Guide), and the like. Examples of the "movement of an image" include a movement of a pointer and scroll, zoom, rotation, and other movements of an image.

In the embodiment of the present invention, the control command in which the sensitivity is changed is generated in temporal relation with the generation timing of the operation command. Accordingly, the movement of the image can be desensitized after the operation command is generated, before and after the operation command is generated, or until the operation command is generated, for example. In other words, in the embodiment of the present invention, since the movement of the image can be desensitized in association with the generation of the operation command, for example, it is possible to prevent an operation unintended by the user from being made, like a case where a command intended by the user is not executed.

In the input apparatus, the control means may control the control command generation means to generate the control command in which the sensitivity is changed during a predetermined time period since the generation of the operation command.

In the embodiment of the present invention, the movement of the image can be desensitized during the predetermined time period since the generation of the operation command. Accordingly, it is possible to prevent the image on the screen from making a move unintended by the user due to the input apparatus being moved after the operation command is issued.

The input apparatus may further include a time control means for variably controlling the time.

With this structure, a time period during which the sensitivity of the movement of the image is changed (sensitivity change period) can be changed appropriately.

In the input apparatus, the time control means may variably control the time based on the motion signal.

In the input apparatus, the time control means may control the time such that the time is shortened as an output value of the motion signal increases.

A user who is good at performing pointing operations, for example, may swing the input apparatus so as to move a pointer immediately after an operation command is generated after an input to an operation section is started (or after input is canceled). In this case, an output value of the motion signal increases in accordance with the movement of the input apparatus when being swung by the user. In the embodiment of the present invention, the sensitivity change period can be shortened as the output value of the motion signal increases. Accordingly, the user can smoothly shift to a pointing operation after the input to the operation section is started (or after input is canceled).

In the input apparatus, the time control means may control the time such that the time is prolonged as an output of a signal within a predetermined frequency range out of the output value of the motion signal increases.

The "signal within a predetermined frequency range" refers to a signal within a frequency range corresponding to a hand movement.

For example, a user who is not good at performing delicate image operations may cause a large hand movement. In the case of such a user, a better operational feeling can be obtained when the sensitivity change period is maintained a certain amount of time since the generation of the operation command after the input to the operation section is started (or after input is canceled). In the embodiment of the present invention, the sensitivity change period can be prolonged as an output value of a signal within the frequency range corresponding to a hand movement increases. Accordingly, even a user who causes a large hand movement can easily perform pointing operations, with the result that an operational feeling can be improved.

In the input apparatus, the control means may control the control command generation means to generate the control command in which the sensitivity is changed at least until the operation command is generated since one of an input of the operation signal and a cancel of the input of the operation signal.

According to another embodiment of the present invention, there is provided an input apparatus including a motion signal output means, a control command generation means, an operation command generation means, and a control means.

The motion signal output means detects a movement of the input apparatus and outputs a motion signal corresponding to the movement of the input apparatus.

The control command generation means generates a control command that corresponds to the motion signal and is generated for controlling a movement of an image displayed on a screen.

The operation command generation means includes an operation section which outputs an operation signal that is generated by a user operation and unrelated to the movement of the input apparatus, and generates an operation command based on the output operation signal.

The control means controls the control command generation means to generate, after one of an input of the operation signal and a cancel of the input of the operation signal, the control command in which a sensitivity of the movement of the image with respect to the movement of the input apparatus is changed.

In the embodiment of the present invention, a control command in which the sensitivity is changed is generated after the operation signal is input or after the input of the operation signal is canceled. Accordingly, it is possible to prevent the image from making a move unintended by the user due to the input apparatus being moved after the input to the operation section is started (or after input is canceled).

In the input apparatus, the control means may control the control command generation means to generate the control command in which the sensitivity is changed during one of a first time period since the input of the operation signal and a second time period since the cancel of the input of the operation signal.

The first time period (first sensitivity change period) and the second time period (second sensitivity change period) may either be the same or different.

The input apparatus may further include a time control means for variably controlling one of the first time period and the second time period.

In the input apparatus, the control means may control the control command generation means to generate the control command in which the sensitivity is changed until one of a time the operation signal is input since the cancel of the input thereof and a time the input of the operation signal is canceled since the input thereof.

According to an embodiment of the present invention, there is provided a handheld apparatus including a display section, a motion signal output means, a control command generation means, an operation command generation means, and a control means.

The motion signal output means detects a movement of the handheld apparatus and outputs a motion signal corresponding to the movement of the handheld apparatus.

The control command generation means generates a control command that corresponds to the motion signal and is generated for controlling a movement of an image displayed on a screen of the display section.

The operation command generation means includes an operation section which outputs an operation signal that is generated by a user operation and unrelated to the movement of the handheld apparatus, and generates an operation command based on the output operation signal.

The control means controls the control command generation means to generate, in temporal relation with a generation timing of the operation command, the control command in which a sensitivity of the movement of the image with respect to the movement of the handheld apparatus is changed.

According to another embodiment of the present invention, there is provided a handheld apparatus including a display section, a motion signal output means, a control command generation means, an operation command generation means, and a control means.

The motion signal output means detects a movement of the handheld apparatus and outputs a motion signal corresponding to the movement of the handheld apparatus.

The control command generation means generates a control command that corresponds to the motion signal and is generated for controlling a movement of an image displayed on a screen of the display section.

The operation command generation means includes an operation section.

The operation section outputs an operation signal that is generated by a user operation and unrelated to the movement of the handheld apparatus.

In this case, the operation command generation means generates an operation command based on the output operation signal.

The control means controls the control command generation means to generate, after one of an input of the operation signal and a cancel of the input of the operation signal, the control command in which a sensitivity of the movement of the image with respect to the movement of the handheld apparatus is changed.

According to an embodiment of the present invention, there is provided a control method including detecting a movement of an input apparatus.

A motion signal corresponding to the detected movement of the input apparatus is output.

A control command that corresponds to the motion signal and is generated for controlling a movement of an image displayed on a screen is generated.

An operation signal that is generated by a user operation and unrelated to the movement of the input apparatus is output.

An operation command is generated based on the output operation signal.

In temporal relation with a generation timing of the operation command, the control command in which a sensitivity of the movement of the image with respect to the movement of the input apparatus is changed is generated.

According to another embodiment of the present invention, there is provided an input apparatus including a motion signal output means, a control command generation means, an operation command generation means, and a control means.

The motion signal output means detects a movement of the input apparatus and outputs a motion signal corresponding to the movement of the input apparatus.

The control command generation means generates a control command that corresponds to the motion signal and is generated for controlling a movement of an image displayed on a screen.

The operation command generation means includes an operation section.

The operation section outputs an operation signal that is generated by a user operation and unrelated to the movement of the input apparatus.

In this case, the control command generation means generates an operation command based on the output operation signal.

The control means controls the control command generation means to stop, in temporal relation with a generation timing of the operation command, the movement of the image on the screen.

In the embodiment of the present invention, the movement of the image is stopped in temporal relation with the generation timing of the operation command. Accordingly, for example, it is possible to prevent an operation unintended by the user from being made, like a case where a command intended by the user is not executed.

In the input apparatus, the control means may control the control command generation means to stop the movement of the image during a predetermined time period since the generation of the operation command.

In the embodiment of the present invention, the movement of the image can be stopped during a predetermined time period since the generation of the operation command. Accordingly, it is possible to prevent the image on the screen from making a move unintended by the user due to the input apparatus being moved after the operation command is issued, for example.

The input apparatus may further include a time control means for variably controlling the time.

With this structure, the time period during which the movement of the image is stopped since the generation of the operation command can be changed appropriately.

In the input apparatus, the control means may control the control command generation means to stop the movement of the image at least until the operation command is generated since one of an input of the operation signal and a cancel of the input of the operation signal.

According to another embodiment of the present invention, there is provided a handheld apparatus including a display section, a motion signal output means, a control command generation means, an operation command generation means, and a control means.

The motion signal output means detects a movement of the handheld apparatus and outputs a motion signal corresponding to the movement of the handheld apparatus.

The control command generation means generates a control command that corresponds to the motion signal and is generated for controlling a movement of an image displayed on a screen of the display section.

The operation command generation means includes an operation section.

The operation section outputs an operation signal that is generated by a user operation and unrelated to the movement of the handheld apparatus.

In this case, the operation command generation means generates an operation command based on the output operation signal.

The control means controls the control command generation means to stop, in temporal relation with a generation timing of the operation command, the movement of the image on the screen.

According to another embodiment of the present invention, there is provided a control method including detecting a movement of an input apparatus.

A motion signal corresponding to the detected movement of the input apparatus is output.

A control command that corresponds to the motion signal and is generated for controlling a movement of an image displayed on a screen is generated.

An operation signal that is generated by a user operation and unrelated to the movement of the input apparatus is output.

An operation command is generated based on the output operation signal.

The generation of the control command is controlled so that the movement of the image on the screen is stopped in temporal relation with a generation timing of the operation command.

According to an embodiment of the present invention, there is provided an input apparatus including a motion signal output means, a control command generation means, an operation signal output means, an operation command generation means, and a control means.

The motion signal output means detects a movement of an object for controlling a movement of an image displayed on a screen and outputs a motion signal corresponding to the movement of the object.

The control command generation means generates a control command that corresponds to the motion signal and is generated for controlling the movement of the image.

The operation signal output means detects a user operation that is unrelated to the control of the movement of the image and outputs an operation signal that is based on the operation.

The operation command generation means generates an operation command based on the operation signal.

The control means controls the control command generation means to generate, in temporal relation with a generation timing of the operation command, the control command in which a sensitivity of the movement of the image with respect to the movement of the object is changed.

The "object" includes the input apparatus itself, body parts of the user (e.g., hand and finger), and the like.

The "motion signal output means" includes a sensor, or a sensor and means for performing an operation based on a detection value detected by the sensor. Examples of the "motion signal" include an angular velocity value, an angular acceleration value, a velocity value, and an acceleration value, but are not limited thereto.

The "user operation that is unrelated to the control of the movement of the image" refers to, for example, input operations for determination, selection, and letter input.

The "image displayed on a screen" refers to an image that is displayed on an entire screen or a part of the screen. The "image" includes a pointer, an icon, a web image, a map, an EPG (Electronic Program Guide), and the like. Examples of the "movement of an image" include a movement of a pointer and scroll, zoom, rotation, and other movements of an image.

In the embodiment of the present invention, the control command in which the sensitivity is changed is generated in temporal relation with the generation timing of the operation command. Accordingly, the movement of the image can be desensitized after the operation command is generated, before and after the operation command is generated, or until the operation command is generated, for example. In other words, in the embodiment of the present invention, since the movement of the image can be desensitized in association with the generation of the operation command, for example, it is possible to prevent an operation unintended by the user from being made, like a case where a command intended by the user is not executed.

According to another embodiment of the present invention, there is provided an input apparatus including a motion signal output means, a control command generation means, an operation signal output means, an operation command generation means, and a control means.

The motion signal output means detects a movement of an object for controlling a movement of an image displayed on a screen and outputs a motion signal corresponding to the movement of the object.

The control command generation means generates a control command that corresponds to the motion signal and is generated for controlling the movement of the image.

The operation signal output means detects a user operation that is unrelated to the control of the movement of the image and outputs an operation signal that is based on the operation.

The operation command generation means generates an operation command based on the operation signal.

The control means controls the control command generation means to generate, after one of an input of the operation signal and a cancel of the input of the operation signal, the control command in which a sensitivity of the movement of the image with respect to the movement of the object is changed.

In the embodiment of the present invention, a control command in which the sensitivity is changed is generated after the operation signal is input or after the input of the operation signal is canceled. Accordingly, it is possible to prevent the image from making a move unintended by the user due to the object being moved after the operation that is unrelated to the control of the movement of the image is started (or after operation is canceled).

According to an embodiment of the present invention, there is provided a control method including detecting a movement of an object for controlling a movement of an image displayed on a screen.

A motion signal corresponding to the movement of the object is output.

A control command that corresponds to the motion signal is generated for controlling the movement of the image.

A user operation that is unrelated to the control of the movement of the image is detected.

An operation signal that is based on the operation is output.

An operation command is generated based on the operation signal.

In temporal relation with a generation timing of the operation command, the control command in which a sensitivity of the movement of the image with respect to the movement of the object is changed is generated.

According to another embodiment of the present invention, there is provided an input apparatus including a motion signal output means, a control command generation means, an operation signal output means, an operation command generation means, and a control means.

The motion signal output means detects a movement of an object for controlling a movement of an image displayed on a screen and outputs a motion signal corresponding to the movement of the object.

The control command generation means generates a control command that corresponds to the motion signal and is generated for controlling the movement of the image.

The operation signal output means detects a user operation that is unrelated to the control of the movement of the image and outputs an operation signal that is based on the operation.

The operation command generation means generates an operation command based on the operation signal.

The control means controls the control command generation means to stop, in temporal relation with a generation timing of the operation command, the movement of the image on the screen.

In the embodiment of the present invention, the movement of the image is stopped in temporal relation with the generation timing of the operation command. Accordingly, for example, it is possible to prevent an operation unintended by the user from being made, like a case where a command intended by the user is not executed.

According to another embodiment of the present invention, there is provided a control method including detecting a movement of an object for controlling a movement of an image displayed on a screen.

A motion signal corresponding to the movement of the object is output.

A control command that corresponds to the motion signal is generated for controlling the movement of the image.

A user operation that is unrelated to the control of the movement of the image is detected.

An operation signal that is based on the operation is output.

An operation command is generated based on the operation signal.

The generation of the control command is controlled so that the movement of the image on the screen is stopped in temporal relation with a generation timing of the operation command.

In the descriptions above, elements described as " . . . means" may be realized by hardware, or may be realized by both software and hardware. In the case of realization by both the software and hardware, the hardware includes at least a storage device for storing a software program.

Typically, the hardware is constituted by selectively using at least one of a CPU (Central Processing Unit), an MPU (Micro Processing Unit), a RAM (Random Access Memory), a ROM (Read Only Memory), a DSP (Digital Signal Processor, an FPGA (Field Programmable Gate Array), an ASIC (Application Specific Integrated Circuit), a NIC (Network Interface Card), a WNIC (Wireless NIC), a modem, an optical disc, a magnetic disk, and a flash memory.

As described above, according to the embodiments of the present invention, an input apparatus, a handheld apparatus, and a control method that are capable of preventing an operation unintended by the user from being made can be provided.

These and other objects, features and advantages of the present invention will become more apparent in light of the following detailed description of best mode embodiments thereof, as illustrated in the accompanying drawings.

BRIEF DESCRIPTION OF DRAWINGS

FIG. 1 is a diagram showing a control system according to an embodiment of the present invention;

FIG. 32 is a diagram showing an example of the gesture-operation-type input apparatus, for explaining a movement of the pointer that moves on the screen in accordance with the hand movement of the user.

DESCRIPTION OF PREFERRED EMBODIMENTS

Hereinafter, embodiments of the present invention will be described with reference to the drawings.

FIG. 1 is a diagram showing a control system according to an embodiment of the present invention. A control system 100 includes a display apparatus 5, a control apparatus 40, and an input apparatus 1.

Figure 2:
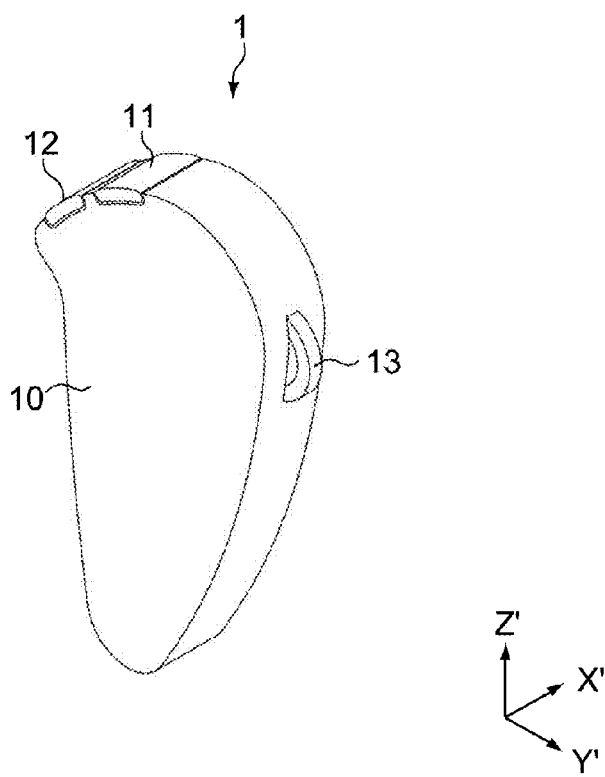
FIG. 2 is a perspective diagram showing an input apparatus according to the embodiment of the present invention.

FIG. 2 is a perspective diagram showing the input apparatus 1. The input apparatus 1 is of a size that a user is capable of holding. The input apparatus 1 includes a casing 10. Further, the input apparatus 1 includes an operation section 23 (see FIG. 6) including a button 11 and a button 12 adjacent to the button 11 that are provided at a center of an upper portion of the casing 10, and a rotary wheel button 13.

Typically, the buttons 11 and 12 are each a press-type button, and push buttons or capacitance-type touch buttons are used. The operation section 23 is not limited to the press-type button, and a bar-type operation section that is operated with one end as a fulcrum, or a slide-type operation section may also be used. The operation section 23 includes a built-in switch (not shown) which detects an operation of the user to the operation section and outputs an operation signal. As the switch that outputs an operation signal, an optical sensor or a capacitance sensor may be used.

The button 11 has a function corresponding to a left button of a mouse as an input device used for a PC, and the button 12 adjacent to the button 11 has a function corresponding to a right button of a mouse, for example. For example, an operation of selecting an icon 4 (see FIG. 5) may be carried out by clicking the button 11, and an operation of opening a file may be carried out by double-clicking the button 11.

Figure 3:
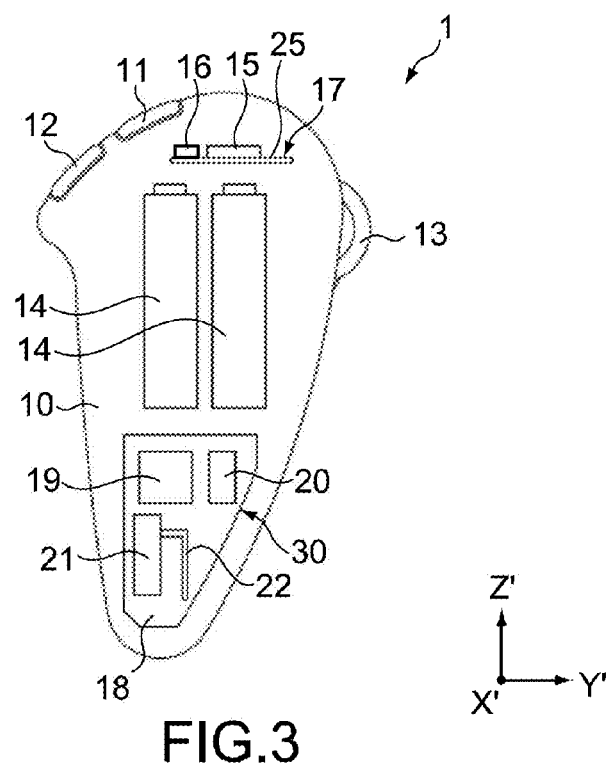
FIG. 3 is a diagram schematically showing an internal structure of the input apparatus.
Figure 4:
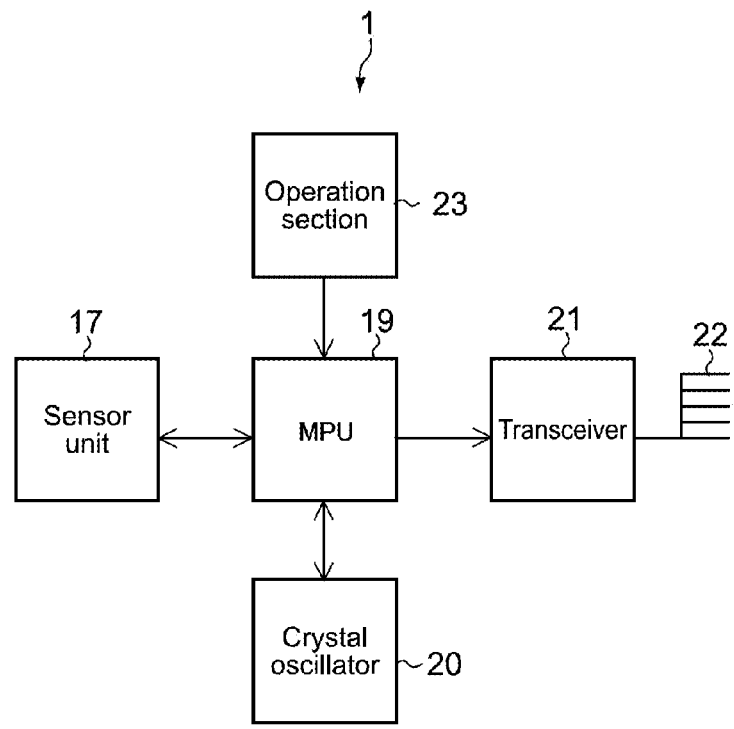
FIG. 4 is a block diagram showing an electrical structure of the input apparatus.

FIG. 3 is a diagram schematically showing an internal structure of the input apparatus 1. FIG. 4 is a block diagram showing an electrical structure of the input apparatus 1.

The input apparatus 1 includes a sensor unit 17, a control unit 30, and batteries 14.

Figure 8:
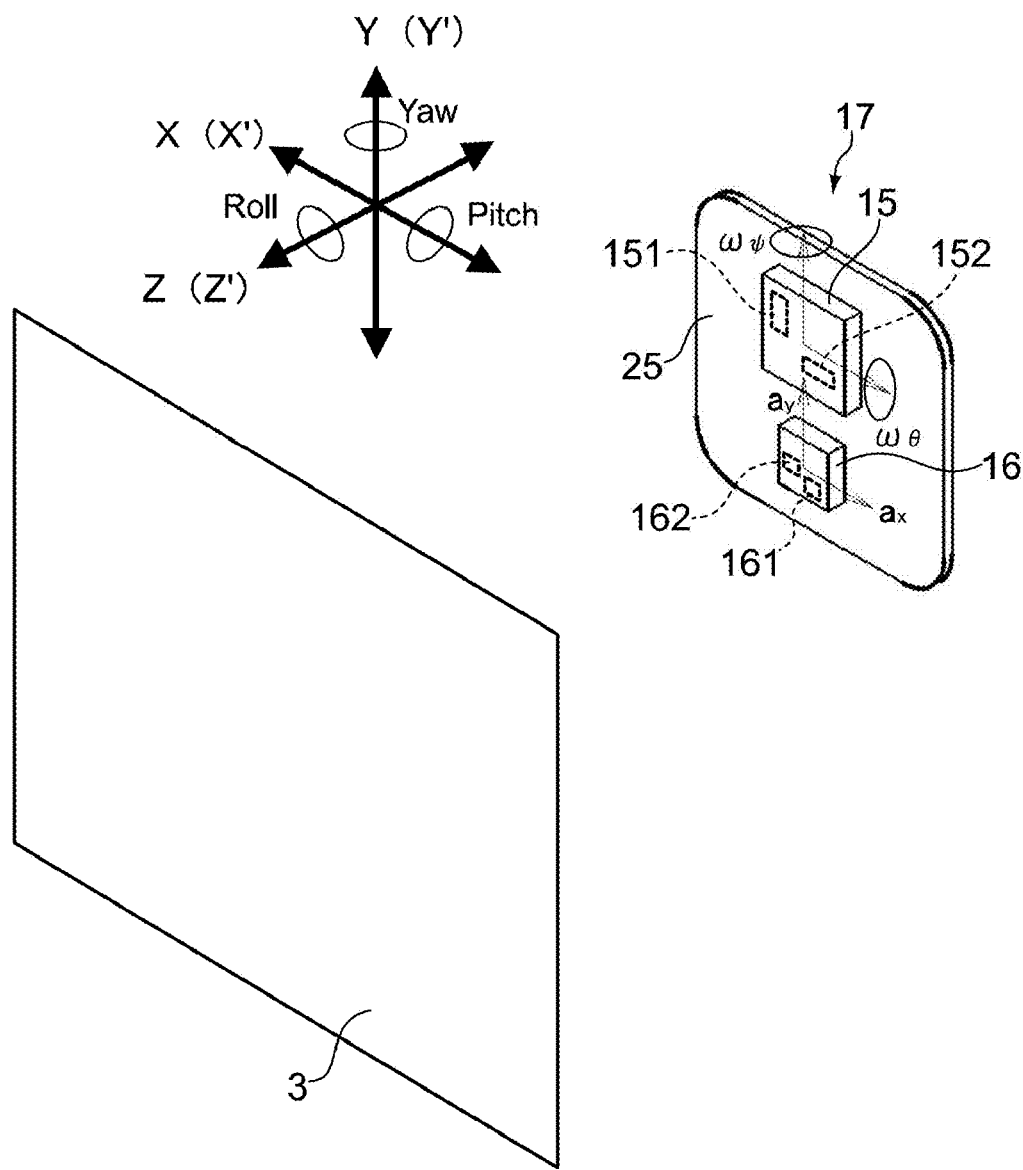
FIG. 8 is a perspective diagram showing a sensor unit.

FIG. 8 is a perspective diagram showing the sensor unit 17. The sensor unit 17 is a sensor that detects a movement of the casing 10, that is, a movement of the input apparatus 1. The sensor unit 17 includes an acceleration sensor unit 16 for detecting accelerations in different angles such as along two orthogonal axes (X' axis and Y' axis). Specifically, the acceleration sensor unit 16 includes two sensors, that is, a first acceleration sensor 161 and a second acceleration sensor 162.

The sensor unit 17 further includes an angular velocity sensor unit 15 for detecting angular accelerations about the two orthogonal axes. Specifically, the angular velocity sensor unit 15 includes two sensors, that is, a first angular velocity sensor 151 and a second angular velocity sensor 152. The acceleration sensor unit 16 and the angular velocity sensor unit 15 are packaged and mounted on a circuit board 25.

As each of the first angular velocity sensor 151 and the second angular velocity sensor 152, a vibration gyro sensor for detecting Coriolis force in proportion to an angular velocity is used. As each of the first acceleration sensor 161 and the second acceleration sensor 162, any sensor such as a piezoresistive sensor, a piezoelectric sensor, or a capacitance sensor may be used. Each of the angular velocity sensors 151 and 152 is not limited to the vibration gyro sensor, and a rotary top gyro sensor, a ring laser gyro sensor, a gas rate gyro sensor, and the like may also be used.

In descriptions on FIGS. 2 and 3, a longitudinal direction of the casing 10 is referred to as Z' direction, a thickness direction of the casing 10 is referred to as X' direction, and a width direction of the casing 10 is referred to as Y' direction for convenience. In this case, the sensor unit 17 is incorporated into the casing 10 such that a surface of the circuit board 25 on which the acceleration sensor unit 16 and the angular velocity sensor unit 15 are mounted becomes substantially parallel to an X'-Y' plane. As described above, the sensor units 16 and 15 each detect physical amounts with respect to the two axes, that is, the X' axis and the Y' axis. In descriptions below, a coordinate system that moves along with the input apparatus 1, that is, a coordinate system fixed to the input apparatus 1 is expressed using the X' axis, Y' axis, and Z' axis, whereas a coordinate system stationary on earth, that is, an inertial coordinate system is expressed using the X axis, Y axis, and Z axis. Moreover, in descriptions below, with regard to the movement of the input apparatus 1, a rotational direction about the X' axis is sometimes referred to as pitch direction, a rotational direction about the Y' axis is sometimes referred to as yaw direction, and a rotational direction about the Z' axis (roll axis) is sometimes referred to as roll direction.

The control unit 30 includes a main substrate 18, an MPU 19 (Micro Processing Unit) (or CPU) mounted on the main substrate 18, a crystal oscillator 20, a transceiver 21, and an antenna 22 printed on the main substrate 18.

The MPU 19 includes a built-in volatile or nonvolatile memory requisite therefor. The MPU 19 is input with a detection signal from the sensor unit 17, an operation signal from the operation section 23, and the like, and the MPU 19 executes various types of operational processing in order to generate predetermined control signals (commands) in response to those input signals. The memory may be provided separate from the MPU 19.

Typically, the MPU 19 generates, as the control signals, a control command corresponding to detection signals detected by the sensor unit 17 and an operation command corresponding to an operation signal output from the operation section.

Typically, the sensor unit 17 outputs analog signals. In this case, the MPU 19 includes an A/D (Analog/Digital) converter. However, the sensor unit 17 may be a unit that includes the A/D converter.

The transceiver 21 transmits the control signals generated in the MPU 19 as RF radio signals to the control apparatus 40 via the antenna 22. The transceiver 21 is also capable of receiving various signals transmitted from the control apparatus 40.

The crystal oscillator 20 generates clocks and supplies them to the MPU 19. As the batteries 14, dry cell batteries, rechargeable batteries, and the like are used.

The control apparatus 40 includes an MPU 35 (or CPU), a RAM 36, a ROM 37, a video RAM 41, a display control section 42, an antenna 39, and a transceiver 38.

The transceiver 38 receives the control signal transmitted from the input apparatus 1 via the antenna 39 (reception means). The transceiver 38 is also capable of transmitting various predetermined signals to the input apparatus 1. The MPU 35 analyzes the control signal and executes various types of operational processing. The display control section 42 mainly generates screen data to be displayed on a screen 3 of the display apparatus 5 under control of the MPU 35. The video RAM 41 serves as a work area of the display control section 42 and temporarily stores the generated screen data.

The control apparatus 40 may be an apparatus dedicated to the input apparatus 1, or may be a PC or the like. The control apparatus 40 is not limited to the apparatus dedicated to the input apparatus 1, and may be a computer integrally formed with the display apparatus 5, audiovisual equipment, a projector, a game device, a car navigation system, or the like.

Examples of the display apparatus 5 include a liquid crystal display and an EL (Electro-Luminescence) display, but are not limited thereto. The display apparatus 5 may alternatively be an apparatus integrally formed with a display and capable of receiving television broadcasts and the like, or an apparatus in which such a display and the control apparatus 40 are integrated.

Figure 5:
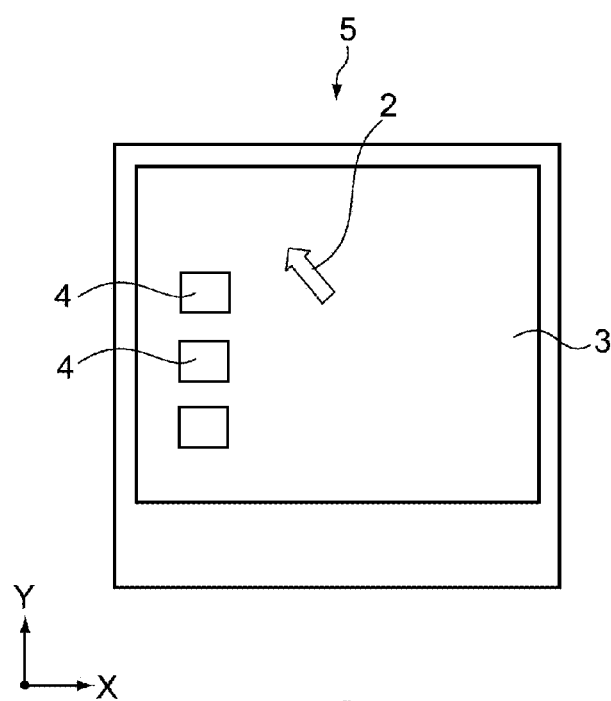
FIG. 5 is a diagram showing an example of a screen displayed on a display apparatus.

FIG. 5 is a diagram showing an example of the screen 3 displayed on the display apparatus 5. GUIs such as icons 4 and a pointer 2 are displayed on the screen 3. The icons are images on the screen 3 representing functions of programs, execution commands, file contents, and the like on the computer. It should be noted that on the screen 3, the horizontal direction is referred to as X-axis direction and the vertical direction is referred to as Y-axis direction.

Figure 6:
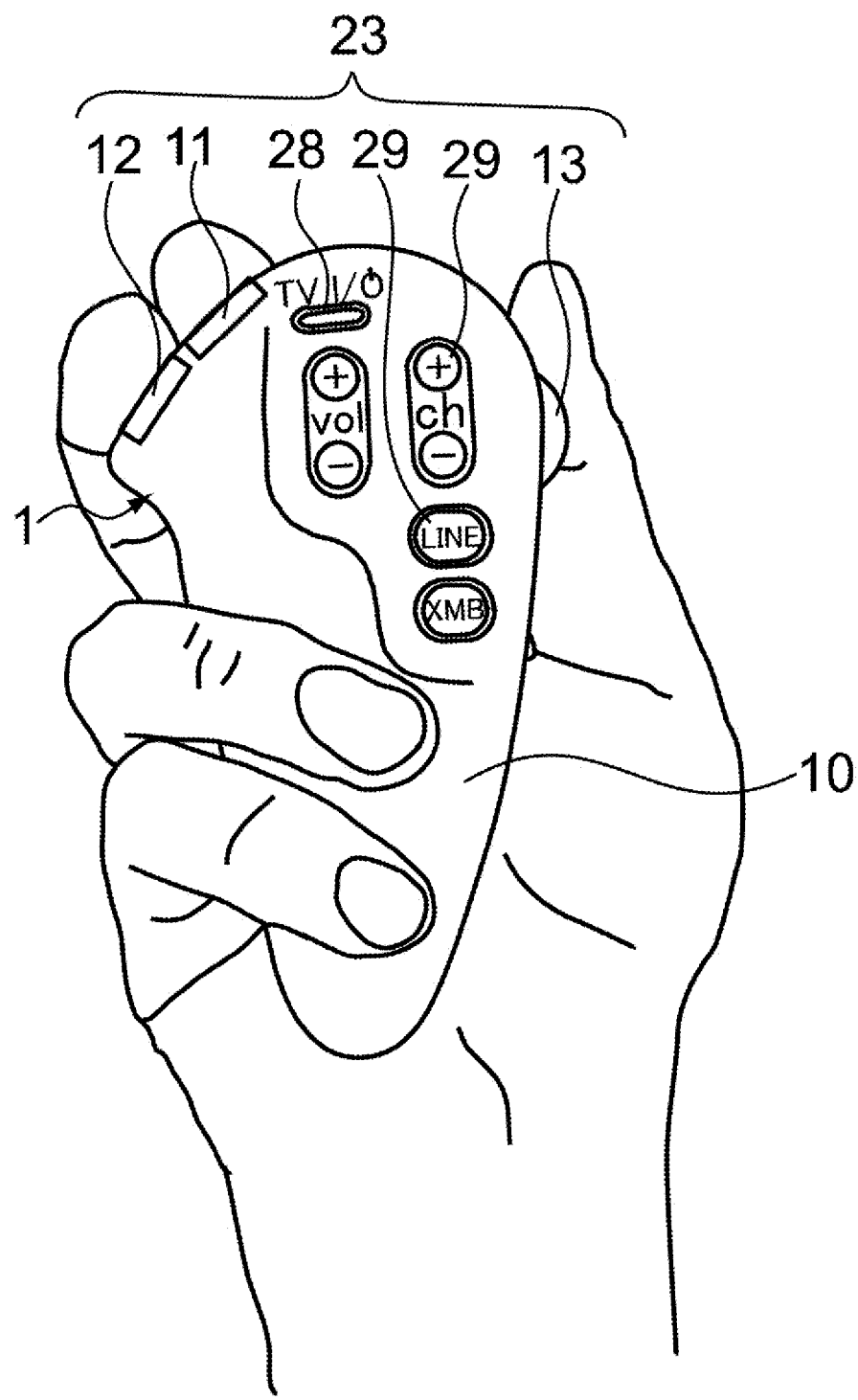
FIG. 6 is a diagram showing a state where a user is holding the input apparatus.

FIG. 6 is a diagram showing a state where a user is holding the input apparatus 1. As shown in FIG. 6, the input apparatus 1 may include, as the operation section 23, in addition to the buttons 11, 12, and 13, various operation buttons 29 such as those provided to a remote controller for operating a television or the like and a power switch 28, for example. Control signals generated when the user moves the input apparatus 1 in the air or operates the operation section 23 while holding the input apparatus 1 as shown in the figure are output to the control apparatus 40, and the control apparatus 40 controls the GUI.

Next, a description will be given on typical examples of ways of moving the input apparatus 1 and ways the pointer 2 moves on the screen 3 accordingly. FIG. 7 are explanatory diagrams therefor.

Figure 7A:
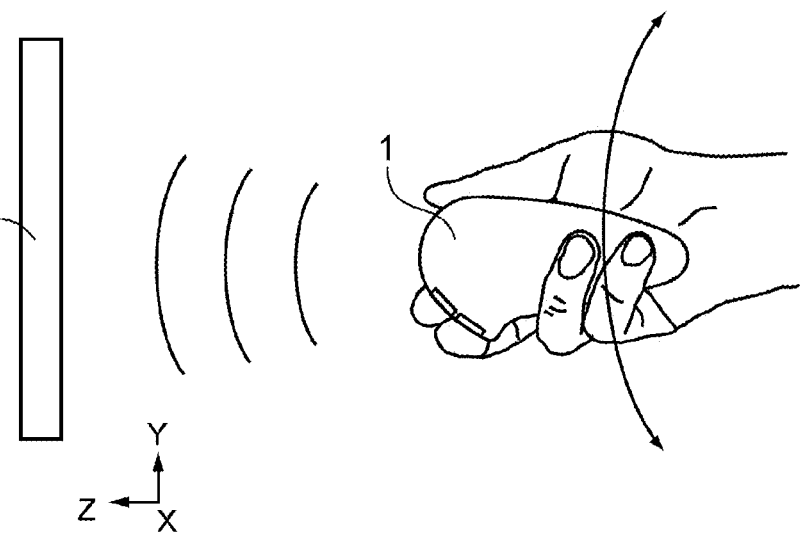
FIG. 7 are explanatory diagrams showing typical examples of ways of moving the input apparatus and ways a pointer moves on a screen accordingly.
Figure 7B:
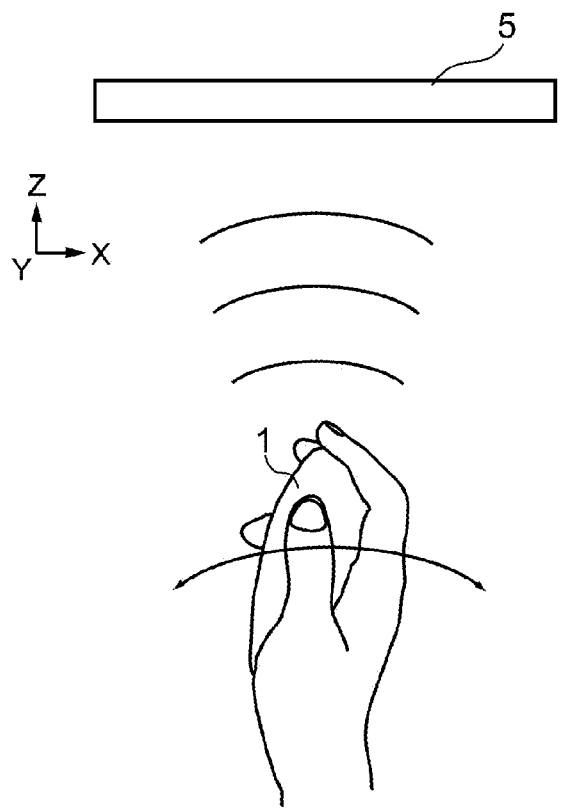

As shown in FIGS. 7A and 7B, the user holds the input apparatus 1 so as to aim the buttons 11 and 12 side of the input apparatus 1 at the display apparatus 5 side. The user holds the input apparatus 1 so that a thumb is located on an upper side and a pinky is located on a lower side as in handshakes. In this state, the circuit board 25 (see FIG. 8) of the sensor unit 17 is close to being in parallel with the screen 3 of the display apparatus 5, and the two axes as detection axes of the sensor unit 17 respectively correspond to the horizontal axis (X axis) and the vertical axis (Y axis) on the screen 3. Hereinafter, the position of the input apparatus 1 as shown in FIGS. 7A and 7B is referred to as reference position.

As shown in FIG. 7A, when the user moves a wrist or an arm in the vertical direction, that is, the pitch direction from the reference position, the second acceleration sensor 162 detects an acceleration $a_y$ in the Y'-axis direction and the second angular velocity sensor 152 detects an angular velocity $\omega_\theta$ about the X' axis. Based on those physical amounts, the control apparatus 40 controls display of the pointer 2 so as to move the pointer 2 in the Y-axis direction.

Meanwhile, as shown in FIG. 7B, when the user moves the wrist or the arm in the lateral direction, that is, the yaw direction from the reference position, the first acceleration sensor 161 detects an acceleration $a_x$ in the X'-axis direction and the first angular velocity sensor 151 detects an angular velocity $\omega_\psi$ about the Y' axis. Based on the thus-detected physical amounts, the control apparatus 40 controls display of the pointer 2 so as to move the pointer 2 in the X-axis direction.

(Description on Operation)

Next, an operation of the control system 100 structured as described above will be described.

Figure 9:
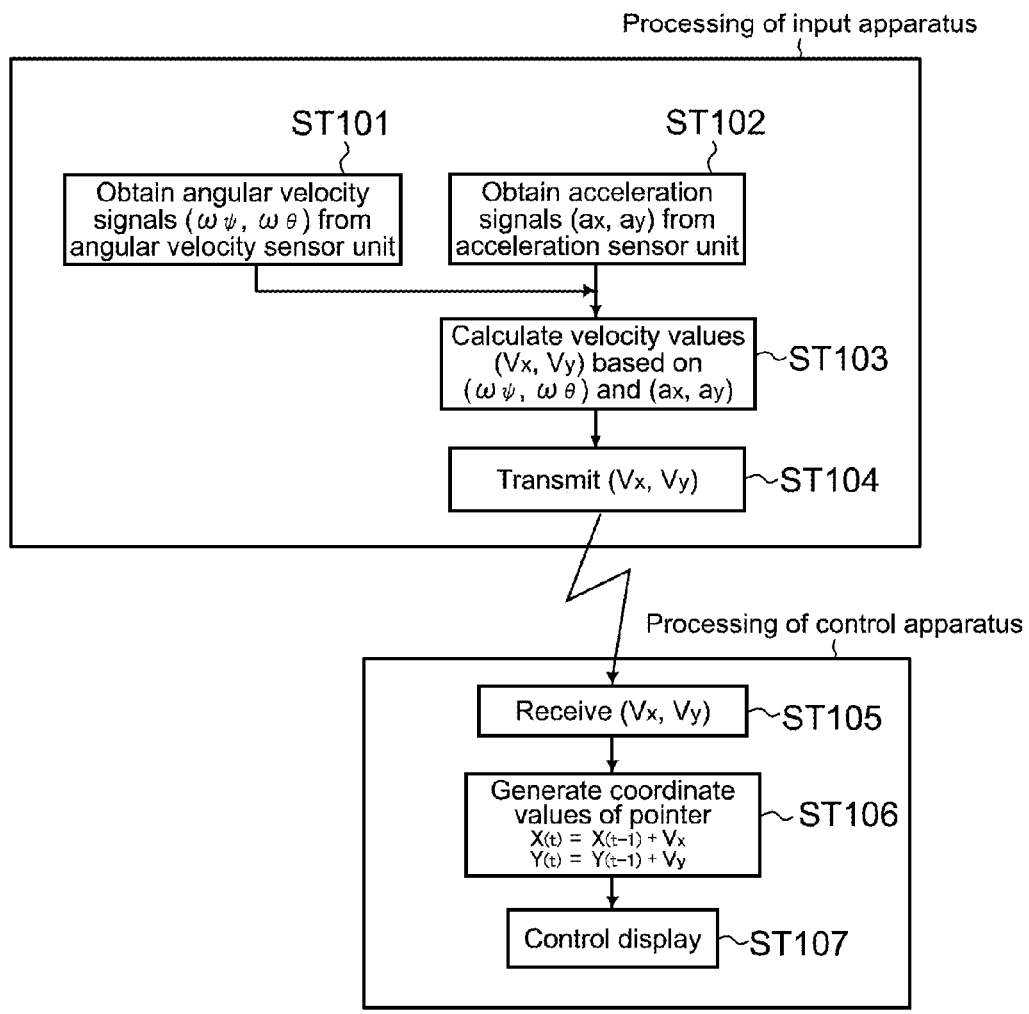
FIG. 9 is a flowchart showing a typical operation of the control system.

First, an operation of the control system 100 in a case where the pointer 2 moves on the screen 3 in accordance with a 3-dimensional operation made to the input apparatus 1 by the user will be described briefly. FIG. 9 is a flowchart showing the operation of the control system 100 in this case.

As shown in FIG. 9, when the user presses the power supply switch 28 and the power of the input apparatus 1 is thus turned on, for example, biaxial angular velocity signals are output from the angular velocity sensor unit. The MPU 19 acquires angular velocity values ($\omega_\psi$, $\omega_\theta$) from the angular velocity signals (Step 101).

Further, upon turning on the power of the input apparatus 1, biaxial acceleration signals are output from the acceleration sensor unit 16. The MPU 19 acquires acceleration values ($a_x$, $a_y$) from the biaxial acceleration signals (Step 102).

The MPU 19 typically carries out the process of acquiring angular velocity values ($\omega_\psi$, $\omega_\theta$) (Step 101) and the process of acquiring acceleration values ($a_x$, $a_y$) (Step 102) in sync. However, the process of acquiring angular velocity values ($\omega_\psi$, $\omega_\theta$) and the process of acquiring acceleration values ($a_x$, $a_y$) do not always need to be carried out in sync (at the same time). For example, the acceleration values ($a_x$, $a_y$) may be obtained after the angular velocity values ($\omega_\psi$, $\omega_\theta$) are obtained, or the angular velocity values ($\omega_\psi$, $\omega_\theta$) may be obtained after the acceleration values ($a_x$, $a_y$) are obtained.

Based on the acceleration values ($a_x$, $a_y$) and the angular velocity values ($\omega_\psi$, $\omega_\theta$), the MPU 19 calculates velocity values (first velocity value $V_x$ and second velocity value $V_y$) by a predetermined operation (Step 103). The first velocity value $V_x$ is a velocity value in a direction along the X' axis, and the second velocity value $V_y$ is a velocity value in a direction along the Y' axis.

As a method of calculating velocity values, there is a method in which the MPU 19 obtains radius gyrations ($R_\psi$, $R_\theta$) of the movement of the input apparatus 1 by dividing the acceleration values ($a_x$, $a_y$) by angular acceleration values ($\Delta\omega_\psi$, $\Delta\omega_\theta$), and calculates velocity values by multiplying the radius gyrations ($R_\psi$, $R_\theta$) by the angular velocity values ($\omega_\psi$, $\omega_\theta$). Alternatively, the radius gyrations ($R_\psi$, $R_\theta$) may be obtained by dividing acceleration change rates ($\Delta a_x$, $\Delta a_y$) by angular acceleration change rates ($\Delta(\Delta\omega_\psi)$, $\Delta(\Delta\omega_\theta)$). An effect of gravity accelerations can be removed when the radius gyrations ($R_\psi$, $R_\theta$) are calculated by dividing the acceleration change rates ($\Delta a_x$, $\Delta a_y$) by the angular acceleration change rates ($\Delta(\Delta\omega_\psi)$, $\Delta(\Delta\omega_\theta)$).

As another example of the method of calculating the velocity values ($V_x$, $V_y$), there is a method in which the MPU 19 calculates the velocity values by, for example, integrating the acceleration values ($a_x$, $a_y$) while using the angular velocity values ($\omega_\psi$, $\omega_\theta$) as an adjunct for the integration operation.

By calculating the velocity values by the calculation method described above, an operational feeling of the input apparatus 1 that matches an intuition of the user can be obtained, and moreover, the movement of the pointer 2 on the screen 3 also accurately matches the movement of the input apparatus 1. However, the velocity values ($V_x$, $V_y$) do not always need to be calculated by the calculation method above. For example, it is also possible for the velocity values ($V_x$, $V_y$) to be calculated by simply integrating the acceleration values ($a_x$, $a_y$). Alternatively, the detected angular velocity values ($\omega_\psi$, $\omega_\theta$) may be used as they are as the velocity values ($V_x$, $V_y$).

The MPU 19 transmits information on the calculated velocity values ($V_x$, $V_y$) to the control apparatus 40 via the transceiver 21 and the antenna 22 (Step 104).

The MPU 35 of the control apparatus 40 receives the information on the velocity values ($V_x$, $V_y$) via the antenna 39 and the transceiver 38 (Step 105). In this case, the input apparatus 1 transmits the velocity values ($V_x$, $V_y$) every predetermined number of clocks, that is, every time a predetermined time passes, so the control apparatus 40 receives the velocity values every predetermined number of clocks.

Upon receiving the velocity values, the MPU 35 of the control apparatus 40 generates new coordinate values (X(t), Y(t)) by adding the velocity values to coordinate values using Equations (1) and (2) below (Step 106). The MPU 35 controls display on the screen so that the pointer 2 moves to a position corresponding to the generated coordinate values (Step 107).

$$X(t)=X(t-1)+V_x \tag{1}$$

$$Y(t)=Y(t-1)+V_y \tag{2}$$

It should be noted that the calculation of the velocity values ($V_x$, $V_y$) may be executed by the control apparatus 40. In this case, the input apparatus 1 transmits information on the angular velocity values ($\omega_\psi$, $\omega_\theta$) and the acceleration values ($a_x$, $a_y$) to the control apparatus 40 via the transceiver 21 and the antenna 22. Based on the information on the angular velocity values ($\omega_\psi$, $\omega_\theta$) and the acceleration values ($a_x$, $a_y$) received via the antenna 39 and the transceiver 38, the control apparatus 40 calculates the velocity values ($V_x$, $V_y$). The method of calculating the velocity values is as described above.

(Embodiments of Changing Sensitivity of Pointer Movement in Association with Operation Command)

(First Embodiment of Case where Sensitivity of Pointer Movement is Changed in Association with Operation Command)

Figure 10:
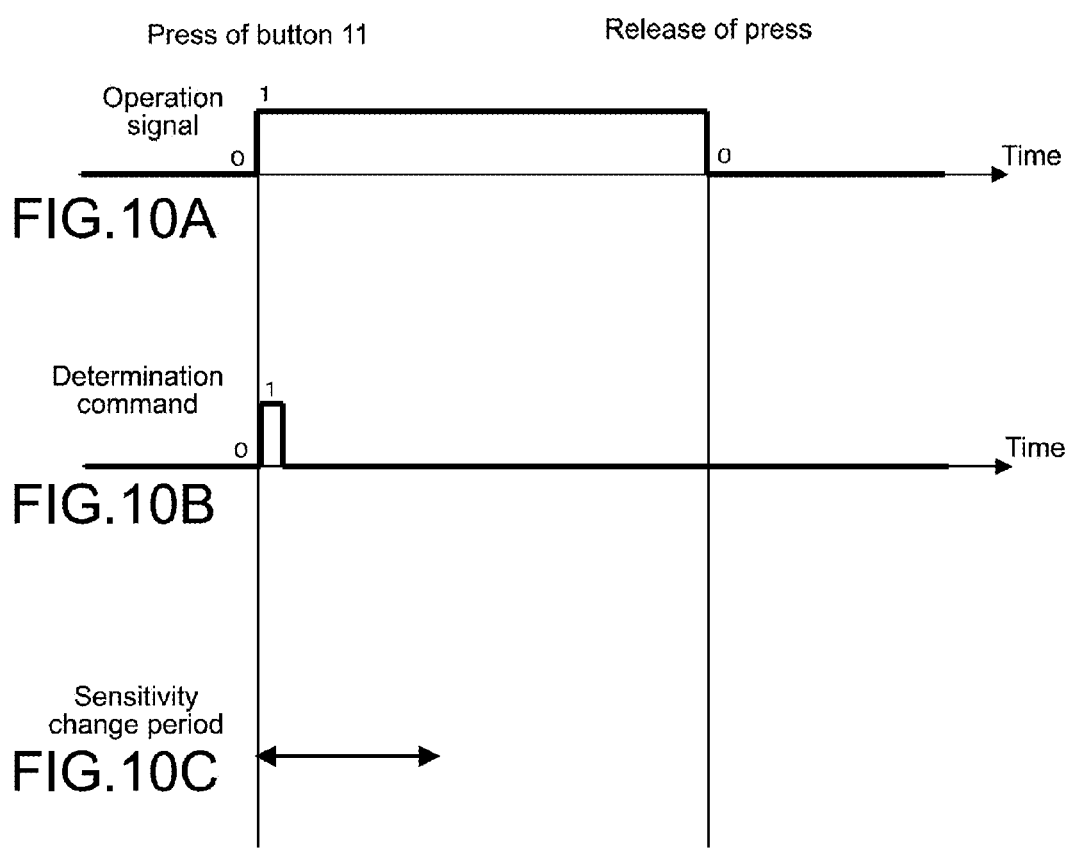
FIG. 10 are timing charts showing an operation of the input apparatus according to the embodiment of the present invention.

Next, a first embodiment of a case where a sensitivity of a pointer movement is changed in association with an operation command will be described. FIG. 10 are timing charts showing an operation of the input apparatus 1 according to this embodiment. FIG. 10A shows an output of an operation signal at a time the button 11 is pressed, and FIG. 10B shows a generation of a determination command. Moreover, FIG. 10C shows a sensitivity change period. The sensitivity change period used herein is a period during which a sensitivity of a movement of the pointer 2 with respect to a movement of the input apparatus 1 is changed. It should be noted that in descriptions below, unless stated otherwise, a description will be given on a case where the button 11 is pressed out of the operation section 23 provided to the input apparatus 1.

Figure 11:
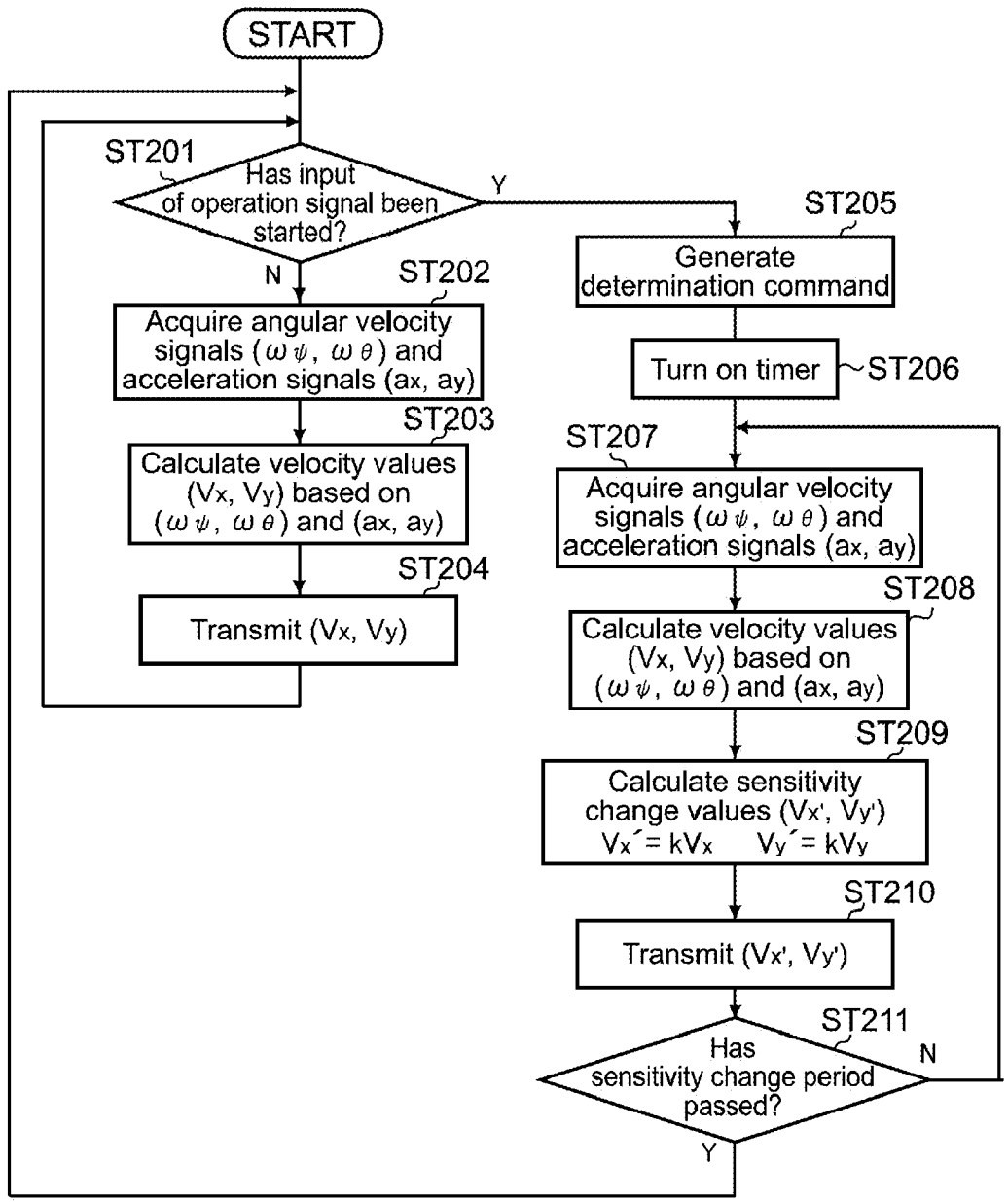
FIG. 11 is a flowchart showing an operation of the input apparatus according to the embodiment of the present invention.

FIG. 11 is a flowchart showing an operation of the input apparatus 1 according to this embodiment.

The MPU 19 of the input apparatus 1 judges whether an input of an operation signal is started (Step 201). When judged that the user has not started pressing the button 11 and an input of an operation signal from a switch (not shown) is not yet started (NO in Step 201), the MPU 19 acquires signals of angular velocity values ($\omega_\psi$, $\omega_\theta$) and signals of acceleration values ($a_x$, $a_y$) (Step 202). Based on the signals on angular velocity values ($\omega_\psi$, $\omega_\theta$) and the signals on acceleration values ($a_x$, $a_y$), the MPU 19 calculates velocity values ($V_x$, $V_y$) by a predetermined operation (Step 203). Upon calculating the velocity values ($V_x$, $V_y$), the MPU 19 transmits, as a control command, information on the velocity values to the control apparatus 40 via the transceiver 21 and the antenna 22 (Step 204).

On the other hand, when the user starts pressing the button 11, an operation signal is output from the switch and an input thereof is started (see FIG. 10A). When the input of the operation signal is started (YES in Step 201), the MPU 19 generates a determination command (type of operation command) (Step 205). In this case, the determination command is generated as a rectangular short-term pulse (see FIG. 10B), and the generated determination command is transmitted to the control apparatus 40 via the transceiver 21 and the antenna 22. Upon receiving the determination command, the MPU 35 of the control apparatus 40 executes, in a case where the pointer 2 is placed on the icon 4, for example, processing corresponding to that icon 4.

Upon generating the determination command, the MPU 19 turns on a timer (not shown) and starts counting a sensitivity change period. Here, the sensitivity change period may be started with a rise of the determination command generated as the short-term pulse (0→1) as a trigger or may be started with a return of the raised pulse to a normal state (1→0) as a trigger (see FIG. 10B).

Upon turning on the timer, the MPU 19 acquires the signals on the angular velocity values ($\omega_\psi$, $\omega_\theta$) and the signals on the acceleration values ($a_x$, $a_y$) (Step 207) and calculates velocity values ($V_x$, $V_y$) based on the acquired angular velocity values and acceleration values (Step 208). Next, the MPU 19 calculates sensitivity change values ($V_x'$, $V_y'$) by multiplying the calculated velocity values ($V_x$, $V_y$) by a predetermined weighting factor k (Step 209). Here, the weighting factor k is typically about 0.1, though not limited thereto.

$$V_x' = kV_x \tag{3}$$

$$V_y' = kV_y \tag{4}$$

Upon calculating the sensitivity change values ($V_x'$, $V_y'$), the MPU 19 transmits information on the sensitivity change values ($V_x'$, $V_y'$) to the control apparatus 40 via the transceiver 21 and the antenna 22 (Step 210). Upon receiving the information on the sensitivity change values ($V_x'$, $V_y'$) via the antenna 39 and the transceiver 38, the MPU 35 of the control apparatus 40 adds the sensitivity change values ($V_x'$, $V_y'$) to previous coordinate values (X(t−1), Y(t−1)) to thus generate new coordinate values (X(t), Y(t)). Then, based on the generated new coordinate values, the display control section 42 controls display so that the pointer 2 moves on the screen 3.

Upon transmitting the information on the sensitivity change values ($V_x'$, $V_y'$), the MPU 19 of the input apparatus 1 judges whether the sensitivity change period has passed since the generation of the determination command (Step 211). The sensitivity change period is a period during which the sensitivity change values ($V_x'$, $V_y'$) are transmitted and is typically 0.2 sec. However, the present invention is not limited thereto, and the sensitivity change period may be less than 0.2 sec or more than 0.2 sec.

When judged that the sensitivity change period has not passed since the generation of the determination command, the MPU 19 returns to Step 207 and repeats the processes of Steps 207 to 211.

When judged that the sensitivity change period has passed since the generation of the determination command (YES in Step 211), the MPU 19 returns to Step 201 and judges whether an input of an operation signal is started.

By the processing shown in FIG. 11, the movement of the pointer 2 can be desensitized during a predetermined time period since the generation of the determination command. As a result, it is possible to prevent, when the user presses the button 11 and a determination command is thus generated, an operation unintended by the user from being made, like a case where processing intended by the user is not executed on the screen 3. It is also possible to prevent the pointer 2 from moving on the screen 3 to make a move unintended by the user due to the input apparatus 1 being moved by an operation caused when the button 11 is pressed.

Figure 12:
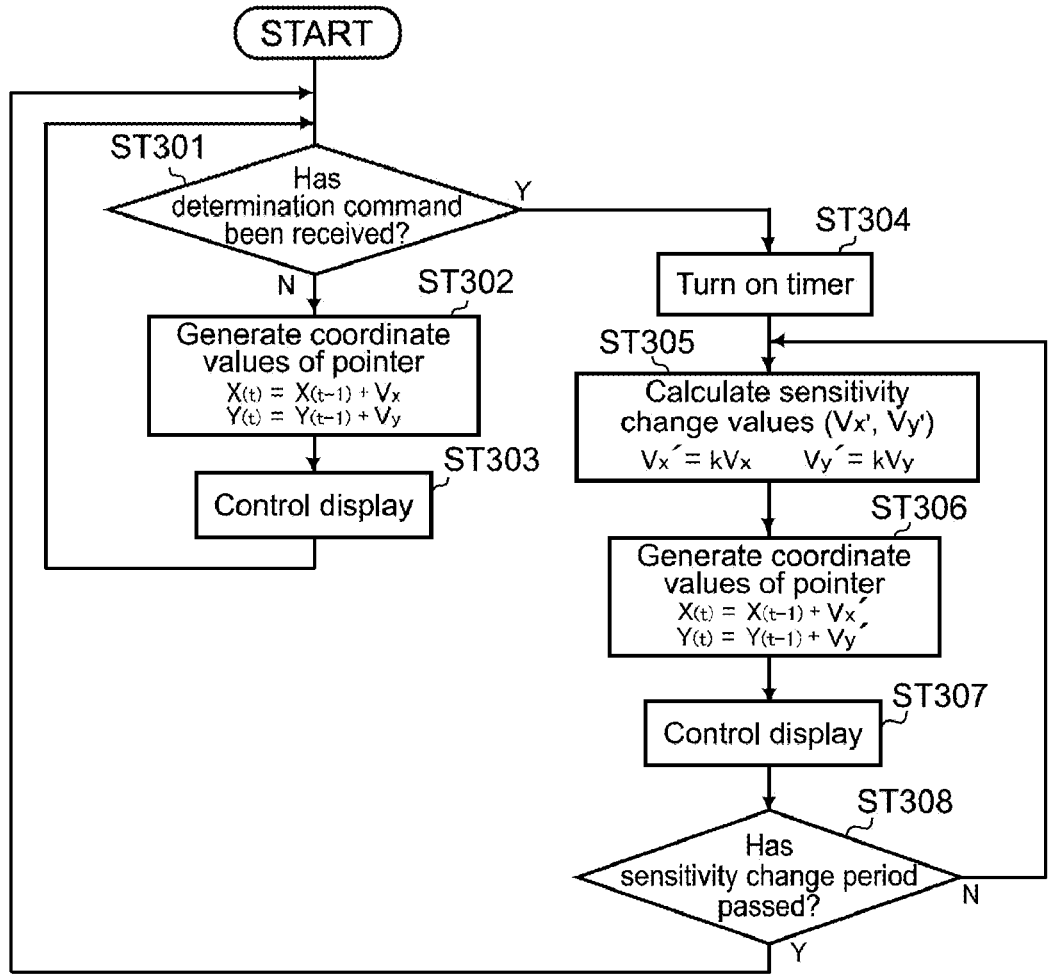
FIG. 12 is a flowchart showing a case where the control apparatus mainly controls a sensitivity of a movement of a pointer.

The processing shown in FIG. 11 may be mainly executed by the control apparatus 40. FIG. 12 is a flowchart showing a case where the control apparatus 40 mainly controls a sensitivity of a movement of the pointer 2.

As shown in FIG. 12, the MPU 35 of the control apparatus 40 judges whether a determination command has been received (Step 301). When the user has not operated the button 11 and a determination command is thus not received (NO in Step 301), the MPU 35 generates coordinate values (X(t), Y(t)) of the pointer 2 based on velocity values ($V_x$, $V_y$) transmitted from the input apparatus 1 (Step 302). Then, based on the generated coordinate values (X(t), Y(t)), the display control section 42 controls display so that the pointer 2 moves on the screen 3 (Step 303).

On the other hand, when the user operates the button 11 and a determination command is received from the input apparatus 1 (YES in Step 301), the MPU 35 turns on a timer and starts counting a sensitivity change period (Step 304). Upon turning on the timer, the MPU 35 calculates sensitivity change values ($V_x'$, $V_y'$) by multiplying the velocity values ($V_x$, $V_y$) transmitted from the input apparatus 1 by a weighting factor k (Step 305). The MPU 35 adds the sensitivity change values ($V_x'$, $V_y'$) to previous coordinate values (X(t−1), Y(t−1)) to thus generate new coordinate values (X(t), Y(t)) (Step 306). Then, based on the generated coordinate values (X(t), Y(t)), the display control section 42 controls display so that the pointer 2 moves on the screen 3 (Step 307).

Next, the MPU 35 judges whether the sensitivity change period has passed since the reception of the determination command (Step 308). When judged that the sensitivity change period has not passed (NO in Step 308), the MPU 35 repeats the processes of Steps 305 to 308. When judged that the sensitivity change period has passed since the reception of the determination command (YES in Step 308), the MPU 35 executes the processes of Step 301 and subsequent steps again.

The processing shown in FIG. 12 bears the same effect as the case where the input apparatus 1 controls the sensitivity of the movement of the pointer 2. It should be noted that also in embodiments to be described later, the control apparatus may mainly execute processing.

(Second Embodiment of Case where Sensitivity of Pointer Movement is Changed in Association with Operation Command)

Figure 13:
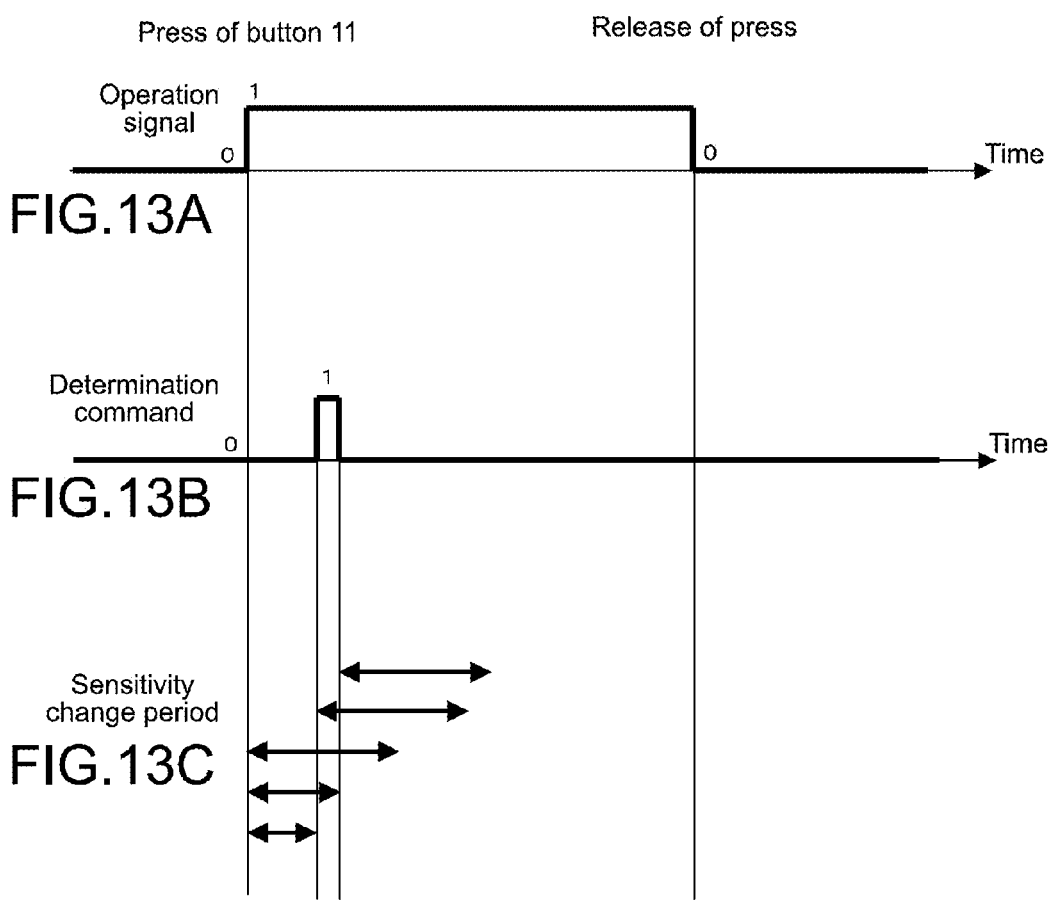
FIG. 13 are timing charts showing an operation of the input apparatus according to another embodiment of the present invention.

Next, a second embodiment of a case where the sensitivity of the pointer movement is changed in association with the operation command will be described. FIG. 13 are timing charts showing an operation of the input apparatus 1 according to this embodiment.

The above embodiment has described a case where the MPU 19 generates the determination command at a timing right after the input of the operation signal. On the other hand, in this embodiment, as shown in FIG. 13B, a determination command is generated at a timing at which a predetermined time period has passed since an input of an operation signal.

Sensitivity change periods shown in FIG. 13C will be described sequentially from an arrow on top.

(1) The MPU 19 starts calculating and transmitting sensitivity change values ($V_x'$, $V_y'$) with a return of a raised pulse of a determination command generated as a short-term pulse to a normal state (1→0) as a trigger. The MPU 19 repeats the calculation and transmission of the sensitivity change values ($V_x'$, $V_y'$) during the sensitivity change period.

(2) The MPU 19 starts calculating and transmitting sensitivity change values ($V_x'$, $V_y'$) with a rise of a determination command generated as a short-term pulse (0→1) as a trigger. The MPU 19 repeats the calculation and transmission of the sensitivity change values ($V_x'$, $V_y'$) during the sensitivity change period.

(3) The MPU 19 starts calculating and transmitting sensitivity change values ($V_x'$, $V_y'$) with a start of an input of an operation signal as a trigger. The MPU 19 repeats the calculation and transmission of the sensitivity change values ($V_x'$, $V_y'$) during the sensitivity change period. The sensitivity change period is a time period that is longer than a time period required for the MPU 19 to generate a determination command after the operation signal is input. It should be noted that it is also possible for the MPU 19 to start calculating and transmitting the sensitivity change values ($V_x'$, $V_y'$) after an elapse of a minute time (e.g., about 0.05 sec) since the operation signal is input, instead of starting the calculation and transmission of the sensitivity change values ($V_x'$, $V_y'$) right after the operation signal is input. This is because, as long as it is a minute time, no problem is caused.

(4) The MPU 19 starts calculating and transmitting sensitivity change values ($V_x'$, $V_y'$) with a start of an input of an operation signal as a trigger. The MPU 19 ends the calculation and transmission of the sensitivity change values ($V_x'$, $V_y'$) with a return of a raised pulse of a determination command to a normal state (1→0) as a trigger. In this case, there is no need to count the sensitivity change period. It should be noted that it is also possible for the MPU 19 to start calculating and transmitting the sensitivity change values ($V_x'$, $V_y'$) after an elapse of a minute time since the operation signal is input.

(5) The MPU 19 starts calculating and transmitting sensitivity change values ($V_x'$, $V_y'$) with a start of an input of an operation signal as a trigger. The MPU 19 ends the calculation and transmission of the sensitivity change values ($V_x'$, $V_y'$) with a rise of a pulse (0→1) as a trigger. It should be noted that the MPU 19 does not need to count the sensitivity change period. It is also possible for the MPU 19 to start calculating and transmitting the sensitivity change values ($V_x'$, $V_y'$) after an elapse of a minute time since an operation signal is input.

By the above items (1) to (5), the movement of the pointer 2 can be desensitized after a determination command is generated, before and after a determination command is generated, or until a determination command is generated (i.e., in temporal relation with generation timing of determination command). As a result, it is possible to prevent, when the user presses the button 11, an operation unintended by the user from being made, like a case where processing intended by the user is not executed on the screen 3. It is also possible to prevent the pointer 2 from moving on the screen due to the input apparatus 1 being moved by an operation caused when the button 11 is pressed.

(Third Embodiment of Case where Sensitivity of Pointer Movement is Changed in Association with Operation Command)

Next, a third embodiment of a case where the sensitivity of the pointer movement is changed in association with the operation command will be described. The above embodiments have described cases where the determination command is generated right after the input of the operation signal from the switch is started or after an elapse of a predetermined time period since the input of the operation signal. In this embodiment, a determination command is generated when an input of an operation signal from the switch is canceled.

Figure 14:
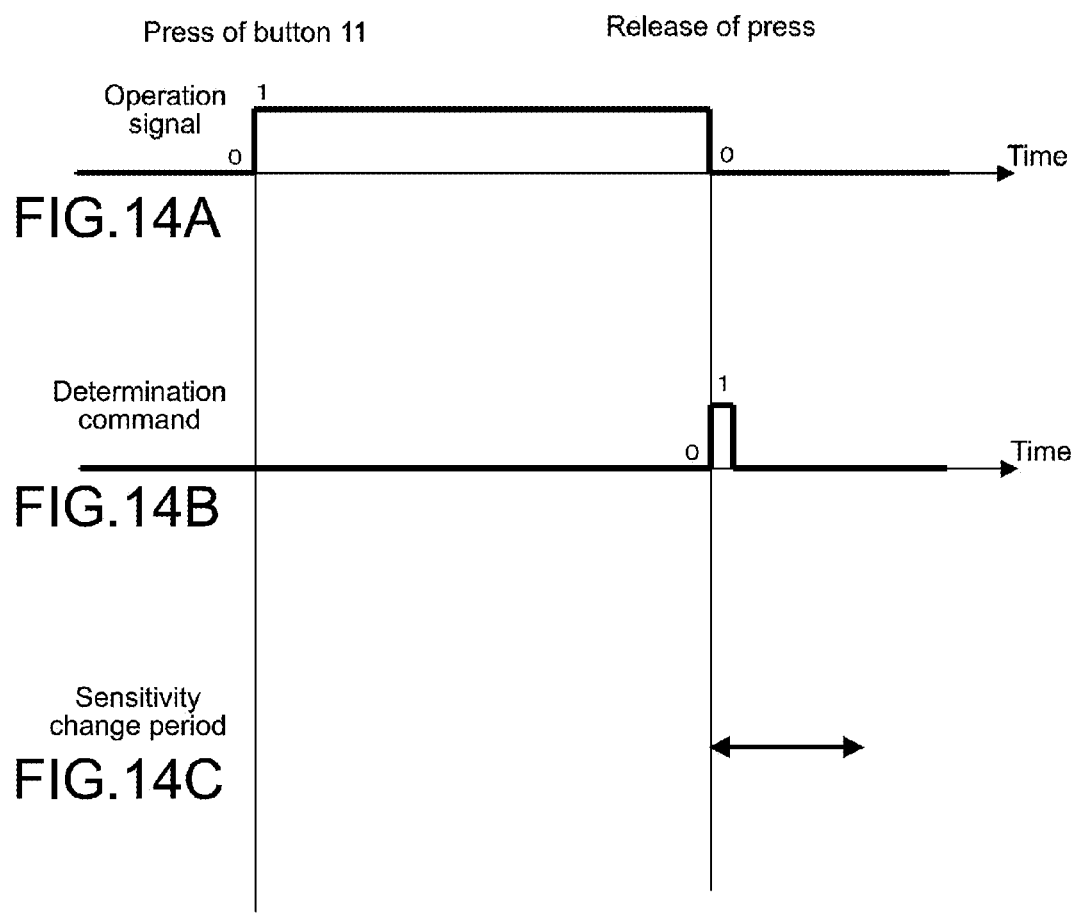
FIG. 14 are timing charts showing an operation of the input apparatus according to another embodiment of the present invention.

FIG. 14 are timing charts showing an operation of the input apparatus 1 according to this embodiment. As shown in FIG. 14B, the MPU 19 generates a determination command right after the user releases a press of the button 11 and an input of an operation signal is thus canceled.

As shown in FIG. 14, when the input of the operation signal is canceled and a determination command is generated, the MPU 19 starts counting a sensitivity change period. The sensitivity change period may be started with a rise of the determination command generated as a short-term pulse (0→1) as a trigger or may be started with a return of the raised pulse to a normal state (1→0) as a trigger. The MPU 19 calculates sensitivity change values ($V_x'$, $V_y'$) by multiplying the velocity values ($V_x$, $V_y$) by the weighting factor k and transmits information on the sensitivity change values ($V_x'$, $V_y'$) during the sensitivity change period.

Upon receiving the information on the sensitivity change values ($V_x'$, $V_y'$), the MPU 35 of the control apparatus 40 adds the sensitivity change values ($V_x'$, $V_y'$) to previous coordinate values (X(t−1), Y(t−1)) to thus generate new coordinate values (X(t), Y(t)). Then, based on the generated coordinate values (X(t), Y(t)), the display control section 42 controls display so that the pointer 2 moves on the screen 3.

As a result, it is possible to prevent, when the user releases the press of the button 11 and a determination command is generated, an operation unintended by the user from being made, like a case where processing intended by the user is not executed on the screen 3. It is also possible to prevent the pointer 2 from moving on the screen due to the input apparatus 1 being moved by an operation caused when the press of the button 11 is released.

(Fourth Embodiment of Case where Sensitivity of Pointer Movement is Changed in Association with Operation Command)

Figure 15:
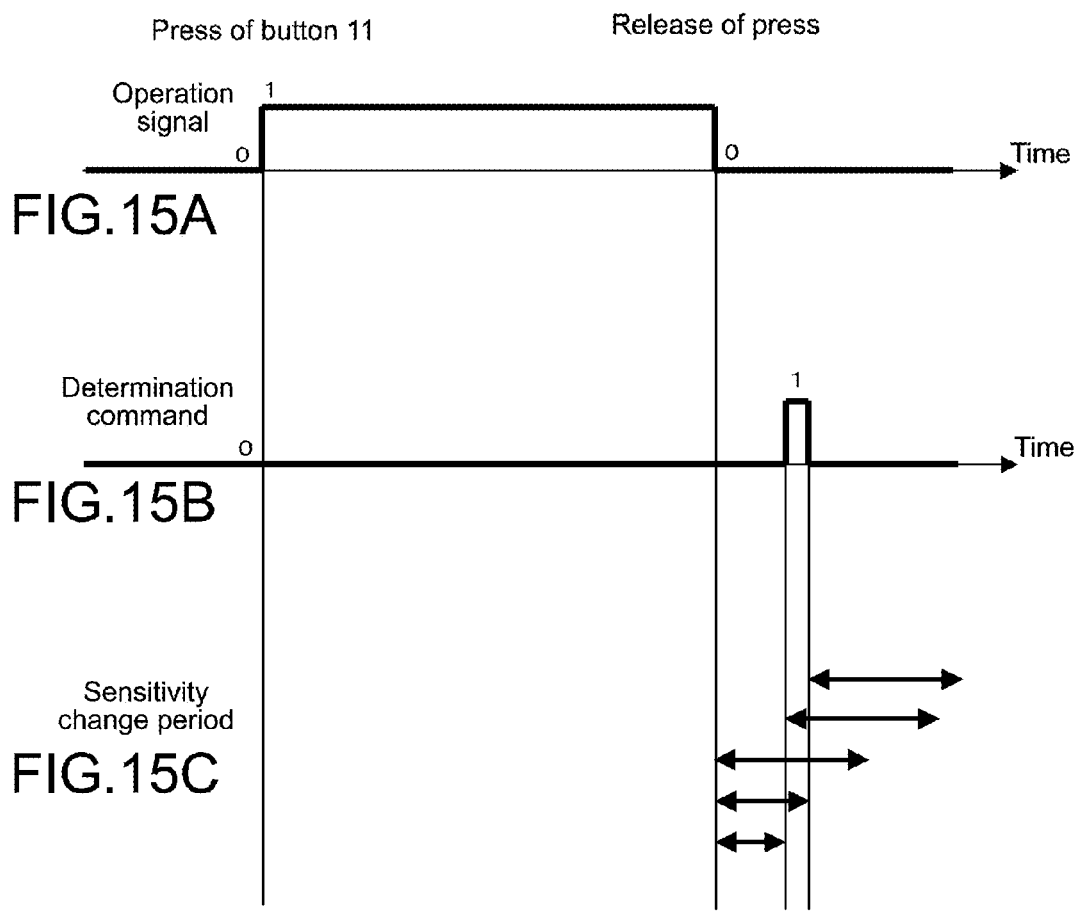
FIG. 15 are timing charts showing an operation of the input apparatus according to another embodiment of the present invention.

Next, a fourth embodiment of a case where the sensitivity of the pointer movement is changed in association with the operation command will be described. FIG. 15 are timing charts showing an operation of the input apparatus 1 according to this embodiment.

The third embodiment above has described a case where the MPU 19 generates a determination command right after the input of the operation signal from the switch is canceled. On the other hand, in this embodiment, as shown in FIG. 15B, a determination command is generated after an elapse of a predetermined time period since an input of an operation signal is canceled.

Sensitivity change periods shown in FIG. 15C will be described sequentially from an arrow on top.

(1) The MPU 19 starts calculating and transmitting sensitivity change values ($V_x'$, $V_y'$) with a return of a raised pulse of a determination command generated as a short-term pulse to a normal state (1→0) as a trigger. The MPU 19 repeats the calculation and transmission of the sensitivity change values ($V_x'$, $V_y'$) during the sensitivity change period.

(2) The MPU 19 starts calculating and transmitting sensitivity change values ($V_x'$, $V_y'$) with a rise of a determination command generated as a short-term pulse (0→1) as a trigger. The MPU 19 repeats the calculation and transmission of the sensitivity change values ($V_x'$, $V_y'$) during the sensitivity change period.

(3) The MPU 19 starts calculating and transmitting sensitivity change values ($V_x'$, $V_y'$) with a cancel of an input of an operation signal as a trigger. The MPU 19 repeats the calculation and transmission of the sensitivity change values ($V_x'$, $V_y'$) during the sensitivity change period. The sensitivity change period is a time period that is longer than a time period required for the MPU 19 to generate a determination command after the input of the operation signal is canceled. It should be noted that it is also possible for the MPU 19 to start calculating and transmitting the sensitivity change values ($V_x'$, $V_y'$) after an elapse of a minute time since the input of the operation signal is canceled, instead of starting the calculation and transmission of the sensitivity change values ($V_x'$, $V_y'$) right after the input of the operation signal is canceled.

(4) The MPU 19 starts calculating and transmitting sensitivity change values ($V_x'$, $V_y'$) with a cancel of an input of an operation signal as a trigger. The MPU 19 ends the calculation and transmission of the sensitivity change values ($V_x'$, $V_y'$) with a return of the raised pulse to a normal state (1→0) as a trigger. In this case, there is no need to count the sensitivity change period. It should be noted that it is also possible for the MPU 19 to start calculating and transmitting the sensitivity change values ($V_x'$, $V_y'$) after an elapse of a minute time since the input of the operation signal is canceled.

(5) The MPU 19 starts calculating and transmitting sensitivity change values ($V_x'$, $V_y'$) with a cancel of an input of an operation signal as a trigger. The MPU 19 ends the calculation and transmission of the sensitivity change values ($V_x'$, $V_y'$) with a rise of a pulse of a determination command (0→1) as a trigger. It should be noted that the MPU 19 does not need to count the sensitivity change period. It is also possible for the MPU 19 to start calculating and transmitting the sensitivity change values ($V_x'$, $V_y'$) after an elapse of a minute time since the input of the operation signal is canceled.

By the above items (1) to (5), the movement of the pointer 2 can be desensitized after a determination command is generated, before and after a determination command is generated, or until a determination command is generated. As a result, it is possible to prevent, when the user releases the press of the button 11 and a determination command is generated, an operation unintended by the user from being made, like a case where processing intended by the user is not executed on the screen 3. It is also possible to prevent the pointer 2 from moving on the screen due to the input apparatus 1 being moved by an operation caused when the press of the button 11 is released.

The processing of the input apparatus 1 may be executed by a combination of one of the processing of the MPU 19 described in the first and second embodiments above and one of the processing of the MPU 19 described in the third and fourth embodiments above.

(Embodiment of Stopping Pointer Movement in Association with Operation Command)

The above embodiments have described a case where the sensitivity of the movement of the pointer 2 is desensitized. On the other hand, in this embodiment, the movement of the pointer 2 is stopped. Therefore, that point will mainly be described. It should be noted that the movement of the pointer 2 may be stopped in any of the periods indicated by the arrows shown in the above embodiments (FIGS. 10C, 13C, 14C, and 15C or combination of those). This embodiment describes an example of a case where the movement of the pointer 2 is stopped during the period indicated by the arrow shown in FIG. 10C.

Figure 16:
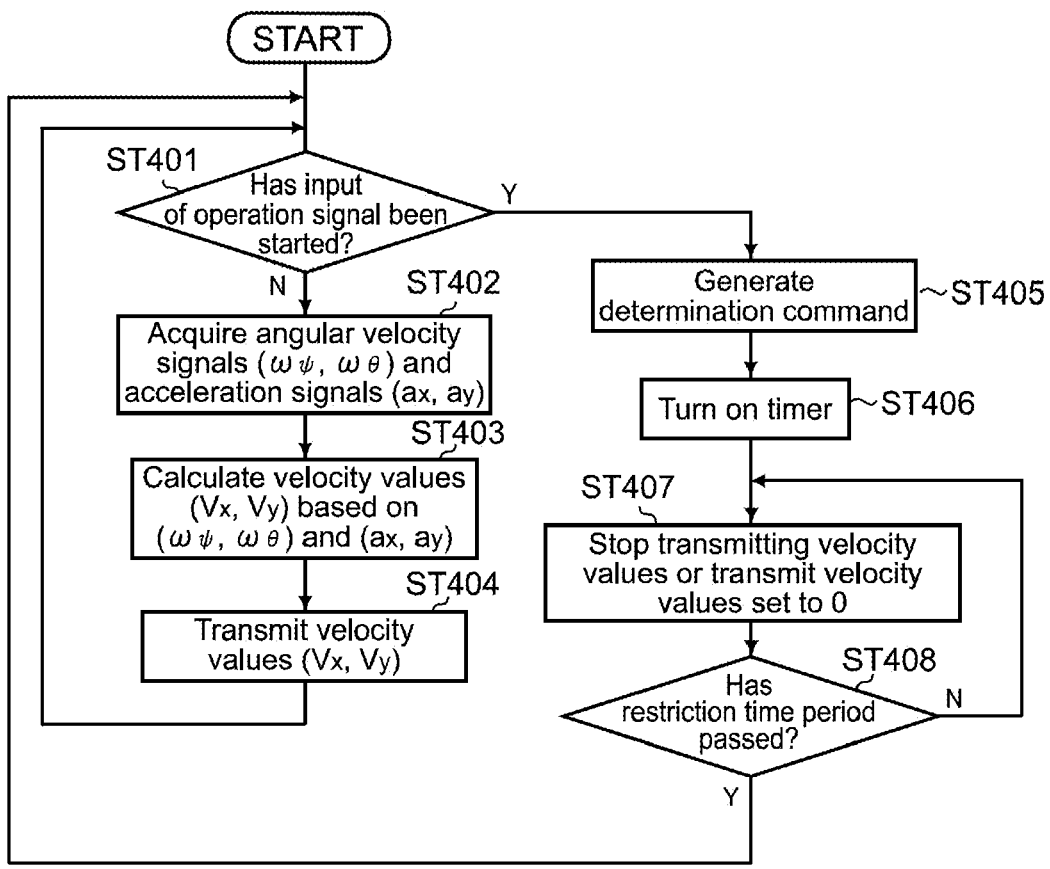
FIG. 16 is a flowchart showing an operation of the input apparatus according to another embodiment of the present invention.

FIG. 16 is a flowchart showing an operation of the input apparatus 1 according to this embodiment.

The MPU 19 judges whether an input of an operation signal is started (Step 401). When the user has not started pressing the button 11 and the input of an operation signal is not yet started (NO in Step 401), the MPU 19 acquires angular velocity values ($\omega_\psi$, $\omega_\theta$) and acceleration values ($a_x$, $a_y$) (Step 402). Based on the acquired angular velocity values ($\omega_\psi$, $\omega_\theta$) and acceleration values ($a_x$, $a_y$), the MPU 19 calculates velocity values ($V_x$, $V_y$) (Step 403) and transmits the calculated velocity values ($V_x$, $V_y$) (Step 404).

When the user starts pressing the button 11 and the input of an operation signal is thus started (YES in Step 401), the MPU 19 generates a determination command (Step 405). Upon generating the determination command, the MPU 19 turns on the timer and starts counting a restriction time period (Step 406). The restriction time period used herein is a time period during which the movement of the pointer 2 is stopped since the generation of the determination command. The restriction time period is typically 0.2 sec, but is not limited thereto. It should be noted that the restriction time period may be started with a rise of a determination command generated as a short-term pulse (0→1) as a trigger or may be started with a return of a raised pulse to a normal state (1→0) as a trigger.

Upon turning on the timer, the MPU 19 stops transmitting the velocity values ($V_x$, $V_y$) (Step 407). The MPU 19 may alternatively transmit the velocity values ($V_x$, $V_y$) set to 0 to the control apparatus 40. Next, the MPU 19 judges whether the restriction time period has passed (Step 408). When judged that the restriction time period has not passed (NO in Step 408), the MPU 19 keeps the transmission of the velocity values ($V_x$, $V_y$) stopped or transmits the velocity values set to 0 to the control apparatus 40.

When judged that the restriction time period has passed since the generation of the determination command (YES in Step 408), the MPU 19 starts transmitting the velocity values ($V_x$, $V_y$) (NO in Step 401 to Step 404).

Since the movement of the pointer 2 is restricted when the determination command is generated by the processing as described above, it is possible to prevent an operation unintended by the user from being made, like a case where processing intended by the user is not executed on the screen 3. It is also possible to prevent the pointer 2 from moving on the screen 3 due to the input apparatus 1 being moved by an operation caused when the press of the button 11 is started. It should be noted that since transmission of information on the velocity values ($V_x$, $V_y$) is started after an elapse of the restriction time period since the generation of the determination command in this embodiment, drag processing can be executed, for example.

Figure 17:
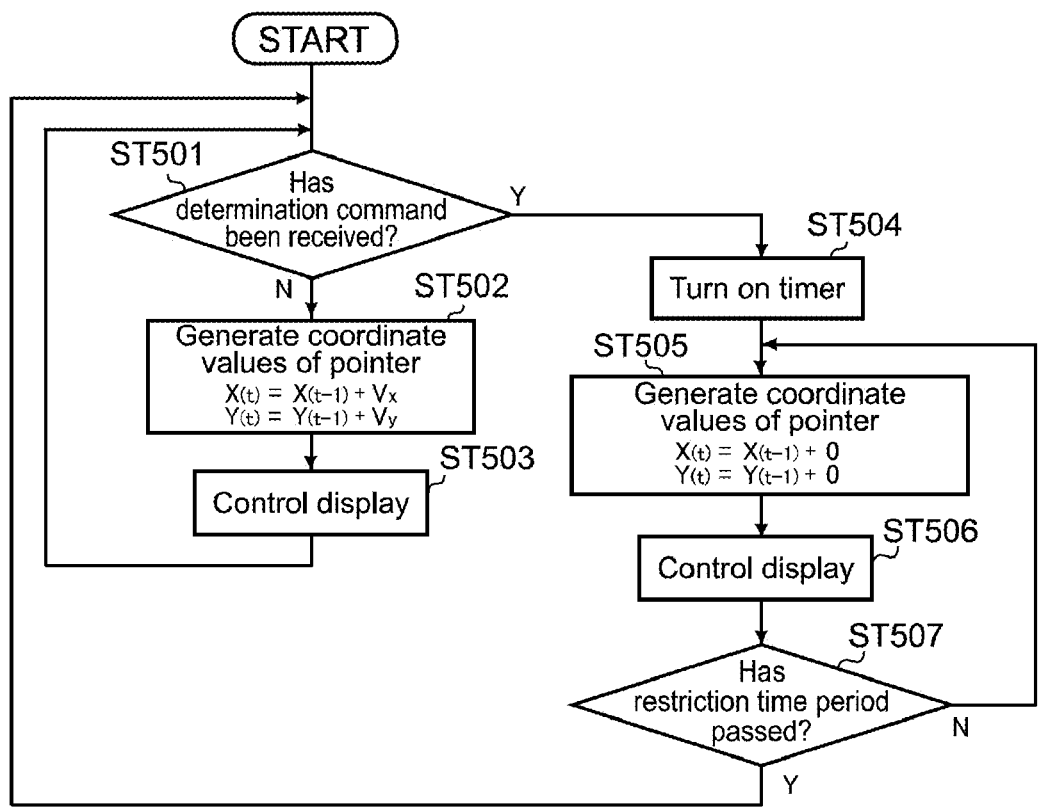
FIG. 17 is a flowchart showing a case where the control apparatus mainly controls the sensitivity of the movement of the pointer.

The processing shown in FIG. 16 may be mainly executed by the control apparatus 40. FIG. 17 is a flowchart showing an operation of the control apparatus 40.

The MPU 35 of the control apparatus 40 judges whether a determination command has been received (Step 501). When the user has not operated the button 11 and a determination command is not yet received (NO in Step 501), the MPU 35 adds the velocity values ($V_x$, $V_y$) transmitted from the input apparatus 1 to previous coordinate values (X(t−1), Y(t−1)) to thus generate new coordinate values (X(t), Y(t)) (Step 502). Then, based on the generated coordinate values, the display control section 42 controls display so that the pointer 2 moves on the screen 3 (Step 503).

When the user operates the button 11 and a determination command is received from the input apparatus 1 (YES in Step 501), the MPU 35 turns on the timer and starts counting the restriction time period (Step 504). Upon turning on the timer, the MPU 35 adds 0 (0, 0) to the previous coordinate values (X(t−1), Y(t−1)) to thus generate new coordinate values (X(t), Y(t)) (Step 505). In this case, the velocity values ($V_x$, $V_y$) transmitted from the input apparatus 1 are not used in generating the coordinate values (X(t), Y(t)). Then, based on the generated coordinate values (X(t), Y(t)), the display control section 42 controls display of the pointer 2 (Step 506).

Next, the MPU 35 judges whether the restriction time period has passed since the reception of the determination command (Step 507). When judged that the restriction time period has not passed (NO in Step 507), the MPU 35 adds 0 to the previous coordinate values (X(t−1), Y(t−1)) again to thus generate new coordinate values (X(t), Y(t)). When judged that the restriction time period has passed since the reception of the determination command (YES in Step 507), the MPU 35 judges whether a determination command has been received again.

The processing described above bears the same effect as the case where the input apparatus 1 mainly controls the restriction time period.

In the above description, the case where the movement of the pointer 2 is stopped during the period indicated by the arrow shown in FIG. 10C has been described as an example of the embodiment of stopping the movement of the pointer 2. However, the present invention is not limited thereto, and the movement of the pointer 2 may be stopped during any of the periods shown in FIGS. 13C, 14C, and 15C or a combination of those periods. In this case, it is of course possible for the control apparatus 40 to mainly execute the processing.

(Embodiments of Changing Sensitivity of Pointer Movement in Association with Operation Signal)

(First Embodiment of Case where Sensitivity of Pointer Movement is Changed in Association with Operation Signal)

The above embodiments have described cases where a sensitivity of a pointer movement is changed (or stopped) in association with an operation command. In this and subsequent embodiments, a sensitivity of a pointer movement is changed in association with an operation signal.

Figure 18:
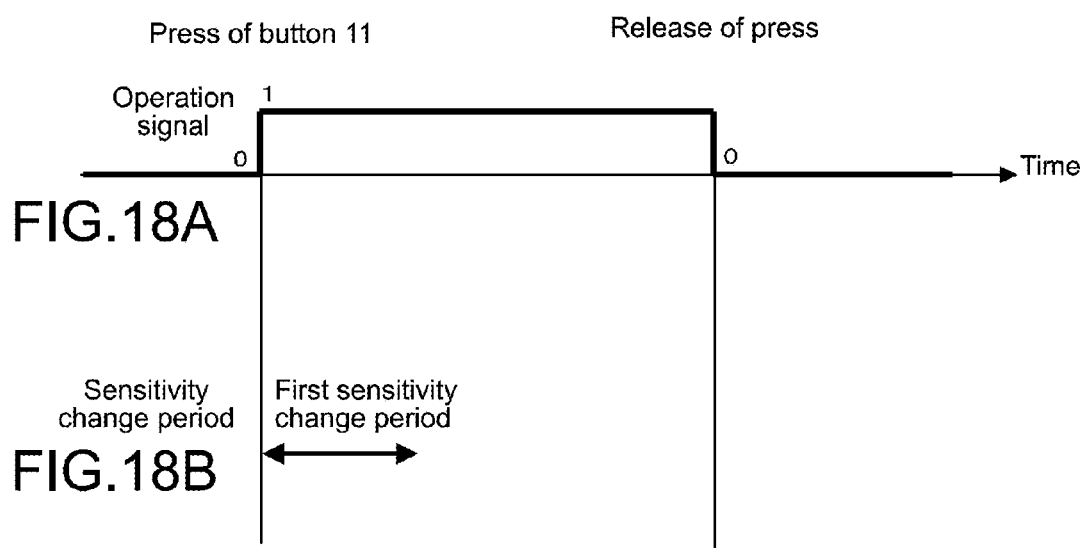
FIG. 18 are timing charts showing an operation of the input apparatus according to another embodiment of the present invention.

FIG. 18 are timing charts showing an operation of the input apparatus 1 according to this embodiment. FIG. 18A shows an output of an operation signal at a time the button 11 is pressed, and FIG. 18B shows a sensitivity change period. It should be noted that in descriptions below, a sensitivity change period that starts after an operation signal is input is described as a first sensitivity change period, whereas a sensitivity change period that starts after the input of the operation signal is canceled is described as a second sensitivity change period.

Figure 19:
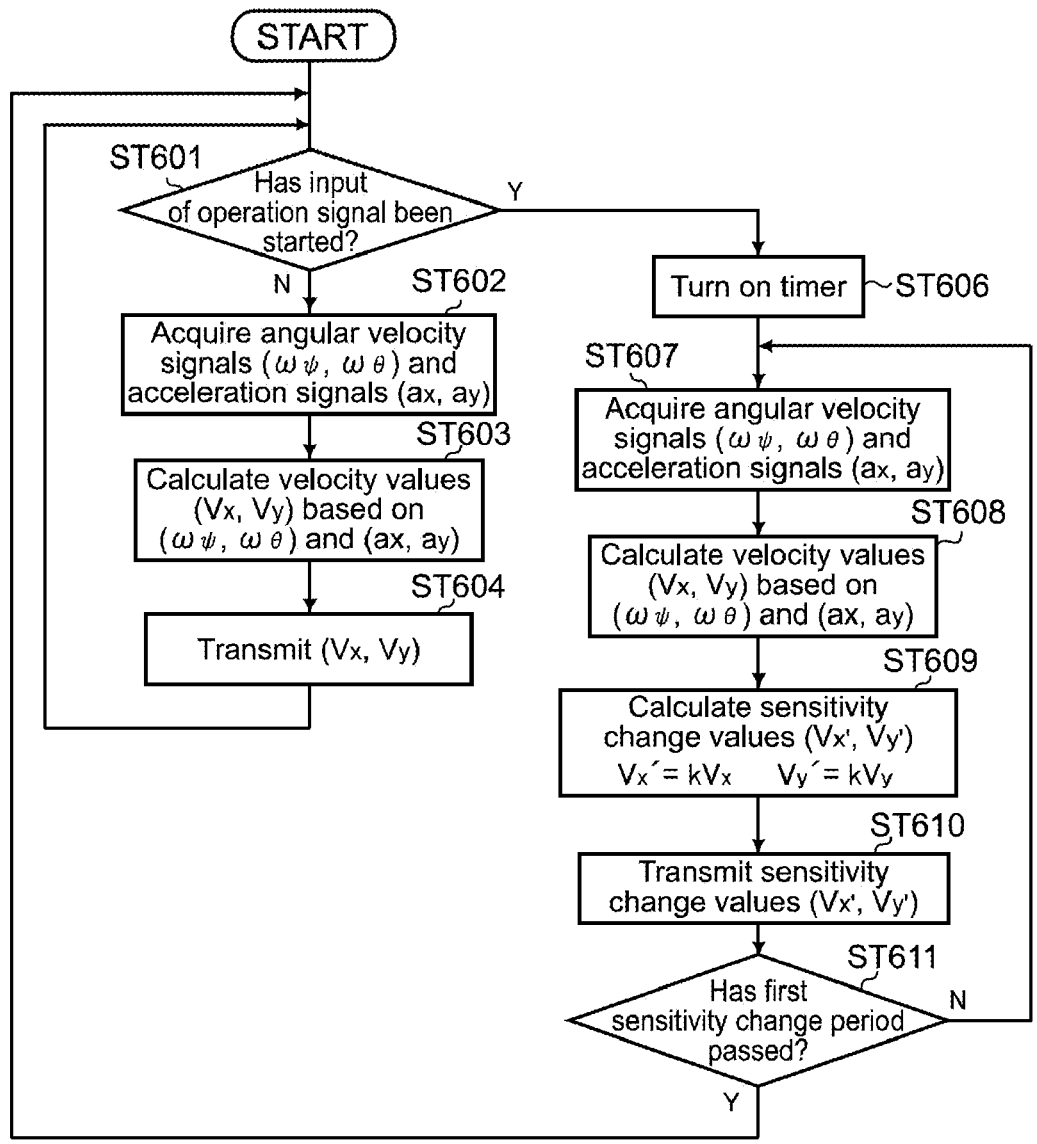
FIG. 19 is a flowchart showing an operation of the input apparatus according to another embodiment of the present invention.

FIG. 19 is a flowchart showing an operation of the input apparatus 1 according to this embodiment. As shown in FIG. 19, the MPU 19 judges whether an operation signal has been input (Step 601). When the user has not started pressing the button 11 and the input of an operation signal is not yet started (NO in Step 601), the MPU 19 calculates velocity values ($V_x$, $V_y$) and transmits information on the velocity values ($V_x$, $V_y$) (Steps 602 to 604).

When the user starts pressing the button 11 and the input of an operation signal from the switch is started (YES in Step 601), the MPU 19 turns on the timer and starts counting the first sensitivity change period (Step 606) (see FIG. 18B). In other words, irrespective of whether a determination command is generated or not, the MPU 19 starts counting the first sensitivity change period with the input of the operation signal as a trigger. The first sensitivity change period is typically 0.2 sec, but is not limited thereto. It should be noted that the first sensitivity change period may be started right after the input of the operation signal is started or may be started after an elapse of a minute time since the start of the input of the operation signal.

Upon turning on the timer, the MPU 19 calculates sensitivity change values ($V_x'$, $V_y'$) by multiplying the calculated velocity values ($V_x$, $V_y$) by a predetermined weighting factor k and transmits the sensitivity change values ($V_x'$, $V_y'$) (Steps 607 to 610). Upon receiving the sensitivity change values ($V_x'$, $V_y'$), the MPU 35 of the control apparatus 40 adds the sensitivity change values ($V_x'$, $V_y'$) to previous coordinate values (X(t−1), Y(t−1)) to thus generate new coordinate values (X(t), Y(t)). Then, based on the new coordinate values (X(t), Y(t)), the display control section 42 controls display so that the pointer 2 moves on the screen 3.

Upon transmitting the sensitivity change values ($V_x'$, $V_y'$), the MPU 19 of the input apparatus 1 judges whether the first sensitivity change period has passed (Step 611). When judged that the first sensitivity change period has not passed (NO in Step 611), the MPU 19 repeats the processes of Steps 607 to 611. When judged that the first sensitivity change period has passed (YES in Step 611), the MPU 19 executes the processes of Step 601 and subsequent steps.

As a result, it is possible to prevent the pointer 2 from moving on the screen 3 due to the input apparatus 1 being moved when the button 11 is pressed. It is also possible to prevent, when a determination command is generated at a time an operation signal is input, an operation unintended by the user from being made, like a case where processing intended by the user is not executed on the screen 3.

Figure 20:
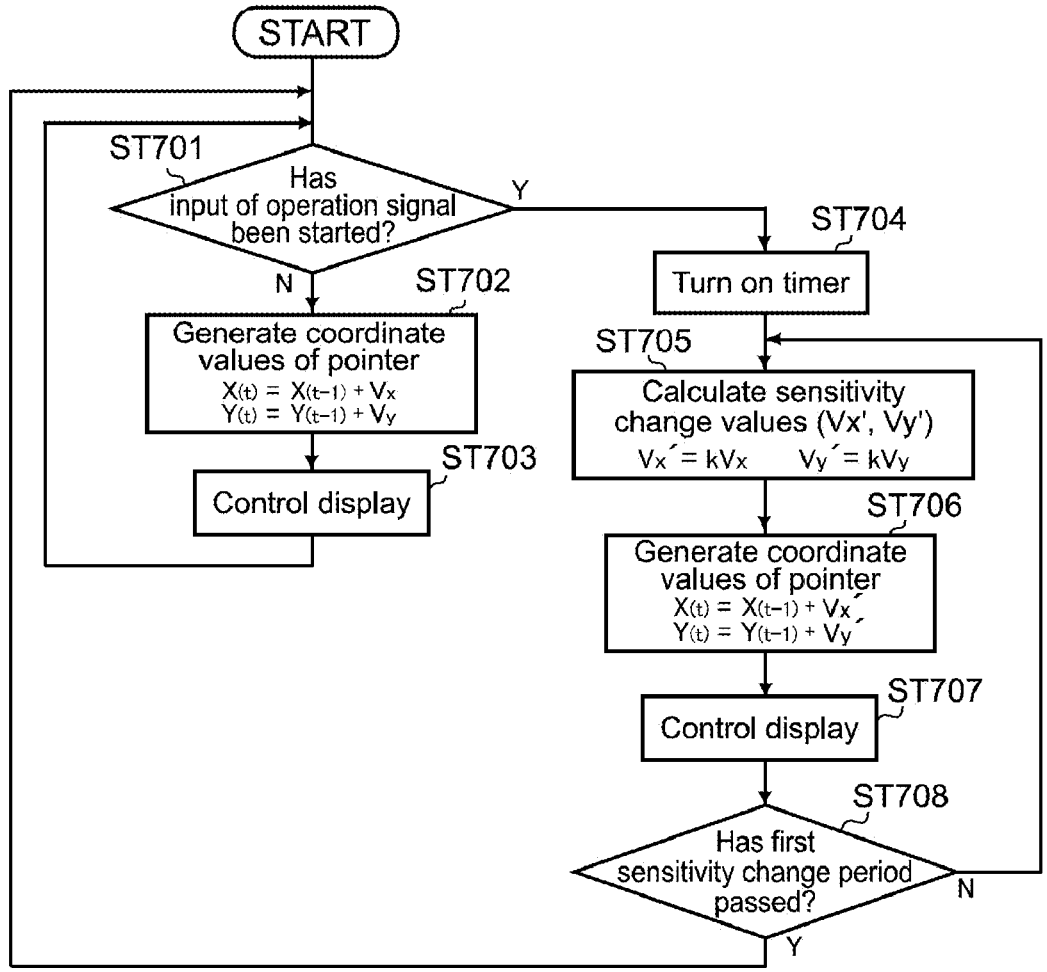
FIG. 20 is a flowchart showing a case where the control apparatus mainly controls the sensitivity of the movement of the pointer.

The processing shown in FIG. 19 may be mainly executed by the control apparatus 40. FIG. 20 is a flowchart showing an operation of the control apparatus 40.

As shown in FIG. 20, the MPU 35 of the control apparatus 40 judges whether an input of an operation signal is started (Step 701). When an operation signal is not transmitted from the input apparatus 1 and an input of an operation signal is not yet started (NO in Step 701), the MPU 35 generates coordinate values (X(t), Y(t)) of the pointer 2 based on velocity values ($V_x$, $V_y$) transmitted from the input apparatus 1 (Step 702). Then, based on the generated coordinate values (X(t), Y(t)), the display control section 42 controls display so that the pointer 2 moves on the screen 3 (Step 703).

When the user starts pressing the button 11, transmission of an operation signal from the input apparatus 1 is started. The control apparatus 40 receives the operation signal via the antenna 39 and the transceiver 38, and the operation signal is input to the MPU 35. When the input of the operation signal is started (YES in Step 701), the MPU 35 turns on the timer and starts counting the first sensitivity change period (Step 704).

Upon turning on the timer, the MPU 35 calculates sensitivity change values ($V_x'$, $V_y'$) by multiplying the velocity values ($V_x$, $V_y$) transmitted from the input apparatus 1 by the weighting factor k (Step 705). The MPU 35 adds the sensitivity change values ($V_x'$, $V_y'$) to previous coordinate values (X(t−1),Y(t−1)) to thus generate new coordinate values (X(t), Y(t)) (Step 706). Then, based on the generated coordinate values (X(t), Y(t)), the display control section 42 controls display so that the pointer 2 moves on the screen 3 (Step 707).

Next, the MPU 35 judges whether the first sensitivity change period has passed since the start of the input of the operation signal (Step 708). When judged that the first sensitivity change period has not passed (NO in Step 708), the MPU 35 repeats the processes of Steps 705 to 708. When judged that the first sensitivity change period has passed (YES in Step 708), the MPU 35 executes the processes of Step 701 and subsequent steps again.

The processing shown in FIG. 20 bears the same effect as the case where the input apparatus 1 controls the sensitivity of the movement of the pointer 2. It should be noted that also in embodiments to be described later in which a sensitivity of a pointer movement is changed in association with an operation signal, the control apparatus 40 may mainly execute the processing.

(Second Embodiment of Case where Sensitivity of Pointer Movement is Changed in Association with Operation Signal)

Next, a second embodiment of a case where the sensitivity of the pointer movement is changed in association with the operation signal will be described. In this embodiment, the second sensitivity change period is started with a cancel of an input of an operation signal as a trigger.

Figure 21:
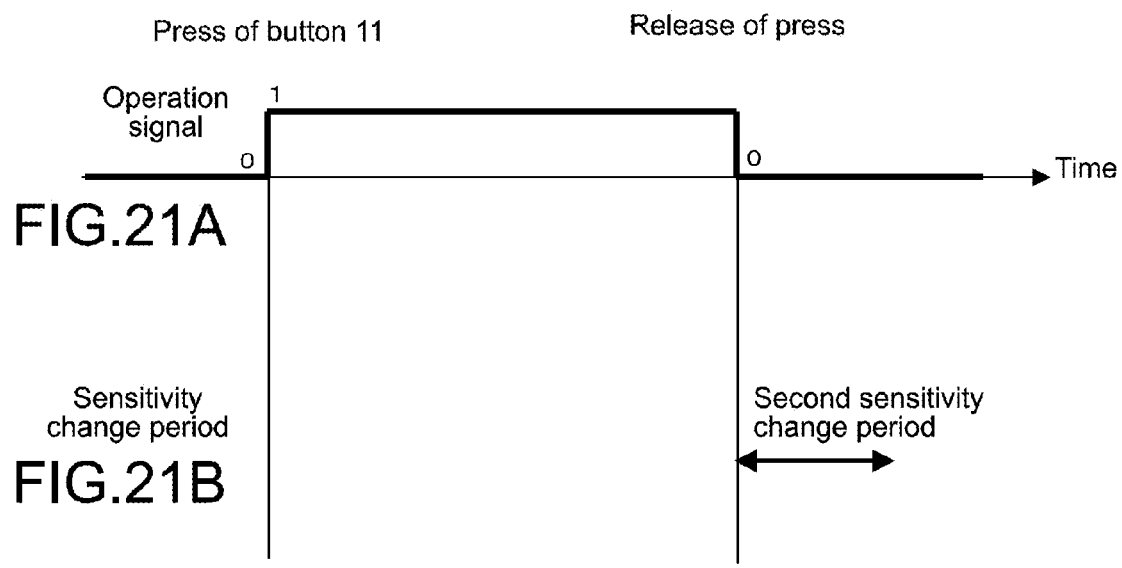
FIG. 21 are timing charts showing an operation of the input apparatus according to another embodiment of the present invention.

FIG. 21 are timing charts showing an operation of the input apparatus 1 according to this embodiment.

As shown in FIG. 21, the MPU 19 judges whether an input of an operation signal has been canceled. When judged that the input of the operation signal has been canceled, the MPU 19 starts calculating and transmitting sensitivity change values ($V_x'$, $V_y'$). The MPU 19 repeats the calculation and transmission of the sensitivity change values ($V_x'$, $V_y'$) during the second sensitivity change period. The second sensitivity change period is typically 0.2 sec, but is not limited thereto. The second sensitivity change period may either be the same as or different from the first sensitivity change period. It should be noted that the MPU 19 may start calculating and transmitting sensitivity change values ($V_x'$, $V_y'$) after an elapse of a minute time since an input of an operation signal.

As a result, it is possible to prevent the pointer 2 from moving on the screen 3 due to the input apparatus 1 being moved when the press of the button 11 is released. It is also possible to prevent, when a determination command is generated at a time an input of an operation signal is canceled, an operation unintended by the user from being made, like a case where processing intended by the user is not executed on the screen 3.

(Third Embodiment of Case where Sensitivity of Pointer Movement is Changed in Association with Operation Signal)

Next, a third embodiment of a case where the sensitivity of the pointer movement is changed in association with the operation signal will be described. In this embodiment, a sensitivity of a movement of the pointer 2 is changed during the first sensitivity change period that starts after an operation signal is input and the second sensitivity change period that starts after the input of the operation signal is canceled.

Figure 22:
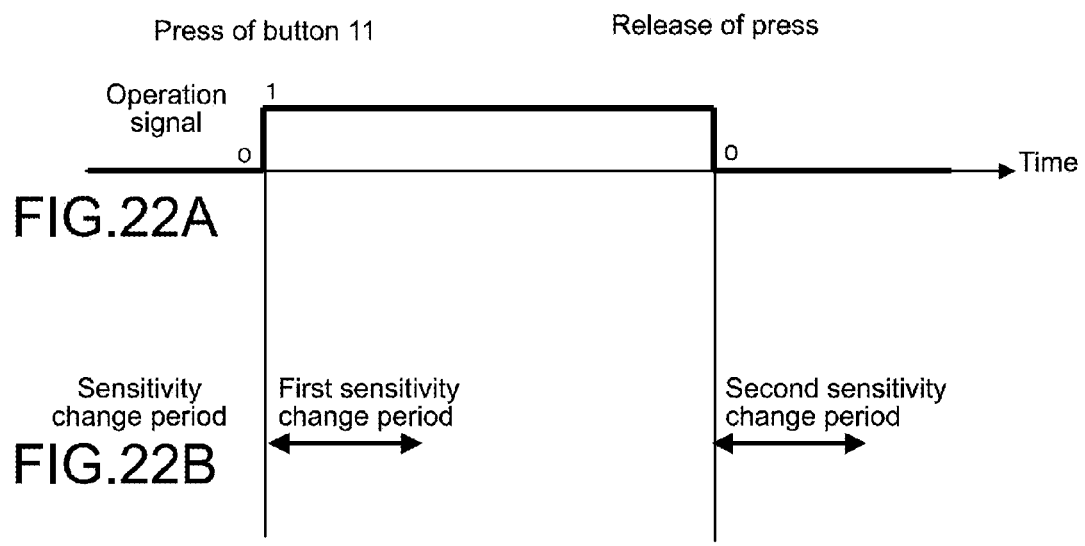
FIG. 22 are timing charts showing an operation of the input apparatus according to another embodiment of the present invention.
Figure 23:
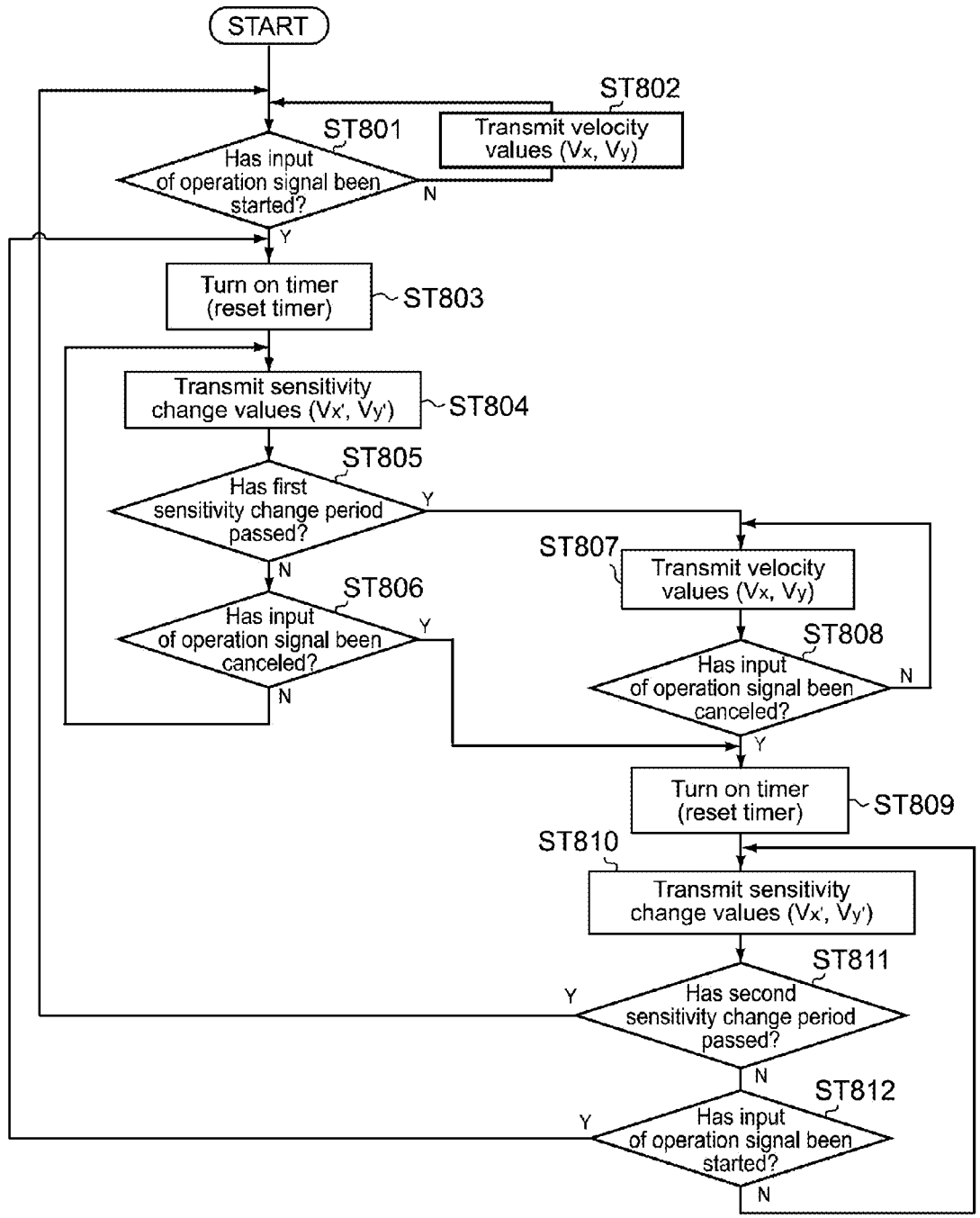
FIG. 23 is a flowchart showing an operation of the input apparatus according to another embodiment of the present invention.

FIG. 22 are timing charts showing an operation of the input apparatus 1 according to this embodiment. FIG. 23 is a flowchart showing an operation of the input apparatus 1 according to this embodiment.

The MPU 19 judges whether an input of an operation signal is started (Step 801). When the user has not started pressing the button 11 and the input of an operation signal is not yet started (NO in Step 801), the MPU 19 transmits information on velocity values ($V_x$,$V_y$) calculated based on angular velocity values ($\omega_\psi$, $\omega_\theta$) and acceleration values ($a_x$, $a_y$) (Step 802).

When the user starts pressing the button 11 and the input of an operation signal is thus started (YES in Step 801), the MPU 19 turns on the timer and starts counting the first sensitivity change period (Step 803). Next, the MPU 19 calculates sensitivity change values ($V_x'$, $V_y'$) by multiplying the velocity values ($V_x$, $V_y$) calculated based on the angular velocity values ($\omega_\psi$, $\omega_\theta$) and the acceleration values ($a_x$, $a_y$) by the weighting factor k and transmits the calculated sensitivity change values ($V_x'$, $V_y'$) (Step 804).

Upon transmitting the sensitivity change values ($V_x'$, $V_y'$), the MPU 19 judges whether the first sensitivity change period has passed (Step 805). When judged that the first sensitivity change period has not passed (NO in Step 805), the MPU 19 judges whether the input of the operation signal has been canceled (Step 806). When the user has not released the press of the button 11 and the input of the operation signal is thus not canceled (NO in Step 806), the MPU 19 transmits the sensitivity change values ($V_x'$, $V_y'$) again.

When the first sensitivity change period passes without the input of the operation signal being canceled (NO in Step 806) (YES in Step 805), the MPU 19 transmits information on the velocity values ($V_x$,$V_y$) (Step 807). In other words, when the user continues pressing the button 11 for a time period equal to or longer than the first sensitivity change period, the MPU 19 switches from transmission of sensitivity change values ($V_x'$, $V_y'$) to transmission of velocity values ($V_x$, $V_y$).

Upon transmitting the information on the velocity values ($V_x$, $V_y$), the MPU 19 judges whether the input of the operation signal has been canceled (Step 808). When the user has not released the press of the button 11 and the input of the operation signal is thus not canceled (NO in Step 808), the MPU 19 transmits the velocity values ($V_x$, $V_y$) again. On the other hand, when the user releases the press of the button 11 and the input of the operation signal is thus canceled (YES in Step 808), the MPU 19 turns on the timer and starts counting the second sensitivity change period (Step 809).

Here, when the input of the operation signal is canceled during the first sensitivity change period (NO in Step 805) (YES in Step 806), the MPU 19 resets the timer and starts counting the second sensitivity change period (Step 809). In other words, when the user starts pressing the button 11 and releases the press of the button 11 within the first sensitivity change period, the MPU 19 starts counting the second sensitivity change period.

Upon turning on the timer, the MPU 19 transmits the sensitivity change values ($V_x'$, $V_y'$) calculated by multiplying the velocity values ($V_x$, $V_y$) by the weighting factor k (Step 810). Upon transmitting the sensitivity change values ($V_x'$, $V_y'$), the MPU 19 judges whether the second sensitivity change period has passed (Step 811). When judged that the second sensitivity change period has not passed (NO in Step 811), the MPU 19 judges whether an input of an operation signal is started (Step 812). When judged that the input of an operation signal is not started (NO in Step 812), the MPU 19 transmits the sensitivity change values ($V_x'$, $V_y'$) again (Step 810).

When the second sensitivity change period passes without an input of an operation signal being started (NO in Step 812) (YES in Step 811), the MPU 19 returns to Step 801 and judges whether an input of an operation signal is started. When judged that the input of an operation signal is not yet started, the MPU 19 transmits velocity values. In other words, when the second sensitivity change period passes without the user starting to press the button 11, the MPU 19 switches from transmission of sensitivity change values ($V_x'$, $V_y'$) to transmission of velocity values ($V_x$, $V_y$).

When the input of an operation signal is started within the second sensitivity change period (NO in Step 811) (YES in Step 812), the MPU 19 resets the timer and starts counting the first sensitivity change period (Step 803). In other words, when the user releases the press of the button 11 and starts re-pressing the button 11 within the second sensitivity change period, the MPU 19 starts counting the first sensitivity change period.

As a result, by the processing shown in FIGS. 22 and 23, it is possible to prevent the pointer 2 from moving on the screen 3 due to the input apparatus 1 being moved at a time the press of the button 11 is started and a time the press of the button 11 is released. It is also possible to prevent processing unintended by the user from being made even when a determination command is generated by the input apparatus 1 at a time an input of an operation signal is started or even when a determination command is generated by the input apparatus 1 at a time an input of an operation signal is canceled.

(Fourth Embodiment of Case where Sensitivity of Pointer Movement is Changed in Association with Operation Signal)

Figure 24:
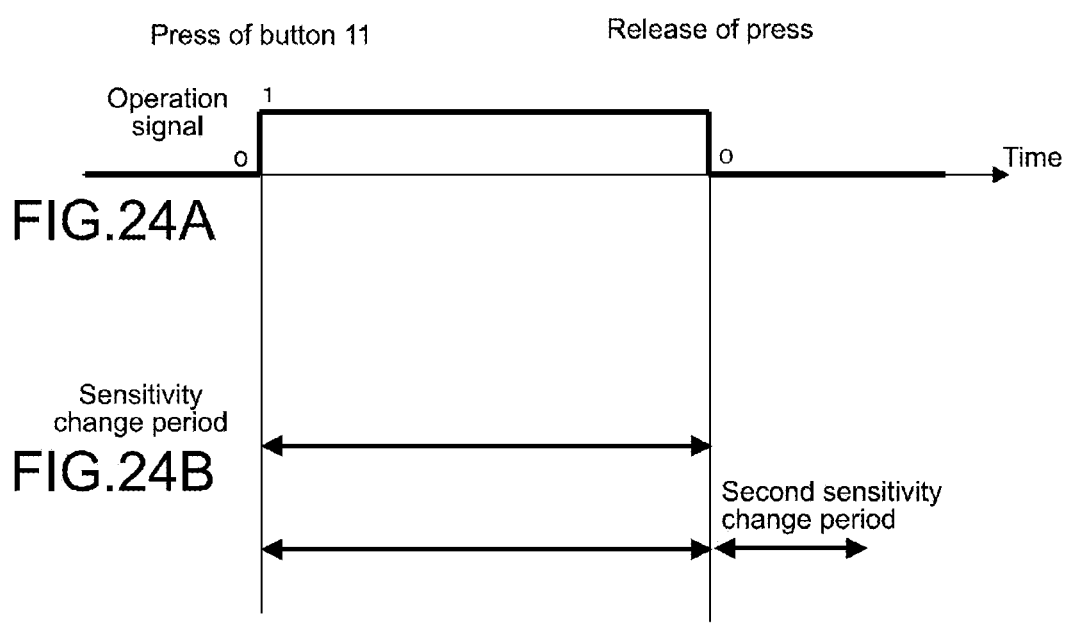
FIG. 24 are timing charts showing an operation of the input apparatus according to another embodiment of the present invention.

Next, a fourth embodiment of a case where the sensitivity of the pointer movement is changed in association with the operation signal will be described. FIG. 24 are timing charts showing an operation of the input apparatus 1 according to this embodiment.

First, a sensitivity change period indicated by an arrow on top in FIG. 24B will be described. In this case, the sensitivity change period is started with an input of an operation signal as a trigger and ended with a cancel of the input of the operation signal as a trigger. The MPU 19 judges whether an input of an operation signal is started, and when judged that the input of the operation signal is started, starts calculating and transmitting sensitivity change values ($V_x'$, $V_y'$). The MPU 19 judges whether the input of the operation signal has been canceled, and when judged that the input of the operation signal has been canceled, ends the calculation and transmission of the sensitivity change values ($V_x'$, $V_y'$).

By the processing as described above, the sensitivity of the movement of the pointer 2 is desensitized from a time the user starts pressing the button 11 to a time the user releases the press of the button 11. As a result, it is possible to prevent the pointer 2 from making a move unintended by the user from a time the user starts pressing the button 11 to a time the user releases the press of the button 11. It is also possible to prevent, when a determination command is generated at a time an input of an operation signal is canceled, an operation unintended by the user from being made, like a case where processing intended by the user is not executed on the screen 3.

Next, a sensitivity change period indicated by an arrow at the bottom of FIG. 24B will be described. In this case, a time period from a time an input of an operation signal is started to a time the input of the operation signal is canceled and a time period from the time the input of the operation signal is canceled to a time the second sensitivity change period ends correspond to time periods during which a sensitivity of the movement of the pointer 2 is changed.

The MPU 19 judges whether an input of an operation signal is started, and when judged that the input of an operation signal is started, starts calculating and transmitting sensitivity change values ($V_x'$, $V_y'$). The MPU 19 judges whether the input of the operation signal has been canceled, and when judged that the input of the operation signal has been canceled, repeats the calculation and transmission of the sensitivity change values ($V_x'$, $V_y'$) during the second sensitivity change period after the input of the operation signal is canceled. As a result, it is possible to prevent, when the input apparatus 1 generates a determination command at a time an input of an operation signal is canceled, for example, an operation unintended by the user from being made, like a case where processing intended by the user is not executed on the screen 3.

It should be noted that in the processing described with reference to FIG. 24, the movement of the pointer 2 can be desensitized during a period from a time the button 11 is pressed to a time the press of the button 11 is released. Therefore, for example, by press-and-holding the button 11 when the user does not want the pointer 2 to move so much, the movement of the pointer 2 can be desensitized while the button 11 is being pressed. Hereinafter, a button that has such a function that enables the user to arbitrarily control the movement of the pointer 2 will be referred to as movement control button. In this embodiment, the button 11 can be provided with both the function as a determination button (function corresponding to left button of mouse) and the function as the movement control button.

(Fifth Embodiment of Case where Sensitivity of Pointer Movement is Changed in Association with Operation Signal)

Figure 25:
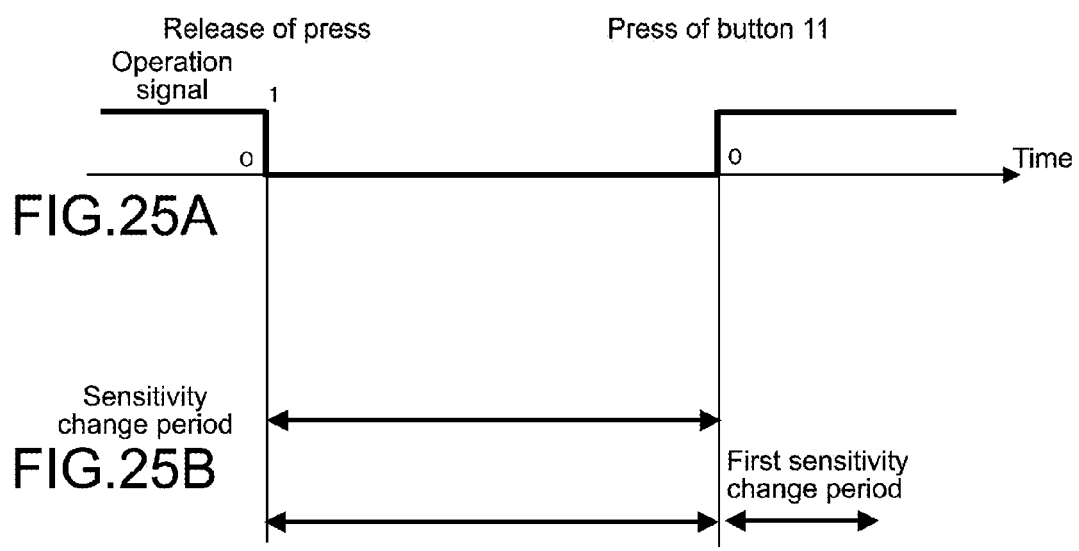
FIG. 25 are timing charts showing an operation of the input apparatus according to another embodiment of the present invention.

Next, a fifth embodiment of a case where the sensitivity of the pointer movement is changed in association with the operation signal will be described. FIG. 25 are timing charts showing an operation of the input apparatus 1 according to this embodiment.

First, a sensitivity change period indicated by an arrow on top in FIG. 25B will be described. In this case, the sensitivity change period is started with a cancel of an input of an operation signal as a trigger and ended with a start of an input of an operation signal as a trigger. The MPU 19 of the input apparatus 1 judges whether an input of an operation signal has been canceled, and when judged that the input of the operation signal has been canceled, starts calculating and transmitting sensitivity change values ($V_x'$, $V_y'$). The MPU 19 judges whether an input of an operation signal is started, and when judged that the input of the operation signal is started, ends the calculation and transmission of the sensitivity change values ($V_x'$, $V_y'$).

By the processing as described above, the sensitivity of the movement of the pointer 2 can be desensitized during a period from a time the user releases the press of the button 11 to a time the button 11 is started to be pressed. In other words, the button 11 has the function as the movement control button, and the user can move the pointer 2 with a normal sensitivity while pressing the button 11. On the other hand, the user can desensitize the movement of the pointer 2 by releasing the press of the button 11.

As a result, by the processing described with reference to FIG. 25, it is possible to prevent, when the input apparatus 1 generates a determination command at a time an input of an operation signal is canceled, an operation unintended by the user from being made, like a case where processing intended by the user is not executed on the screen 3.

Next, a sensitivity change period indicated by an arrow at the bottom of FIG. 25B will be described. In this case, a time period from a time an input of an operation signal is canceled to a time an input of an operation signal is started and a time period from the time the input of the operation signal is started to a time the first sensitivity change period ends correspond to time periods during which a sensitivity of the movement of the pointer 2 is changed. The MPU 19 judges whether the input of the operation signal has been canceled, and when judged that the input of the operation signal has been canceled, starts calculating and transmitting sensitivity change values ($V_x'$, $V_y'$). The MPU 19 judges whether an input of an operation signal is started, and when judged that the input of an operation signal is started, repeats the calculation and transmission of the sensitivity change values ($V_x'$, $V_y'$) during the first sensitivity change period after the input of the operation signal is started. As a result, it is possible to prevent, when the input apparatus 1 generates a determination command at a time an input of an operation signal is started, for example, an operation unintended by the user from being made, like a case where processing intended by the user is not executed on the screen 3.

(Embodiments in which Sensitivity Change Period is Variable)

(First Embodiment of Case where Sensitivity Change Period is Variable)

The above embodiments have described the case where the sensitivity change period or the restriction time period is constant. This and subsequent embodiments are different from the above embodiments in that the sensitivity change period or the restriction time period is controlled variably. Thus, that point will mainly be described. Here, the sensitivity change period (or restriction time period) can be controlled variably in the embodiments in which the sensitivity change period (or restriction time period) is counted out of the above embodiments. In this and subsequent embodiments, an example of a case where the sensitivity change period described in the first embodiment of a case where the sensitivity of the pointer movement is changed in association with an operation command (see FIG. 10) is controlled variably will be described.

For example, a use who is good at performing pointing operations may move the input apparatus so as to move the pointer 2 immediately after pressing the button 11. In this case, angular velocity values ($\omega_\psi$, $\omega_\theta$) increase in accordance with a movement of the input apparatus 1 when swung by the user. In this regard, in this embodiment, an operational feeling is improved by shortening the sensitivity change period as angular velocity values increase.

Figure 26:
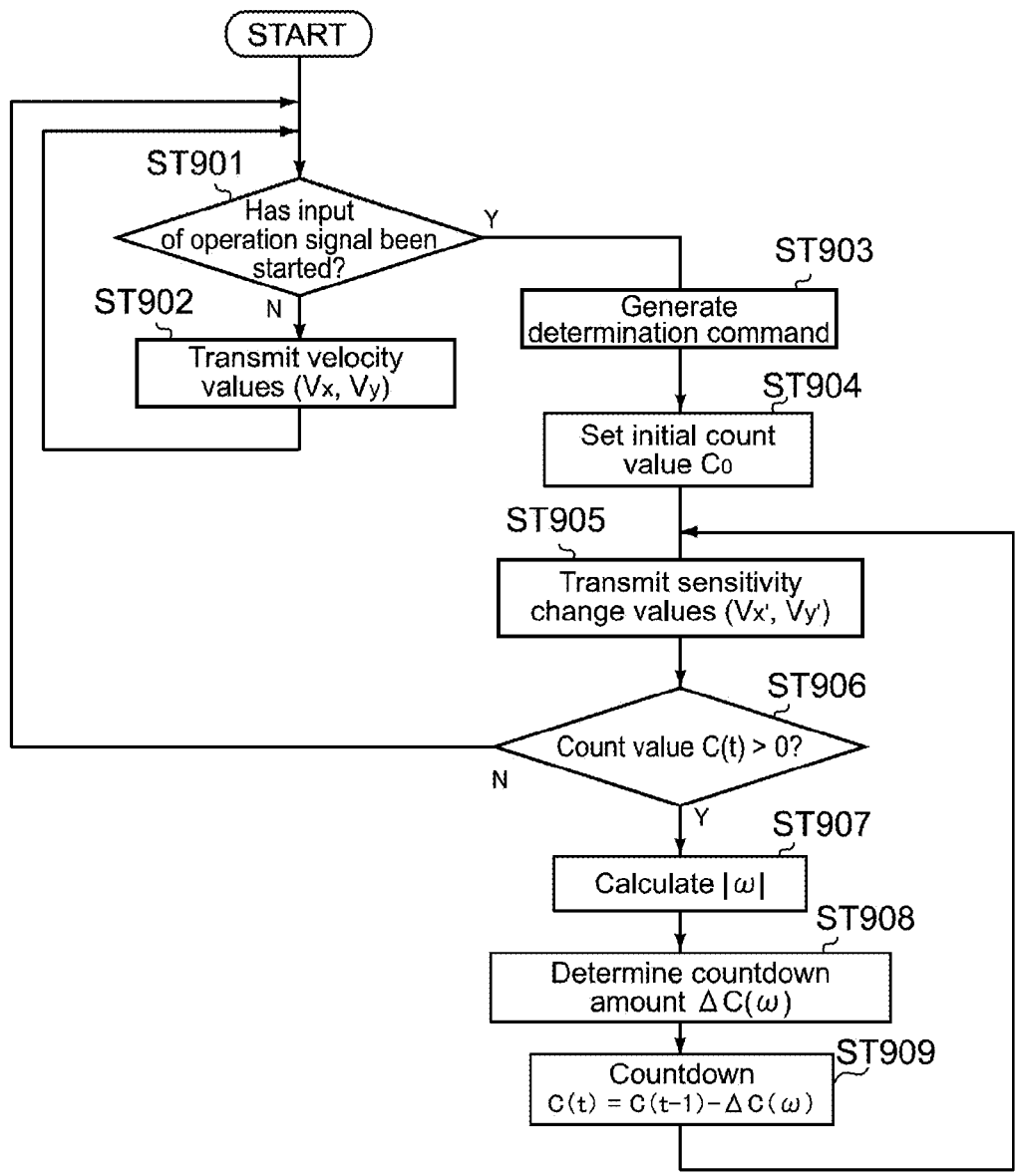
FIG. 26 is a flowchart showing an operation of the input apparatus according to another embodiment of the present invention.

FIG. 26 is a flowchart showing an operation of the input apparatus 1 according to this embodiment.

As shown in FIG. 26, the MPU 19 of the input apparatus 1 judges whether an input of an operation signal from the switch is started (Step 901). When the user has not started pressing the button 11 and the input of an operation signal is not yet started (NO in Step 901), the MPU 19 transmits information on velocity values (Step 902).

When the user starts pressing the button 11 and an operation signal is output from the switch, an input of the operation signal to the MPU 19 is started. When the input of the operation signal is started (YES in Step 901), the MPU 19 generates a determination command (Step 903). Next, the MPU 19 sets an initial count value $C_0$ to a counter (not shown) and starts counting the sensitivity change period (Step 904). The initial count value $C_0$ used herein is a value that is to be an initial value for countdown to be described later. Countdown of a count value $C(t)$ is started from the initial count value $C_0$. The countdown of the count value $C(t)$ means subtracting a function value $\Delta C(\omega)$ of angular velocities of the input apparatus 1 from the count value $C(t)$ as shown in Step 909 to be described later. As a result, the count value $C(t)$ is decremented in each step of the countdown.

Upon setting the initial count value $C_0$, the MPU 19 transmits sensitivity change values ($V_x'$, $V_y'$) (Step 905). The sensitivity change values ($V_x'$, $V_y'$) are calculated by multiplying velocity values ($V_x$, $V_y$) by a predetermined weighting factor k as described above.

Upon transmitting the sensitivity change values ($V_x'$, $V_y'$), the MPU 19 judges whether the count value $C(t)$ is larger than 0 (Step 906). When judged that the count value $C(t)$ is larger than 0 (YES in Step 906), the MPU 19 acquires biaxial angular velocity values ($\omega_\psi$, $\omega_\theta$) output from the angular velocity sensor unit 15. Then, the MPU 19 calculates a square mean of the biaxial angular velocity values ($\omega_\psi$, $\omega_\theta$) and calculates an absolute value of the angular velocity values $|\omega|$ (Step 907). Alternatively, in Step 907, a larger one of an absolute value $|\omega_\psi|$ of the first angular velocity value $\omega_\psi$ and an absolute value $|\omega_\theta|$ of the second angular velocity value $\omega_\theta$ may be used as a representative value, instead of the absolute value of the angular velocity values $|\omega|$.

Upon calculating the absolute value of the angular velocity values $|\omega|$, the MPU 19 determines a countdown amount $\Delta C(\omega)$ corresponding to a magnitude of the absolute value of the angular velocity values $|\omega|$ (Step 908). The countdown amount $\Delta C(\omega)$ is a value that increases as the absolute value of the angular velocity values $|\omega|$ increases. Details on a relationship between the countdown amount $\Delta C(\omega)$ and the absolute value of the angular velocity values $|\omega|$ will be given later.

Upon determining the countdown amount $\Delta C(\omega)$, the MPU 19 subtracts the countdown amount $\Delta C(\omega)$ from a previous count value $C(t-1)$ and calculates a new count value $C(t)$, to thus execute countdown (Step 909). Upon calculating the new count value $C(t)$, the MPU 19 transmits the sensitivity change values ($V_x'$, $V_y'$) again (Step 905) and judges whether the new count value $C(t)$ is larger than 0 (Step 906). In other words, the MPU 19 repeats the processes of Steps 905 to 909 until the count value $C(t)$ becomes 0 or less.

When the count value $C(t)$ has become 0 or less (NO in Step 906), the MPU 19 judges whether an input of an operation signal is started again (Step 901).

By the processing shown in FIG. 26, the sensitivity change period is controlled so as to be shortened as the absolute value of the angular velocity values $|\omega|$ increases. Accordingly, when the user swings the input apparatus 1 so as to start moving the pointer 2 immediately after clicking the button 11, the sensitivity change period ends readily. Accordingly, since the user can shift to a pointing operation smoothly after an operation is made to the button 11, an operational feeling is improved.

Next, the relationship between the absolute value of the angular velocity values $|\omega|$ and the countdown amount $\Delta C(\omega)$ will be described.

FIGS. 27A to 27D are diagrams each showing an example of the relationship between the absolute value of the angular velocity values |ω| and the countdown amount ΔC(ω). As shown in FIGS. 27A to 27D, the countdown amount ΔC(ω) increases as the absolute value of the angular velocity values |ω| increases. The countdown amount ΔC(ω) may be obtained by an operation based on the absolute value of the angular velocity values |ω|, or may be obtained by a lookup table.

Figure 27A:
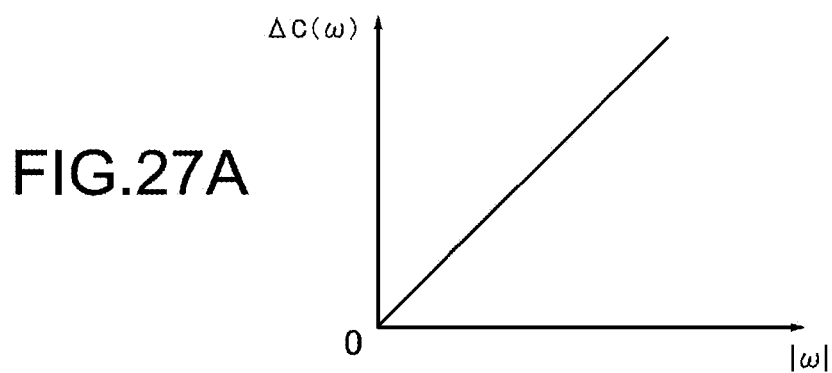
FIG. 27 are diagrams showing examples of a relationship between an absolute value of angular velocity values |ω| and a countdown amount $\Delta C(\omega)$.

FIG. 27A is a diagram showing an example of a case where the countdown amount ΔC(ω) increases by a linear function along with an increase of the absolute value of the angular velocity values |ω|. The countdown amount ΔC(ω) may increase by a quadratic function along with an increase of the absolute value of the angular velocity values |ω|, may increase by a multi-degree function, or may alternatively be increased by an exponent function. Further, the countdown amount ΔC(ω) may be set to be constant (maximum value) when the absolute value of the angular velocity values |ω| is a predetermined value or more, and the countdown amount ΔC(ω) may be set to be constant (minimum value) when the absolute value of the angular velocity values |ω| is smaller than a predetermined value.

Figure 27B:
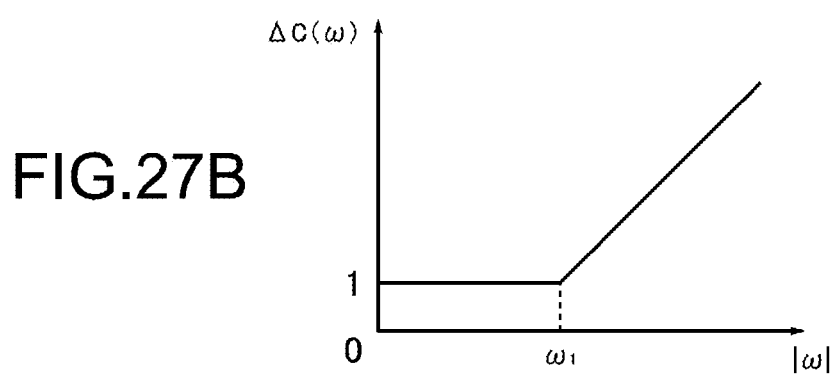

In the example shown in FIG. 27B, the countdown amount ΔC(ω) is set to be constant when the absolute value of the angular velocity values |ω| is smaller than a predetermined threshold value $\omega_1$. Accordingly, the magnitude of the absolute value of the angular velocity values |ω| does not affect the count of the sensitivity change period when the absolute value of the angular velocity values |ω| is smaller than the threshold value $\omega_1$. It should be noted that when the absolute value of the angular velocity values |ω| is smaller than the threshold value, the countdown amount ΔC(ω) is not 0, but is, for example, 1. Accordingly, the sensitivity change period can be prevented from being continued endlessly without any progress in the countdown. When the absolute value of the angular velocity values |ω| is equal to or larger than the threshold value $\omega_1$, the countdown amount ΔC(ω) increases by a linear function. The countdown amount ΔC(ω) may increase by a quadratic function, a multi-degree function, or an exponent function along with an increase of the absolute value of the angular velocity values |ω|. Moreover, when the absolute value of the angular velocity values |ω| is a predetermined value or more, the countdown amount ΔC(ω) may be set to be constant (maximum value). The predetermined threshold value $\omega_1$ is set appropriately in consideration of the relationship among the sensitivity change period, the countdown amount ΔC(ω), and the absolute value of the angular velocity values |ω|.

Figure 27C:
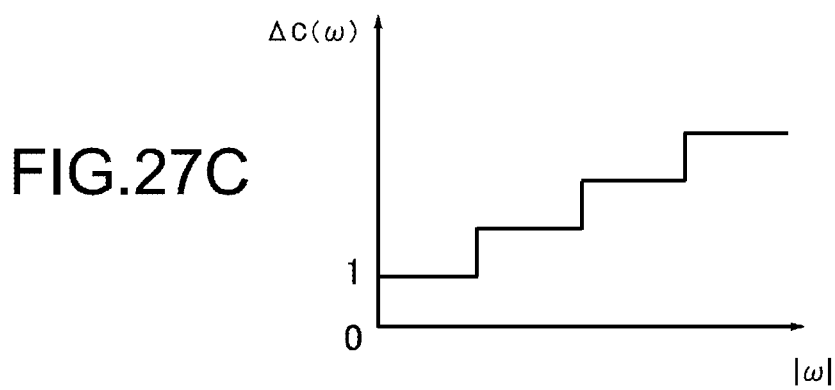

FIG. 27C is a diagram showing an example of a case where the countdown amount ΔC(ω) increases by multiple steps along with an increase of the absolute value of the angular velocity values |ω|. The number of steps is not particularly limited.

Figure 27D:
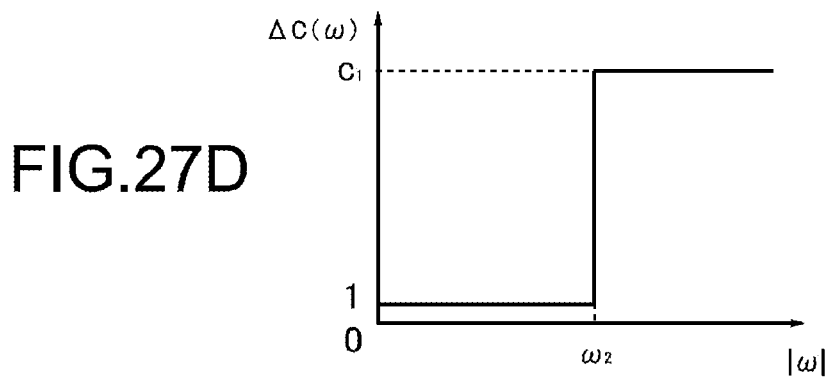

FIG. 27D is a diagram showing an example of a case where the countdown amount ΔC(ω) increases by two steps along with an increase of the absolute value of the angular velocity values |ω|. When the absolute value of the angular velocity values |ω| is smaller than a predetermined threshold value $\omega_2$, the countdown amount ΔC(ω) is set to be constant like, for example, 1. On the other hand, when the absolute value of the angular velocity values |ω| is equal to or larger than the predetermined threshold value $\omega_2$, the countdown amount ΔC(ω) is set to the initial count value $C_0$. Alternatively, the countdown amount ΔC(ω) is set to a value equal to or larger than the initial count value $C_0$. Accordingly, the sensitivity change period can be ended when the absolute value of the angular velocity values |ω| is equal to or larger than the predetermined threshold value $\omega_2$. The predetermined threshold value $\omega_2$ is set appropriately in consideration of the relationship among the sensitivity change period, the countdown amount ΔC(ω), and the absolute value of the angular velocity values |ω|.

The descriptions on FIGS. 26 and 27 have been given on the case where the sensitivity change period is shortened as the angular velocity values increase. However, the present invention is not limited thereto, and the sensitivity change period may be shortened as the velocity values increase. Alternatively, the sensitivity change period may be shortened as the acceleration values output from the acceleration sensor unit 16 increase. In addition, angular acceleration values, values of angular acceleration change rates, and values of acceleration change rates, for example, may be used. Typically, absolute values of those values are used.

Figure 28:
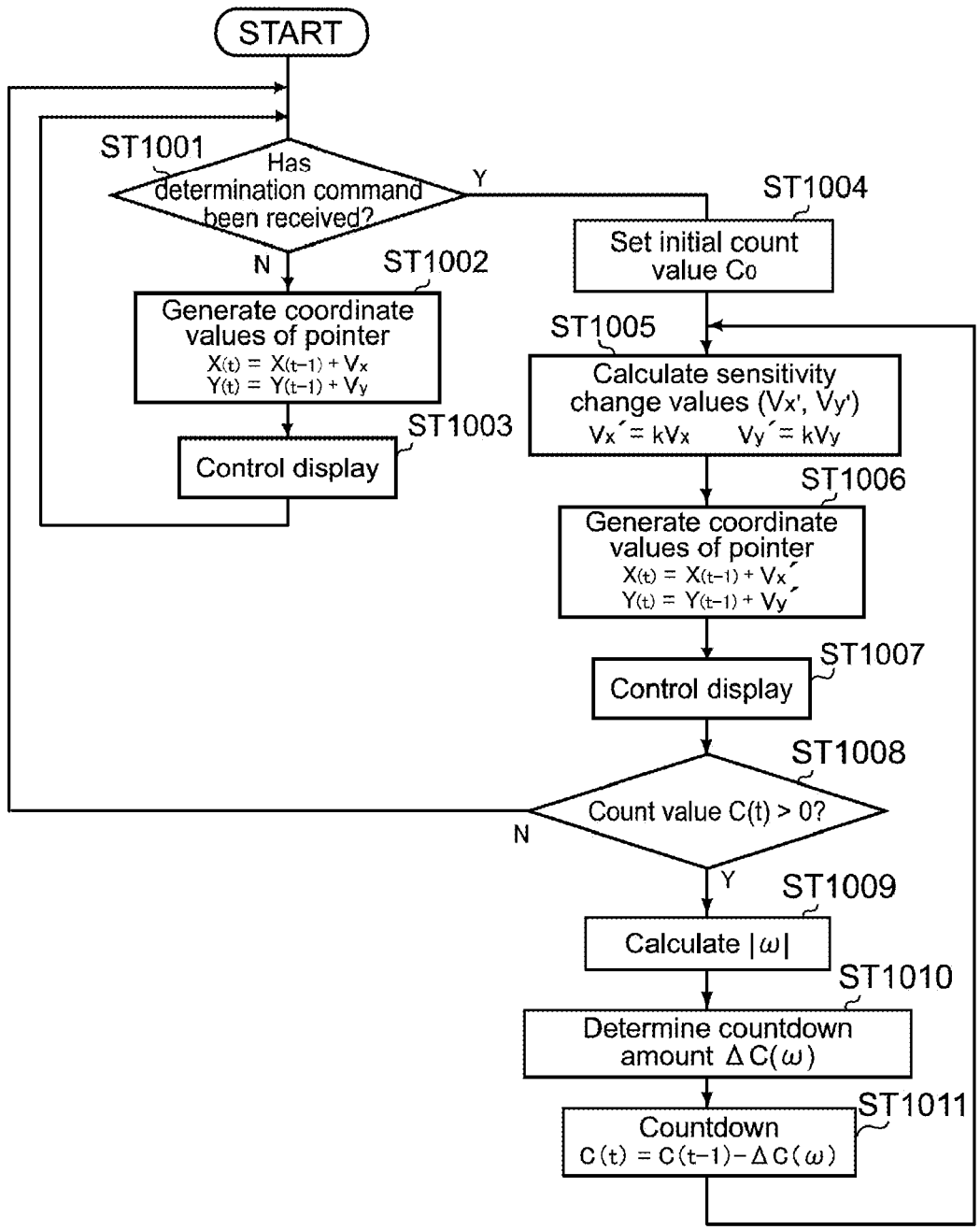
FIG. 28 is a flowchart showing a case where the control apparatus mainly controls the sensitivity of the movement of the pointer.

The processing shown in FIG. 26 may be mainly executed by the control apparatus 40. FIG. 28 is a flowchart showing an operation of the control apparatus 40.

The MPU 35 of the control apparatus 40 judges whether a determination command has been received (Step 1001). When a determination command is not received (NO in Step 1001), the MPU 35 adds velocity values ($V_x$, $V_y$) transmitted from the input apparatus 1 to previous coordinate values to thus generate new coordinate values (X(t), Y(t)) (Step 1002). Then, based on the generated coordinate values, the display control section 42 controls display so that the pointer 2 moves on the screen 3 (Step 1003).

When the user operates the button 11 and a determination command is received from the input apparatus 1 (YES in Step 1001), the MPU 35 sets the initial count value $C_0$ to a counter and starts counting the sensitivity change period (Step 1004). Next, the MPU 35 calculates sensitivity change values ($V_x'$, $V_y'$) by multiplying the velocity values ($V_x$, $V_y$) transmitted from the input apparatus 1 by the weighting factor k (Step 1005) and generates new coordinate values (X(t), Y(t)) by adding the sensitivity change values ($V_x'$, $V_y'$) to the coordinate values (Step 1006). Then, based on the generated coordinate values (X(t), Y(t)), the display control section 42 controls display so that the pointer 2 moves on the screen 3 (Step 1007).

Next, the MPU 35 judges whether a count value C(t) is larger than 0 (Step 1008). When judged that the count value C(t) is larger than 0 (YES in Step 1008), the MPU 35 calculates an absolute value of angular velocity values |ω| based on biaxial angular velocity values ($\omega_\psi$, $\omega_\theta$) transmitted from the input apparatus 1 (Step 1009). Upon calculating the absolute value of the angular velocity values |ω|, the MPU 35 determines a countdown amount ΔC(ω) corresponding to a magnitude of the absolute value of the angular velocity values |ω| (Step 1010) (see FIG. 27) to execute countdown (Step 1011). The MPU 35 repeats the processes of Steps 1005 to 1011 until the count value C(t) becomes 0 or less. When the count value C(t) has become 0 or less (NO in Step 1008), the MPU 35 executes the processes of Step 1001 and subsequent steps again.

The processing shown in FIG. 28 bears the same effect as the processing shown in FIG. 26. It should be noted that an embodiment of variably controlling a sensitivity change period to be described later may also be executed mainly by the control apparatus 40.

(Second Embodiment of Case where Sensitivity Change Period is Variable)

Figure 29:
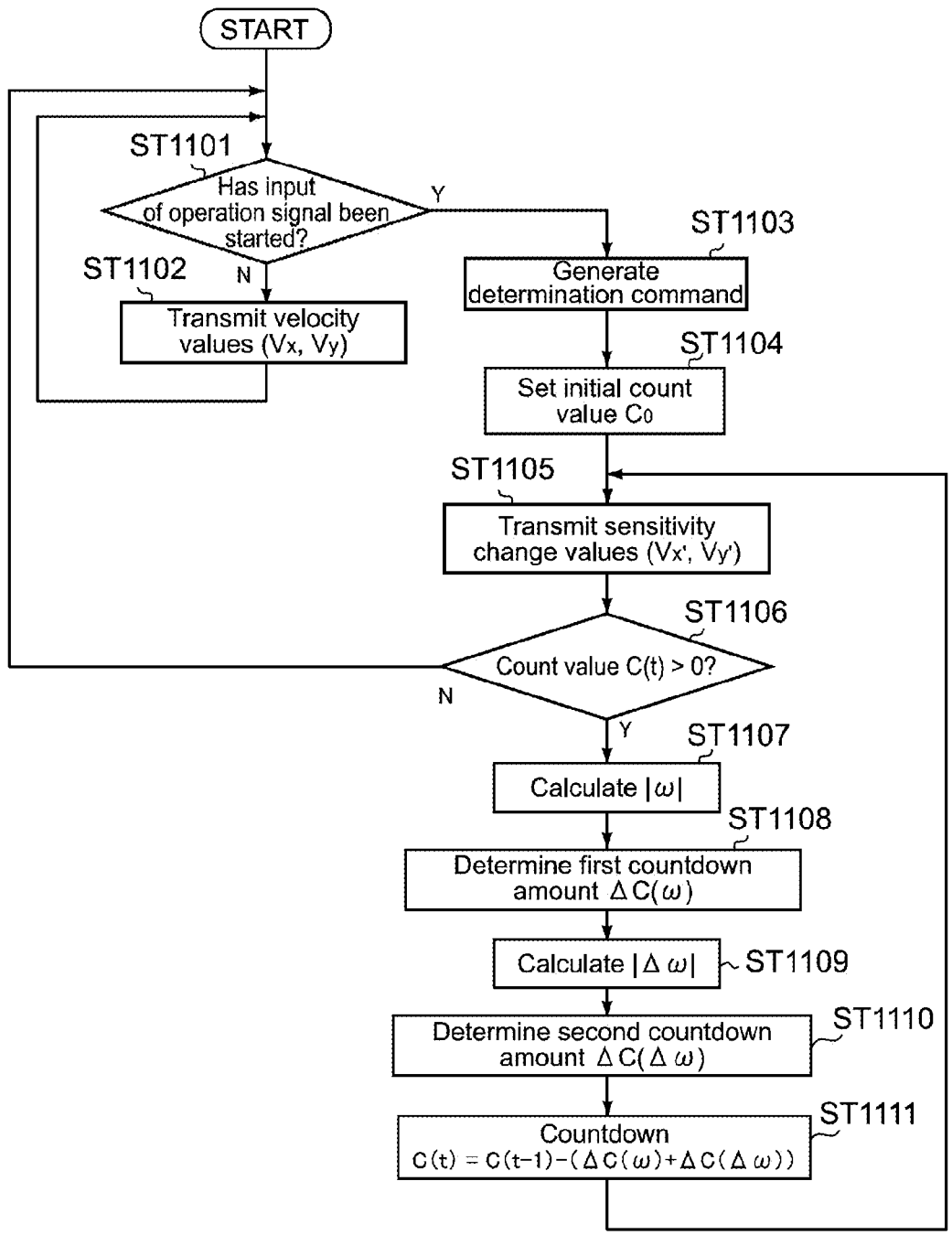
FIG. 29 is a flowchart showing an operation of the input apparatus according to another embodiment of the present invention.

Next, a second embodiment of a case where the sensitivity change period is variable will be described. FIG. 29 is a flowchart showing an operation of the input apparatus 1 according to this embodiment. This embodiment is different from the above embodiment shown in FIG. 26 in that the input apparatus 1 variably controls the sensitivity change period in association with not only the angular velocity values but also angular acceleration values. Thus, that point will mainly be described. It should be noted that a countdown amount related to the angular velocity values will be described as a first countdown amount $\Delta C(\omega)$, and a countdown amount related to the angular acceleration values will be described as a second countdown amount $\Delta C(\Delta \omega)$.

As shown in FIG. 29, in Steps 1101 to 1108, processes similar to those of Steps 901 to 908 of FIG. 26 are executed. Upon determining the first countdown amount $\Delta C(\omega)$ corresponding to the absolute value of the angular velocity values $|\omega|$ (Step 1108), the MPU 19 calculates biaxial angular acceleration values ($\Delta \omega_\psi$, $\Delta \omega_\theta$) by differentiating biaxial angular velocity values ($\omega_\psi$, $\omega_\theta$). The MPU 19 calculates a square mean of the biaxial angular acceleration values ($\Delta \omega_\psi$, $\Delta \omega_\theta$) to obtain an absolute value of the angular acceleration values $|\Delta \omega|$ (Step 1109). Alternatively, in Step 1109, a larger one of an absolute value of the first angular acceleration value $|\omega|_\psi$ and an absolute value of the second angular acceleration value $|\omega_\theta|$ may be used as a representative value instead of the absolute value of the angular acceleration values $|\Delta \omega|$.

Upon calculating the absolute value of the angular acceleration values $|\Delta \omega|$, the MPU 19 determines the second countdown amount $\Delta C(\Delta \omega)$ corresponding to a magnitude of the absolute value of the angular acceleration values $|\Delta \omega|$ (Step 1110). The second countdown amount $\Delta C(\Delta \omega)$ is a value that increases as the absolute value of the angular acceleration values $|\Delta \omega|$ increases. A relationship between the absolute value of the angular accelerations $|\Delta \omega|$ and the second countdown amount $\Delta C(\Delta \omega)$ is, for example, the relationships shown in FIG. 27 above. In this case, the absolute value of the angular velocity values $|\omega|$ represented on the abscissa axis in FIGS. 27A to 27D only needs to be replaced with the absolute value of the angular acceleration values $|\Delta \omega|$.

Upon determining the second countdown amount $\Delta C(\Delta \omega)$, the MPU 19 subtracts the first countdown amount $\Delta C(\omega)$ and the second countdown amount $\Delta C(\Delta \omega)$ from a previous count value $C(t-1)$ to calculate a new count value $C(t)$ (Step 1111). After that, the MPU 19 repeats the processes of Steps 1105 to 1111 until the count value $C(t)$ becomes 0 or less. Then, when the count value $C(t)$ has become 0 or less (NO in Step 1106), the MPU 19 returns to Step 1101 and executes the processes of Step 1101 and subsequent steps.

Because the sensitivity change period is controlled variably in accordance with not only the angular velocity values but also the angular acceleration values in the processing shown in FIG. 29, the sensitivity change period can be shortened appropriately.

Although the first countdown amount $\Delta C(\omega)$ and the second countdown amount $\Delta C(\Delta \omega)$ are determined individually in this embodiment, it is also possible for one countdown amount $\Delta C(\omega, \Delta \omega)$ corresponding to the angular velocity values or the angular acceleration values to be determined by a lookup table, for example.

In this embodiment, descriptions have been given on the case where the sensitivity change period is controlled variably in accordance with the angular velocity values and the angular acceleration values. However, the present invention is not limited thereto, and the sensitivity change period may be controlled variably in accordance with velocity values and acceleration values. Alternatively, the sensitivity change period may also be controlled variably by a combination of two out of the angular velocity values, angular acceleration values, velocity values, acceleration values, and other values corresponding to the movement of the input apparatus 1.

Although descriptions have been given on the case where the sensitivity change period is controlled variably in accordance with signals of two different physical amounts in this embodiment, the sensitivity change period may also be controlled variably in accordance with signals of three or more different physical amounts.

(Third Embodiment of Case where Sensitivity Change Period is Variable)

Next, a third embodiment of a case where the sensitivity change period is variable will be described.

For example, there are cases where a user who is not good at performing delicate operations on the pointer 2 causes a large hand movement. In the case of such a user, a better operational feeling can be obtained as the sensitivity change period continues for a longer time period after the button 11 is pressed. Thus, in this embodiment, the sensitivity change period is controlled so as to be prolonged as a signal within a frequency range corresponding to a hand movement out of the signals of the angular velocity values increases. Therefore, that point will mainly be described.

Figure 30:
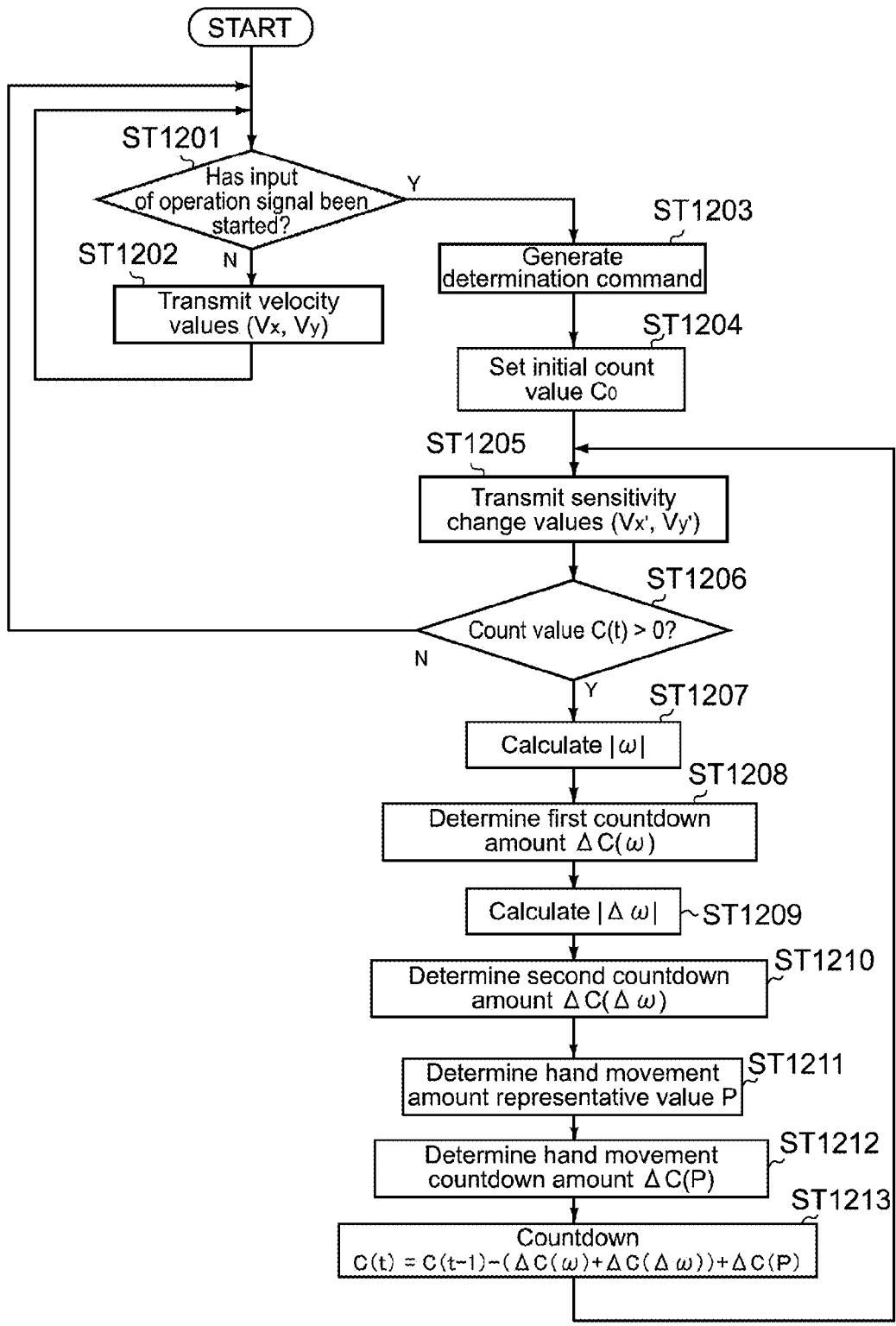
FIG. 30 is a flowchart showing an operation of the input apparatus according to another embodiment of the present invention.

FIG. 30 is a flowchart showing an operation of the input apparatus 1 according to this embodiment. As shown in FIG. 30, in Steps 1201 to 1210, processes that are the same as those of Steps 1101 to 1110 of FIG. 29 are executed. Upon determining the second countdown amount $\Delta C(\Delta \omega)$ corresponding to the absolute value of the angular acceleration values $|\Delta \omega|$ (Step 1210), the MPU 19 frequency-analyzes biaxial angular velocity values ($\omega_\psi$, $\omega_\theta$). The MPU 19 detects a peak value within a frequency range corresponding to a hand movement (e.g., 1 to 20 Hz) out of the signals of the angular velocity values ($\omega_\psi$, $\omega_\theta$). The MPU 19 calculates a mean value of the peak values of the biaxial angular velocity values, and determines a hand movement amount representative value P (Step 1211). Alternatively, a larger one of the two peak values may be used as the hand movement amount representative value P.

Alternatively, in Step 1211, the hand movement amount representative value P may be determined using the absolute value of the angular velocity values $|\omega|$ obtained after passage through a band-pass filter or a highpass filter instead of the frequency analysis.

Upon determining the hand movement amount representative value P, the MPU 19 determines a hand movement countdown amount $\Delta C(P)$ corresponding to the hand movement amount representative value P (Step 1212). The hand movement countdown amount $\Delta C(P)$ is a value that increases as the hand movement amount representative value P increases. The hand movement countdown amount $\Delta C(P)$ may increase by a linear function, multi-degree function, or exponent function along with an increase of the hand movement amount representative value P. Alternatively, the hand movement countdown amount $\Delta C(P)$ may increase by two steps or multiple steps along with an increase of the hand movement amount representative value P.

Next, the MPU 19 subtracts the first countdown amount $\Delta C(\omega)$ and the second countdown amount $\Delta C(\Delta \omega)$ from a previous count value $C(t-1)$ and adds the hand movement countdown amount $\Delta C(P)$, to thus calculate a new count value $C(t)$ (Step 1213). After that, the MPU 19 repeats the processes of Steps 1205 to 1213 until the count value $C(t)$ becomes 0 or less. Then, when the count value $C(t)$ has become 0 or less (NO in Step 1206), the MPU 19 returns to Step 1201 and executes the processes of Step 1201 and subsequent steps.

By the processing shown in FIG. 30, the sensitivity change period is controlled so as to be prolonged as the hand movement becomes larger. Accordingly, even a user who causes a large hand movement can easily perform a pointing operation, with the result that an operational feeling can be improved.

A limitation shown in Equation (5) below may be imposed on the hand movement countdown amount ΔC(P) determined in Step 1212.

$$\Delta C(P) \leq \Delta C(\omega) + \Delta C(\Delta\omega) - 1 \quad (5)$$

In other words, a limitation may be imposed on the hand movement countdown amount ΔC(P) so that even at maximum, a value smaller by 1 than a sum of the first countdown amount and the second countdown amount is not exceeded. Accordingly, the sensitivity change period can be prevented from being continued endlessly without any progress in the countdown shown in Step 1213 in a case where a large hand movement is caused.

Although the first countdown amount ΔC(ω), the second countdown amount ΔC(Δω), and the hand movement countdown amount ΔC(P) are determined individually in this embodiment, one countdown amount ΔC(ω, Δω, P) may be determined by a lookup table, for example.

In this embodiment, descriptions have been given on the case where the count of the sensitivity change period is executed using signals of two different physical amounts (angular velocity values and angular acceleration values) and a signal of the hand movement amount. However, the present invention is not limited thereto, and the count of the sensitivity change period may be executed using signals of one physical amount (e.g., angular velocity values) and the hand movement amount signal. Alternatively, it is also possible to execute the count of the sensitivity change period using only the hand movement amount signal.

The above embodiments have described the case where the count of the sensitivity change period is started in association with a generation of a determination command and the sensitivity change period is controlled variably. However, the present invention is not limited thereto, and it is also possible to start the count of the sensitivity change period after an operation signal is input or after an input of an operation signal is canceled and variably control the sensitivity change period. Alternatively, it is also possible to start the restriction time period (time period during which movement of pointer is stopped) in association with the generation of a determination command and variably control the restriction time period. It should be noted that in those cases, the control apparatus 40 may mainly execute the processing.

(Embodiment of Case where Scroll Button or Zoom Button is Operated)

In the above embodiments, the operation section operated by the user has been described as the button 11 (button having function corresponding to left button of mouse (determination button)). However, in this embodiment, the operation section operated by the user will be described as being a scroll button (not shown) or a zoom button (not shown).

Here, the scroll button is a button having a function of executing scroll on the screen when the button is pressed or not pressed. For example, when the user swings the input apparatus 1 in the vertical direction while pressing the scroll button, an image is scrolled in the vertical direction on the screen 3 in accordance with that operation. When the input apparatus 1 is swung in the lateral direction, the control apparatus 40 may execute processing of scrolling the image in the lateral direction on the screen 3.

The zoom button is a button having a function of executing zoom on the screen when the button is pressed or not pressed. For example, when the user swings the input apparatus 1 upwardly while pressing the zoom button, an image is zoomed in on the screen 3. On the other hand, when the user swings the input apparatus 1 downwardly, the image is zoomed out on the screen 3. It should be noted that relationships between the operation directions of the input apparatus 1 and scroll directions/zoom of an image can be changed as appropriate.

Examples of the image as a target of scroll or zoom include a web image, a map, and an EPG (Electronic Program Guide) displayed on the screen 3.

The processing described in the above embodiments are also applicable to a case where the scroll button or the zoom button is operated.

As an example, a case where the processing shown in FIG. 24B is executed when the scroll button or the zoom button is pressed will be described. It should be noted that the sensitivity change period is assumed to be the period indicated by the arrow at the bottom of FIG. 24B.

The MPU 19 judges whether an input of an operation signal from the scroll button is started. When the user has not pressed the scroll button and the input of an operation signal is not yet started, the MPU 19 transmits information on velocity values ($V_x$, $V_y$). Upon receiving the information on the velocity values ($V_x$, $V_y$), the MPU 35 of the control apparatus 40 controls display so that an image is scrolled on the screen 3 based on the velocity values.

When the user presses the scroll button and the input of an operation signal is started, the MPU 19 start calculating and transmitting sensitivity change values ($V_x'$, $V_y'$). Upon receiving the sensitivity change values ($V_x'$, $V_y'$), the MPU 35 of the control apparatus 40 controls display so as to scroll the image on the screen 3 based on the sensitivity change values ($V_x'$, $V_y'$). The MPU 19 judges whether the input of the operation signal has been canceled. When the user releases the press of the scroll button and the input of the operation signal is thus canceled, the MPU 19 starts counting the second sensitivity change period. The MPU 19 repeats the calculation and transmission of the sensitivity change values ($V_x'$, $V_y'$) during the second sensitivity change period after the input of the operation signal is canceled.

By the processing as described above, the user can scroll the image at a normal scroll speed by swinging the input apparatus in a state where a finger is removed from the scroll button, and desensitize the scroll speed by pressing the scroll button. Moreover, in this embodiment, the scroll speed can be desensitized during the second sensitivity change period that starts after the user releases the press of the scroll button. As a result, it is possible to prevent scroll unintended by the user from being made due to the input apparatus 1 being moved by an operation that is caused when the user releases the press of the scroll button.

It should be noted that when the processing indicated by the bottom arrow of FIG. 24B is applied to the zoom button, the user can zoom in/out on an image at a normal zoom speed by swinging the input apparatus in a state where the finger is removed from the zoom button. Moreover, by pressing the zoom button, the zoom speed can be desensitized. In addition, it is possible to prevent zoom unintended by the user from being made due to the input apparatus 1 being moved by an operation that is caused when the user releases the press of the zoom button.

Next, as another example, a case where the processing shown in FIG. 25B is executed when the scroll button or the zoom button is pressed will be described. It should be noted that the sensitivity change period is assumed to be the period indicated by the bottom arrow of FIG. 25B.

The MPU 19 judges whether an input of an operation signal from the scroll button has been canceled. When the user is pressing the scroll button and the input of the operation signal is thus not canceled, the MPU 19 transmits information on velocity values ($V_x$, $V_y$).

When the user releases the press of the scroll button and the input of the operation signal is thus canceled, the MPU 19 starts calculating and transmitting sensitivity change values ($V_x'$, $V_y'$). Next, the MPU 19 judges whether an input of an operation signal is started. When the user starts pressing the scroll button and the input of an operation signal is started, the MPU 19 starts counting the first sensitivity change period. The MPU 19 repeats the calculation and transmission of the sensitivity change values ($V_x'$, $V_y'$) during the first sensitivity change period after the input of the operation signal is started.

By the processing as described above, the user can scroll an image at a normal scroll speed by swinging the input apparatus while pressing the scroll button, and the scroll speed can be desensitized by releasing the press of the scroll button. Moreover, in this embodiment, the scroll speed can be desensitized during the first sensitivity change period that starts after the user starts pressing the scroll button. As a result, it is possible to prevent scroll unintended by the user from being made due to the input apparatus 1 being moved by an operation that is caused when the user presses the scroll button.

It should be noted that when the processing indicated by the bottom arrow of FIG. 25B is applied to the zoom button, the user can zoom in/out on an image at a normal zoom speed by swinging the input apparatus while pressing the zoom button. Moreover, by releasing the press of the zoom button, the zoom speed can be desensitized. In addition, it is possible to prevent zoom unintended by the user from being made due to the input apparatus 1 being moved by an operation that is caused when the user starts pressing the zoom button.

The examples above have described cases where the scroll speed and the zoom speed are desensitized based on operations to the scroll button and the zoom button However, the present invention is not limited thereto, and scroll and zoom may be restricted based on operations to the scroll button and the zoom button (see FIGS. 16 and 17).

This embodiment has described about the scroll and zoom operations. However, the processing described in the above embodiments is also applicable to rotation operations and other operations. Moreover, in the above embodiments and this embodiment, the descriptions have been given assuming that the operation section 23 as a target of the user operation is the button 11, the scroll button, or the zoom button. However, the present invention is not limited thereto, and the processing described in the above embodiments may be executed when the buttons 12 and 13 or various operation buttons 29 such as those provided to a remote controller for operating a television or the like are operated.

(Various Modifications)

The present invention is not limited to the above embodiments and various modifications can be made.

The present invention may be applied to a handheld apparatus that includes a display section, for example. In this case, the pointer displayed on the display section moves when the user moves a main body of the handheld apparatus. Alternatively, the user scrolls or zooms in/out on an image displayed on the screen by moving the main body of the handheld apparatus. Examples of the handheld apparatus include a PDA (Personal Digital Assistance), a cellular phone, a portable music player, and a digital camera.

The input apparatus 1 according to the above embodiments has transmitted input information to the control apparatus 40 wirelessly. However, the input information may be transmitted by wire.

In the above embodiments, the pointer 2 that moves on the screen in accordance with the movement of the input apparatus 1 has been represented as an image of an arrow. However, the image of the pointer 2 is not limited to the arrow and may be a simple circle, square, or the like, or a character image or any other images.

The above embodiments have described about the biaxial acceleration sensor unit and the biaxial angular velocity sensor unit. However, the present invention is not limited thereto, and the input apparatus 1 may include, for example, acceleration sensors of three orthogonal axes and angular velocity sensors of three orthogonal axes, and even with only one of the above, the processing shown in the above embodiments can be realized. Alternatively, an embodiment in which the input apparatus 1 includes a uniaxial acceleration sensor or a uniaxial angular velocity sensor is also conceivable. When provided with the uniaxial acceleration sensor or uniaxial angular velocity sensor, typically a screen on which a plurality of GUIs as pointing targets of the pointer 2 displayed on the screen 3 are arranged uniaxially is conceivable.

Alternatively, the input apparatus 1 may include a geomagnetic sensor, an image sensor, and the like instead of the acceleration sensors and the angular velocity sensors.

The detection axes of each of the angular velocity sensor unit 15 and the acceleration sensor unit 16 of the sensor unit 17 do not necessarily need to be mutually orthogonal like the X' axis and the Y' axis described above. In this case, the accelerations respectively projected in the mutually-orthogonal axial directions can be obtained by a calculation that uses a trigonometric function. Similarly, the angular velocities about the mutually-orthogonal axes can be obtained by a calculation that uses the trigonometric function.

Descriptions have been given on the case where the X' and Y' detection axes of the angular velocity sensor unit 15 and the X' and Y' detection axes of the acceleration sensor unit 16 of the sensor unit 17 described in the above embodiments match. However, those detection axes do not necessarily need to match. For example, in a case where the angular velocity sensor unit 15 and the acceleration sensor unit 16 are mounted on a substrate, the angular velocity sensor unit 15 and the acceleration sensor unit 16 may be mounted while being deviated a predetermined rotation angle within a main surface of the substrate so that the detection axes of the angular velocity sensor unit 15 and the acceleration sensor unit 16 do not match. In this case, the accelerations and angular velocities with respect to the respective axes can be obtained by a calculation that uses the trigonometric function.

In the above embodiments, the case where the input apparatus 1 is operated 3-dimensionally has been described. However, the present invention is not limited thereto, and the input apparatus may be operated while a part of the casing 10 is in contact with a table, for example.

Moreover, the present invention is also applicable to a gesture-operation-type input apparatus that captures a hand movement (gesture) itself of the user and controls a GUI in accordance with that movement.

Figure 31:
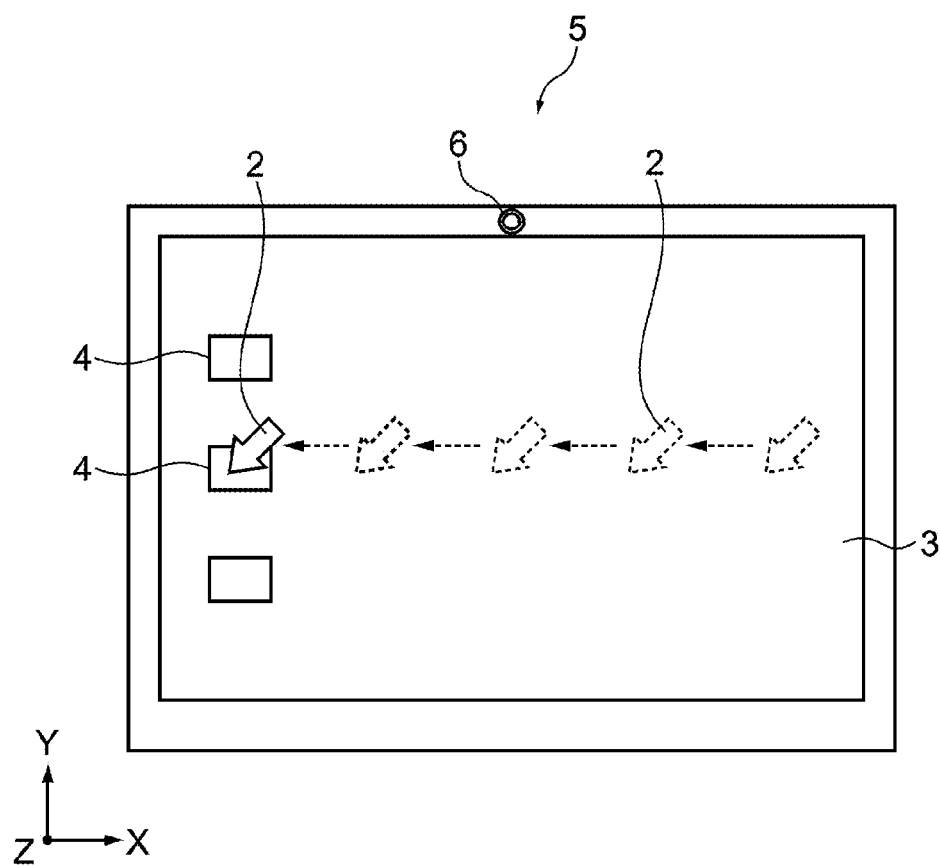
FIG. 31 is a diagram showing an example of a gesture-operation-type input apparatus, for explaining a movement of the pointer that moves on the screen in accordance with a hand movement of the user.

FIGS. 31 and 32 are diagrams each showing an example of the gesture-operation-type input apparatus, for explaining a movement of the pointer that moves on the screen in accordance with the hand movement of the user. FIG. 31 shows a case where the user moves his/her hand parallel to the screen 3 (X- and Y-axis directions). FIG. 32 shows a case where the user moves his/her hand vertically with respect to the screen 3 (Z-axis direction).

The gesture-operation-type input apparatus includes an image pickup section 6 that is provided at an upper portion of the display apparatus 5 on a front side thereof and picks up an image of a hand movement of the user and a control section (not shown) that recognizes the hand movement of the user based on information obtained from the image pickup section 6 and moves the pointer 2 on the screen.

The image pickup section 6 includes an image sensor such as a CCD (Charge Coupled Device) sensor and a CMOS (Complementary Metal Oxide Semiconductor) sensor. The image pickup section 6 outputs to the control section image information of a hand (finger) of the user obtained by the image sensor.

The control section extracts luminance information from the image information from the image pickup section 6 to thus obtain information on the hand movement of the user.

The control section controls display so that the pointer 2 moves on the screen 3 based on the information on the movement in the X- and Y-axis directions (see FIG. 31).

Furthermore, the control section generates a determination command based on information on the movement in the Z-axis direction. Typically, the control section generates a determination command when judging that the hand of the user is a predetermined distance or less from the screen. Upon generating the determination command, the control section desensitizes the movement of the pointer 2 with respect to the hand movement in the X- and Y-axis directions for a predetermined time period. Alternatively, the control section stops moving the pointer for a predetermined time period upon generating the determination command.

Here, as shown in FIG. 32, assuming that the user has placed the pointer 2 on the icon 4 and brought his/her hand close to the screen 3 for inputting a determination command, when the user inadvertently moves his/her hand in a diagonally-forward direction, that is, a direction slightly deviated from the vertical direction with respect to the screen 3, the hand movement of the user contains components in the X- and Y-axis directions in addition to a component in the Z-axis direction.

In this case, at a time the hand of the user is only a predetermined distance away from the screen, the control section issues a determination command and desensitizes (or stops) the movement of the pointer 2 for a predetermined time period since the issuance of the determination command. Thus, since the movement of the pointer 2 based on the hand movement of the user in the X- and Y-axis directions is removed effectively after the determination command is issued, the pointer 2 is kept being placed on the icon 4 even when the user inadvertently moves his/her hand in the diagonally-forward direction. As a result, it is possible to prevent operations unintended by the user from being made, like the pointer 2 is moved from the icon 4 and processing intended by the user is not executed.

As described above, even when the processing of the input apparatus 1 and the control apparatus 40 described in the above embodiments is applied as processing of the gesture-operation-type input apparatus, the same object as the input apparatus 1 and the control apparatus 40 can be attained, and the same operational effect can therefore be obtained.

It should be noted that in the descriptions on FIGS. 31 and 32, a case where the processing of the input apparatus 1 described with reference to FIG. 10 and the like is applied as the processing of the gesture-operation-type input apparatus has been described for convenience. However, the present invention is not limited thereto, and the processing of the input apparatus 1 and the control apparatus 40 described in the above embodiments are all applicable as the processing of the gesture-operation-type input apparatus.

The present application contains subject matter related to that disclosed in Japanese Priority Patent Application JP 2008-330554 filed in the Japan Patent Office on Dec. 25, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An input apparatus, comprising:
    a motion signal output means for detecting a movement of an object for controlling a movement of an image displayed on a screen and outputting a motion signal corresponding to the movement of the object;
    a control command generation means for generating a control command that corresponds to the motion signal and is generated for controlling the movement of the image;
    an operation signal output means for detecting a user operation that is unrelated to the control of the movement of the image and outputting an operation signal that is based on the user operation;
    an operation command generation means for generating an operation command based on the operation signal;
    a control means for controlling the control command generation means to generate, in temporal relation with a generation timing of the operation command, the control command indicating a change in a sensitivity of the movement of the image with respect to the movement of the object;
    wherein the control means controls the control command generation means to generate the control command in which the sensitivity is changed during a predetermined time period following the generation of the operation command;
    wherein a time control means for variably controlling the predetermined time period;
    wherein the time control means variably controls the predetermined time period based on the motion signal; and
    wherein the time control means controls the predetermined time period to shorten the predetermined time period as an output value of the motion signal increases.

2. An input apparatus, comprising:
    a motion signal output means for detecting a movement of an object for controlling a movement of an image displayed on a screen and outputting a motion signal corresponding to the movement of the object;
    a control command generation means for generating a control command that corresponds to the motion signal and is generated for controlling the movement of the image;
    an operation signal output means for detecting a user operation that is unrelated to the control of the movement of the image and outputting an operation signal that is based on the user operation;
    an operation command generation means for generating an operation command based on the operation signal;
    a control means for controlling the control command generation means to generate, in temporal relation with a generation timing of the operation command, the control command indicating a change in a sensitivity of the movement of the image with respect to the movement of the object;

wherein the control means controls the control command generation means to generate the control command in which the sensitivity is changed during a predetermined time period following the generation of the operation command;

a time control means for variably controlling the predetermined time period;

wherein the time control means variably controls the predetermined time period based on the motion signal;

wherein the time control means controls the predetermined time period to prolong the predetermined time period as an output of a signal that is within a predetermined frequency range of the output value of the motion signal increases.

3. The input apparatus according to claim 1, wherein the control means controls the control command generation means to generate the control command in which the sensitivity is changed at least until the operation command is generated since one of an input of the operation signal and a cancel of the input of the operation signal.

4. An input apparatus, comprising:

a motion signal output means for detecting a movement of an object for controlling a movement of an image displayed on a screen and outputting a motion signal corresponding to the movement of the object;

a control command generation means for generating a control command that corresponds to the motion signal and is generated for controlling the movement of the image;

an operation signal output means for detecting a user operation that is unrelated to the control of the movement of the image and outputting an operation signal that is based on the user operation;

an operation command generation means for generating an operation command based on the operation signal;

a control means for controlling the control command generation means to generate, during a predetermined time period after one of an input of the operation signal and a cancel of the input of the operation signal, the control command indicating a change in a sensitivity of the movement of the image with respect to the movement of the object; and time control means that controls the predetermined time period to be shortened or prolonged based on an output value of the motion signal;

wherein the time control means controls the predetermined time period to shorten the predetermined time period as an output value of the motion signal increases.

5. The input apparatus according to claim 4, wherein the control means controls the control command generation means to generate the control command in which the sensitivity is changed during one of a first time period following the input of the operation signal and a second time period following the cancel of the input of the operation signal.

6. The input apparatus according to claim 5, further comprising:

a time control means for variably controlling one of the first time period and the second time period.

7. The input apparatus according to claim 4, wherein the control means controls the control command generation means to generate the control command in which the sensitivity is changed until one of a first time the operation signal is input following the cancel of the input thereof and a second time the input of the operation signal is canceled following the input thereof.

8. A handheld apparatus comprising:

a display section;

a motion signal output means for detecting a movement of the handheld apparatus and outputting a motion signal corresponding to the movement of the handheld apparatus;

a control command generation means for generating a control command that corresponds to the motion signal and is generated for controlling a movement of an image displayed on a screen of the display section;

an operation command generation means that includes an operation section that outputs an operation signal that is generated by a user operation and unrelated to the movement of the handheld apparatus, and that generates an operation command based on the output operation signal; and a control means for controlling the control command generation means to generate, during a predetermined time period after generation of the operation command, the control command indicating a change in a sensitivity of the movement of the image with respect to the movement of the handheld apparatus;

time control means that controls the predetermined time period to be shortened or prolonged based on an output value of the motion signal; and wherein the time control means controls the predetermined time period to shorten the predetermined time period as an output value of the motion signal increases.

9. A handheld apparatus comprising:

a display section;

a motion signal output means for detecting a movement of the handheld apparatus and outputting a motion signal corresponding to the movement of the handheld apparatus;

a control command generation means for generating a control command that corresponds to the motion signal and is generated for controlling a movement of an image displayed on a screen of the display section;

an operation command generation means that includes an operation section that outputs an operation signal that is generated by a user operation and unrelated to the movement of the handheld apparatus, and that generates an operation command based on the output operation signal;

a control means for controlling the control command generation means to generate during a predetermined time period after one of an input of the operation signal and a cancel of the input of the operation signal, the control command indicating a change in a sensitivity of the movement of the image with respect to the movement of the handheld apparatus; and time control means that controls the predetermined time period to be shortened or prolonged based on an output value of the motion signal; and wherein the time control means controls the predetermined time period to shorten the predetermined time period as an output value of the motion signal increases.

10. A control method comprising:

detecting a movement of an object for controlling a movement of an image displayed on a screen;

outputting a motion signal corresponding to the movement of the object;

generating a control command that corresponds to the motion signal and is generated for controlling the movement of the image;

detecting a user operation that is unrelated to the control of the movement of the image;

outputting an operation signal that is based on the user operation;

generating an operation command based on the operation signal;

generating, during a predetermined time period after generation of the operation command, the control command indicating a change in a sensitivity of the movement of the image with respect to the movement of the object;

time control means that controls the predetermined time period to be shortened or prolonged based on an output value of the motion signal; and wherein the time control means controls the predetermined time period to shorten the predetermined time period as an output value of the motion signal increases.

11. An input apparatus comprising:

a motion signal output means for detecting a movement of an object for controlling a movement of an image displayed on a screen and outputting a motion signal corresponding to the movement of the object;

a control command generation means for generating a control command that corresponds to the motion signal and is generated for controlling the movement of the image;

an operation signal output means for detecting a user operation that is unrelated to the control of the movement of the image and outputting an operation signal that is based on the user operation;

an operation command generation means for generating, a predetermined time period relative to generation of the control command, an operation command based on the operation signal;

a control means for controlling the control command generation means to stop, in temporal relation with a generation timing of the operation command, the movement of the image on the screen;

time control means that controls the predetermined time period to be shortened or prolonged based on an output value of the motion signal; and wherein the time control means controls the predetermined time period to shorten the predetermined time period as an output value of the motion signal increases.

12. The input apparatus according to claim 11, wherein the control means controls the control command generation means to stop the movement of the image during a predetermined time period since the generation of the operation command.

13. The input apparatus according to claim 12, further comprising a time control means for variably controlling the predetermined time period.

14. The input apparatus according to claim 11, wherein the control means controls the control command generation means to stop the movement of the image at least until the operation command is generated following one of an input of the operation signal and a cancel of the input of the operation signal.

15. A handheld apparatus comprising:

a display section;

a motion signal output means for detecting a movement of the handheld apparatus and outputting a motion signal corresponding to the movement of the handheld apparatus;

a control command generation means for generating a control command that corresponds to the motion signal and is generated for controlling a movement of an image displayed on a screen of the display section;

an operation command generation means that includes an operation section that outputs an operation signal that is generated by a user operation and unrelated to the movement of the handheld apparatus, and that generates an operation command based on the output operation signal;

a control means for controlling the control command generation means to stop, a predetermined time period relative to generation timing of the operation command, the movement of the image on the screen;

time control means that controls the predetermined time period to be shortened or prolonged based on an output value of the motion signal; and wherein the time control means controls the predetermined time period to shorten the predetermined time period as an output value of the motion signal increases.

16. A control method comprising:

detecting a movement of an object for controlling a movement of an image displayed on a screen;

outputting a motion signal corresponding to the movement of the object;

generating a control command that corresponds to the motion signal and is generated for controlling the movement of the image;

detecting a user operation that is unrelated to the control of the movement of the image;

outputting an operation signal that is based on the operation;

generating an operation command based on the operation signal;

controlling the generation of the control command to stop the movement of the image on the screen in temporal relation with a generation timing of the operation command; and wherein the controlling includes generating, during a predetermined time period after output of the operation signal, the control command, and shortening the predetermined time period as an output value of the motion signal increases.

* * * * *